US006608941B1

(12) United States Patent
Suzuki et al.

(10) Patent No.: US 6,608,941 B1
(45) Date of Patent: Aug. 19, 2003

(54) IMAGE PROCESSING APPARATUS

(75) Inventors: Michiyuki Suzuki, Yamatokoriyama (JP); Yoshinori Hayashi, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/316,316

(22) Filed: May 21, 1999

(30) Foreign Application Priority Data

May 22, 1998 (JP) ............................................. 10-141701

(51) Int. Cl.[7] .................................................. G06K 9/38
(52) U.S. Cl. ........................ 382/272; 382/275; 382/260; 358/3.01; 358/3.26
(58) Field of Search ................................. 382/272, 275, 382/205, 260, 254, 263, 264, 266; 358/1.9, 3.01, 3.26, 3.08, 3.06, 3.27, 533; 345/615

(56) References Cited

U.S. PATENT DOCUMENTS

| 4,484,230 A |   | 11/1984 | Pugsley ........................ 358/447 |
| 4,571,635 A |   | 2/1986  | Mahmoodi et al. .......... 358/510 |
| 4,841,374 A |   | 6/1989  | Kotani et al. ................ 382/237 |
| 5,134,503 A |   | 7/1992  | Kimura ........................ 358/447 |
| 5,506,699 A | * | 4/1996  | Wong .......................... 358/3.08 |
| 5,649,031 A |   | 7/1997  | Nakamura et al. ........... 382/254 |
| 5,821,915 A | * | 10/1998 | Graham et al. .............. 382/260 |

FOREIGN PATENT DOCUMENTS

| JP | 5-344339  | 12/1993 |
| JP | 6-14191   | 1/1994  |
| JP | 06343129  | 12/1994 |
| JP | 063443129 | 12/1994 |
| JP | 07274018  | 10/1995 |

OTHER PUBLICATIONS

European Search Report dated Jun. 28, 2002 and forwarding letter from associate.

* cited by examiner

Primary Examiner—Thomas D. Lee
(74) Attorney, Agent, or Firm—Dike, Bronstein, Roberts & Cushman/ Edwards & Angell; David G. Conlin

(57) ABSTRACT

An object of the present invention is to avoid such a problem that white dropouts and the Moire phenomenon occur in a filter-processed image. A filter unit employed in an image processing apparatus provided within a copying machine first selects as a pixel of interest any one of a plurality of reversed density pixels which constitute an image to be processed. Next, the filter unit uses density of this interest pixel before being corrected, density of pixels located at peripheral portions of this interest pixel, and a predetermined filter coefficient so as to calculate a weighted average value for each of the density. Finally, the filter unit compares the density of this interest pixel before being corrected with the weighted average values to output as a corrected density of this interest pixel, such a value approximated to a density equivalent to a black level. Furthermore, the filter unit compares the density of the interest pixel before being corrected with the predetermined reference density and, only when the density before being corrected is less than the reference density, it outputs the above-described weighted average value as the corrected density of this interest pixel irrespect to such a large/small relationship between the density before being corrected and the weighted average value.

18 Claims, 32 Drawing Sheets

F I G. 13
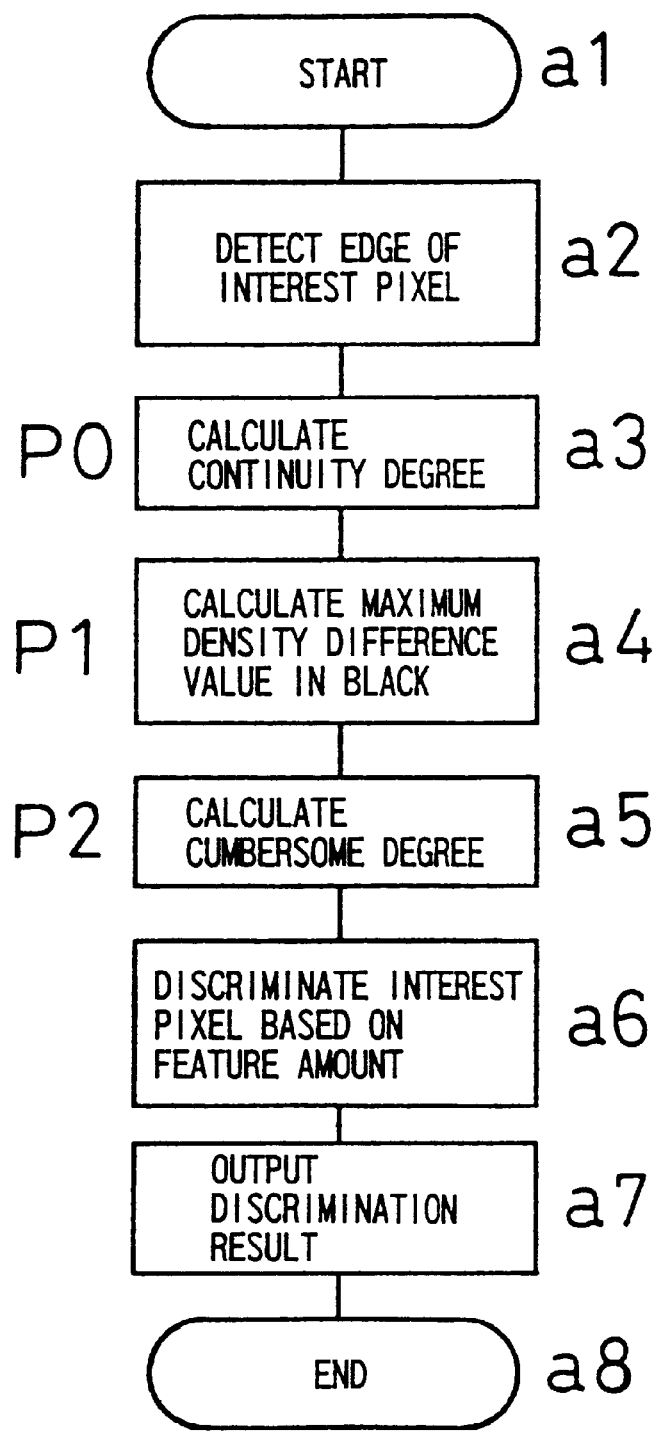

司円用内切制割判別力加

発人入何優佐付任係伊作

仕以会合余令命今全倉念

FIG. 19
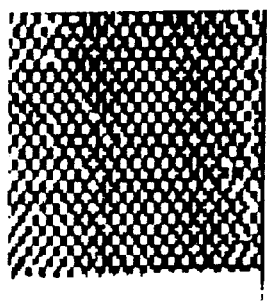 
司円用内切制割判別力加
発人入何優佐付任係伊作
仕以会合余令命今全倉念

FIG. 30  PRIOR ART
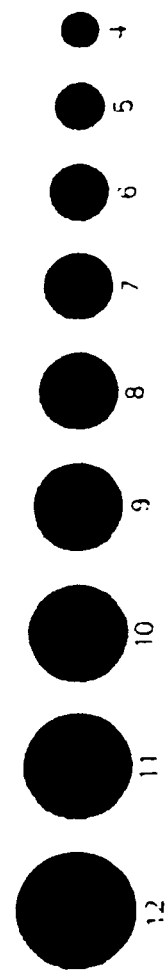

FIG. 32A PRIOR ART

| Img0 | Img1 | Img2 |
|---|---|---|
| Img3 | Img4 | Img5 |
| Img6 | Img7 | Img8 |

FIG. 32B PRIOR ART

| F0 | F1 | F2 |
|---|---|---|
| F3 | F4 | F5 |
| F6 | F7 | F8 |

FIG. 33 PRIOR ART

| -3 | 0 | -3 |
|---|---|---|
| 0 | 13 | 0 |
| -3 | 0 | -3 |

IMAGE PROCESSING APPARATUS

BACKGROUND OF THE INVENTION

1. Field of the Invention

The present invention relates to an image processing apparatus for performing an optimum process with respect to an image signal acquired by scanning an original so as to reproduce this original with complete fidelity.

2. Description of the Related Art

Very recently, so-called "digital composite machines" constituted by adding scanners to printers have been actively developed. Among the presently available digital composite machines, such digital composite machines having a major object to reduce manufacturing cost thereof are normally equipped with so-called "low-resolution CCD line sensors" as imaging elements of input apparatuses for scanning the above-described original. This low-resolution CCD line sensor owns low resolution on the order of 400 dpi. Also, the above-described digital composite machines can hardly employ a so-called "5-set lens" as the lens system of the above-described input apparatus. This 5-set lens system is usually employed in a high-class digital composite machine. This is because the component cost of this lens system would be increased in the case where the above-explained 5-set lens is employed. As a consequence, the presently developed digital composite machines have employed as the above lens system, a so-termed "3-set lens" capable of having a simple lens structure and also of reducing component cost.

The above-described input apparatus scans an original to produce an image signal. The resolution of the image indicated by this image signal is made equal to the resolution of the above-explained imaging element. As a result, the digital composite machine converts the resolution of this image signal into so-termed "high resolution" on the order of 600 dpi by way of a so-called "ASIC". In the case where the digital composite machine having such an arrangement is used to scan an original so as to produce an image signal and so-called "7-class characters" are written on this original, since the MTF (Modulation Transfer Function) of the above-described input apparatus is very deteriorated, there are many possibilities that the 7-class characters of the image represented by the image signal would be blurred.

FIG. 29 is a schematic block diagram for showing an arrangement of a first conventional digital composite machine 1. This first conventional digital composite machine 1 contains an imaging element 3, an A/D converter 4, an image processing apparatus 5, and an LSU 6. In FIG. 29, as a functional structure of the image processing apparatus 5, processes carried out in the image processing apparatus 5 are expressed by blocks, and a flow of an image signal is indicated by an arrow. The image is an analog signal when this image signal is outputted from the imaging element 3, namely a CCD line sensor. This analog image signal is quantized by the A/D converter 4 to become, for example, an 8-bit digital signal. The quantized image signal is supplied to the image processing apparatus 5. The image processing apparatus 5 first performs a so-called "shading process" 7 and a visual sensitivity correcting process 8 with respect to the quantized image signal. Next, this image processing apparatus 5 carries out both a density reversing process 9 suitable for the technical specification of the LSU 6, and a gamma converting (correcting) process 10 fitted to an output characteristic of a printer with respect to the image signal which has been processed by the visual sensitivity correcting process. Furthermore, the image processing apparatus 5 performs a resolution converting process 11 for the gamma-corrected image signal in order to convert resolution of an image indicated by this image signal in connection with the resolution of the printer. Finally, the image processing apparatus 5 performs a half tone processing operation 12 for the image signal which has been processed by the resolution converting process.

As previously explained, the first conventional digital composite machine 1 hardly perform any process for the image signal acquired from the imaging element 3 except for the processes required to fit this image signal to the technical specifications of the printer and the LSU. FIG. 30 represents an image indicated by such an image signal acquired by the digital composite machine 1 in accordance with the above-explained sequential process by scanning a test original in which a so-called "halftone dot photograph" of 133 lines is mixed with a black solid portion and a 7-class character. A black solid portion implies such a portion composed of only by pixels which may be seen as real black by a person. It should be understood that a black-solid-displayed image portion within an image may be referred to as a black solid portion; an image portion for displaying a halftone dot photograph may be referred to as a halftone dot portion; and an image portion for displaying a character may be referred to as a character portion. As represented in FIG. 30, the 7-class character is displayed under blurring condition within this image. As previously explained, one of reasons for such blurred characters is known as follows. That is, since the input apparatus of the digital composite machine 1 designed to lower the manufacturing cost owns the deteriorated MTF, the lines cannot be printed out under clear conditions. As a consequence, in the presently available digital composite machines, this MTF may be improved due to the electronic filtering process additionally combined with a plurality of the above-explained processes.

FIG. 31 is a schematic block diagram for representing an arrangement of a second conventional digital composite machine 14 for preforming an electronic filtering process. Compared with the first conventional digital composite machine 1, this second conventional digital composite machine 14 owns a different structure that the above-explained electronic filtering process 16 is interposed between the density reversing process 9 and the gamma correcting process 10 of the functional structure employed in the image processing apparatus 15. Other structural elements of this second conventional digital composite machine 14 are identical to those of the first conventional digital composite machine 1. It should also be noted that the same reference numerals shown in the first conventional digital composite machine 1 will be employed as those for denoting the same, or similar structural elements of the second conventional digital composite machine 14, and descriptions thereof are omitted.

Referring now to FIG. 32A and FIG. 32B, a description will be made of an electronic filtering process. First, a selection is made of, as a pixel of interest 17, any one of plural pixels which constitute an image indicated by an image signal which has been processed by a density reversing process. Next, a plurality of pixels located around this interest pixel, a so-called "8-near pixel" are selected as peripheral pixels 18. FIG. 32A is a schematic diagram for representing a positional relationship between the pixel of interest 17 and the peripheral pixels 18. Subsequently, a corrected density "Img 4*" is calculated based upon the below-mentioned formula by using a density "Img 4" of the interest pixel 17, and also the respective densities "Img 0 to Img 3"and "Img 5 to Img 8" of the peripheral pixels 18, and furthermore, filter coefficients "F0" to "F8" of the respective pixels defined by a preset filter. FIG. 32B indicates a corresponding relationship among the interest pixel 17, the peripheral pixels 18, and the filter coefficients F0 to F8. Furthermore, the density "Img 4" of the interest pixel 17 is replaced by the corrected density "Img 4*". The above-explained process is repeatedly performed while changing any one of the above-described pixels until all of the pixels are selected one time as the interest pixel 17. As a result, the above-explained electronic filtering process is performed for the above-explained image.

$$Img4 \ast= \left(\sum_i (Imgi \times Fi)\right) / \left(\sum_i Fi\right) \quad (1)$$

The above-explained filter owns the different filter coefficients F0 to F8, depending upon the filtering purpose. For example, a filter indicated in FIG. 33 is designed so as to improve the MTF, and contains the edge enhancement component.

FIG. 34 is an image indicated by such an image signal which is produced by processing the test original explained in FIG. 30 in accordance with the above-described sequential operation by the above-described digital composite machine 14. In comparing the image of FIG. 30 with the image of FIG. 34, since the 7-class characters are emphasized in the image of FIG. 34 by additionally providing the electronic filtering process, these characters appear as being floated from the surface of this image. However, the waving pattern, namely the Moire phenomenon occurs in the halftone dot photograph portion within the image shown in FIG. 34. This Moire pattern is caused by the fact that since the edge enhancement component of the filter is strong, the arranging period of the halftone dots for constituting the halftone dot photograph may interfere with the period of the filter. Also, so-called "white dropouts" occur in the black solid portion within the image of FIG. 34. This white dropouts problem is caused by the below-mentioned reason. That is, the difference among the densities of the plural pixels contained in the black solid portion becomes larger than the above-described difference of the pixels before being corrected, because the visual sensitivity correcting process is carried out. As a result, an inclination is produced in the curved line indicating the density distribution of the pixels contained in the black solid portion. When the above-described electronic filtering process is performed for the image by employing the filter, since the inclination of this curved line is emphasized, so-called "white dropouts" readily occur in pixels corresponding to such an inclination portion of the curved line within the black solid portion. As previously explained, when both the characters and the halftone dot photograph are displayed on the image to be processed, it is practically difficult to achieve two objects at the same time, namely to make the characters clear, and to prevent the occurrence of the Moire phenomenon in the halftone dot photograph.

Japanese Unexamined Patent Publication JP-A 5-344339 (1993) discloses a first conventional technique in connection with making characters clear and preventing the occurrence of the Moire phenomenon. That is, the image processing apparatus described in this application owns the object to avoid the change in the overall image density caused by the edge enhancement process and also to avoid the deterioration of the image quality caused by this density change. Furthermore, this application owns another object to maintain the sharpness of the characters and the gradation characteristic of the pictorial patterns without introducing a so-called "area separating process" for the image. To achieve these objects, this conventional image processing apparatus performs the filtering processes for the respective density of the pixels which constitute the image by employing the calculating devices in order to edge-emphasize the image indicated by the digital image signal. Subsequently, the conventional image processing apparatus removes the outputs derived from the calculating device as the error portions, namely the overflow portion and the underflow portion of the density of each pixel which has been filtered. Furthermore, the error portion of the density of each pixel is distributed to the pixels located at the peripheral portion of each pixel.

In the case where MTF of a digital image signal to be processed is relatively better, since the strengths of the edge enhancement components of the filter used in the filter processing operation can be weakened, the above-explained image processing apparatus disclosed in the application can prevent the image quality of the filtered image from being deteriorated, and furthermore can make the characters sharp/clear. However, when the MTF of this digital image signal is not better, since the strength of the edge enhancement component of the filter must be strengthened, this conventional image processing apparatus can hardly avoid both the following problems. That is, the white dropouts occur in the black solid portion of the filtered image, and also the Moire phenomenon occurs in the halftone dot photograph.

To avoid two problems, namely the white dropouts in the black solid portion contained in the filtered image and the occurrence of the Moire phenomenon in the filtered image, the image to be processed must be correctly separated into the character portion, the black solid portion, and the halftone dot photograph portion. Then, these three image portions are required to be filtered by way of the optimum filtering means. However, when the image to be processed is correctly separated into the three image portions, since a so-called "area separating process" would become complex, the cost of the digital composite machine would be necessarily increased.

Japanese Unexamined Patent Publication JP-A 6-14191 (1994) discloses a second conventional technique in connection with making characters clear and preventing the occurrence of Moire phenomenon. The publication discloses a processing apparatus for improving image quality comprising a halftone dot filter. The halftone dot filter is such constructed that smoothing processing is carried out for patterns where high density pixels are arranged in a slanting direction to a scanning direction such as a halftone dot area pattern and highlighting processing is carried out for patterns where high density pixels are arranged continuously in length and width directions to the scanning direction such as a character area pattern.

The processing apparatus for improving image quality further comprises detecting means for detecting a white pixel, a contour highlighting filter and pseudo halftone processing means. The white pixel detecting means detects a white pixel from a periphery of a pixel of interest in an image to be processed. Image data is fed to the halftone dot filter and the contour highlighting filter, respectively, to be processed in parallel. When there is no detection of white pixel, an output of the halftone dot filter is fed to the pseudo halftone processing means, and when there is a detection of white pixel, an output of the contour highlighting filter is fed to the pseudo halftone processing means.

In an image forming apparatus provided with a processing apparatus for improving image quality, precision of image area separation has a large influence on the finished quality of printed matter. Such a image forming apparatus requires, in addition to a filter, a circuit for area separation and a circuit for detecting a white pixel, and therefore there is a tendency to increase the manufacturing cost.

SUMMARY OF THE INVENTION

An object of the invention is to provide an image processing apparatus capable of mitigating a Moire phenomenon and also capable of preventing an occurrence of so-called "white dropouts" in a black solid portion of an image to be processed without carrying out an area separating process for this image, and further capable of clearly printing a relatively small character. Furthermore, another object of the present invention is to provide an image processing apparatus capable of avoiding such a problem that when the area separating process is carried out for the image to be processed and thereafter the above-described filtering process is performed for the area-separated image, even when the resultant image is erroneously separated into three image portions due to deteriorated precision of the area separating process, the erroneously separated image portion effectively appears in the filtered image.

The invention provides an image processing apparatus comprising:

area designating means for selecting any one of pixels as a pixel of interest, which are contained in an image composed of a plurality of reversed density pixels, to thereby designate as an area to be processed, an area contained in said image which is composed of a predetermined number of pixels including the pixel of interest;

average value calculating means for performing a weighted average calculation of density of all of the pixels within the area to be processed by employing a plurality of weighting coefficients corresponding to a positional relationship between each of the all pixels and the pixel of interest so as to thereby calculate weighted average values of the density of all of the pixels;

limiting means for limiting the weighted average values to be smaller than, or equal to a predetermined upper limit density and to be larger than, or equal to a predetermined lower limit density;

first comparing means for comparing the weighted average value limited by the limiting means with the density of the interest pixel; and density replacing means for replacing the density of the interest pixel by the weighted average value when the density of the interest pixel is less than the limited weighted average value, and also for maintaining the density of the interest pixel when the density of the interest pixel is more than, or equal to the limited weighted average value, in response to the comparison result of the first comparing means.

According to the invention, the image processing apparatus first calculates the above-described weighted average value which is limited. This weighted average value corresponds to the corrected density of the interest pixel when the conventional so-called filtering process has been performed for the image. Next, the image processing apparatus compares the weighted average value with the density of the interest pixel, and then corrects the density of the interest pixel based upon the comparison result in the above-explained manner. When all of the pixels contained in the image are selected as the pixels of interest to be processed by way of the above-explained process, the electronic filtering process featured by the present invention may be carried out for the above-described image. As a result, the corrected density of the interest pixel is always higher than, or equal to the density of this interest pixel before being corrected, but is not lower than the density of the interest pixel before being corrected. In other words, the corrected pixel of interest becomes darker than the interest pixel before being corrected.

For example, it is now assumed that the image to be processed is blurred, and furthermore, a small character made of a so-called "7-class character", a black solid portion, and a halftone dot photograph are represented on this image. In the case where the image is processed by employing the image processing apparatus according to the invention, the character can be made clear, and the Moire phenomenon occurred in an image portion of the image on which the halftone dot photograph is displayed can be reduced, as compared with the image which is processed by the conventional filtering process. Moreover, it is possible to prevent the occurrence of so-called "white dropouts" in the black solid portion of the image.

In the invention it is preferable that the image processing apparatus further comprises:

second comparing means for comparing the density of the interest pixel with a predetermined reference density; and the density replacing means further replaces the density of the interest pixel by the limited weighted average value in the case where the density of the interest pixel is less than the reference density in response to the comparison result obtained from the second comparing means.

According to the invention, the image processing apparatus is arranged by employing the above-described arrangement. As a consequence, when the density of this interest pixel before being corrected is lower than the reference density, the image processing apparatus replaces the density of the interest pixel by the weighted average value irrespective of such a large/small relationship between the density of this interest pixel before being corrected and the limited weighted average value. As a result, when the density of the interest pixel before being corrected is higher than, or equal to the reference density, the corrected interest pixel does not become brighter than the interest pixel before being corrected. However, there are some possibilities that when the density of the interest pixel before being corrected is lower than the reference density, the corrected interest pixel becomes brighter than the interest pixel before being corrected. In other words, when the density of the interest pixel before being corrected is lower than the reference density, this image processing apparatus carries out the conventional filter processing operation. As previously explained, this image processing apparatus properly selects the filtering process as explained above and the conventional filtering process in response to the large/small relationship between the reference density and the density of the interest pixel before being corrected.

For example, it is now assumed that the image to be processed is blurred, and furthermore, a small character made of a so-called "7-class character", a black solid portion, and a halftone dot photograph are represented on this image. In the case where the image is processed by employing the image processing apparatus according to the invention, the filtering process is carried out for a line of a character, a black solid portion, and a halftone dot photograph with a high density such as a 133-line point photograph, contained in this image. The conventional filtering process is carried out for the remaining portion of this image by the image processing apparatus of the invention. As a result, the image processing apparatus of the invention can more clearly display the character, and can prevent the so-called "white dropouts" in the black solid portion within the image. Moreover, this image processing apparatus can firmly prevent the occurrence of the Moire phenomenon in the halftone dot photograph with a high density such as the 133-line point photograph; when the enhancement filtering process is carried out, the Moire phenomenon can readily occur in this 133-line point photograph. Since the conventional filtering process is performed for the halftone dot photograph with a low density such as a 65-line point photograph, the resultant image can be clearly displayed.

In the invention it is preferable that the image processing apparatus further comprises:

separating means for separating the image to be processed into a character area for photographing a character, a halftone dot area for photographing a dotted picture represented by using a half tone image method, and a photograph area for photographing a photograph composed of pixels having gradation; and reference density setting means for selecting any one area in which the pixel of interest is included, from the character area, the halftone dot area, and the photograph area; and for setting the reference density used in the second comparing means in response to the selected area, the reference density which is set when the character area is selected is made higher than the reference density which is set when the photograph area is selected, and also the reference density which is set when the photograph area is selected is made higher than he reference density which is set when the halftone dot area is selected.

According to the invention, the image processing apparatus is realized by employing the above-described arrangement. As a consequence, the reference density is varied, depending upon such a condition as to whether or not the pixel of interest is included in any one of the character area, the halftone dot area, and the photograph area. The image processing apparatus according to the invention performs the filtering process as explained above for the image to be processed by employing the predetermined reference density. Assuming now that a small character having a so-called "7-class character", a black solid portion, and a halftone dot photograph area represented on the image, when the image processing apparatus according to the invention processes this image, the reference density defined when the pixel of interest is contained in the photograph area is made lower than the reference density defined when the pixel of interest is included in the character area. As a result, in the processed image, the gradation characteristic of the image portion which is composed of the pixels, the density of which before being corrected is relatively low, can be maintained, similar to the photograph area. Also, as a result, the character contained, in the processed image can be made sharp, the Moire phenomenon occurred in the halftone dot photograph portion within the image can be reduced. Moreover, the white dropouts in the black solid portion within the image can be avoided.

In the invention it is preferable that the image processing apparatus comprises:

image producing means for producing the image by scanning a surface of an original to be processed, and for varying a ratio of a dimension of the image to the original; and reference density setting means for setting the reference density used in the second comparing means in response to the ratio, and the higher the ratio becomes, the higher the reference density is set.

According to the invention, the image processing apparatus is realized by employing the above-explained arrangement. As a result, in response to the above-described ratio, namely either a so-called "enlarging ratio" or a so-termed "reducing ratio", the reference density is varied. This reason is given as follows. The larger this ratio becomes, namely the larger the image is enlarged, the stronger the image is blurred when this image is produced by the image producing means. As a consequence, if the conventional filtering process rather than the filtering process as explained above is carried out for such an image produced when the ratio is set to be a large value, then the image quality of the filter-processed image can be improved. On the other hand, when the ratio is set to be a small value, namely when the image is reduced, the blurring degree of the image produced from the image producing means is lower than that of the enlarged image. As a consequence, if the filtering process as explained above is carried out for such an image obtained when the ratio is set to be a small value, then the image quality of the processed image can be improved. As apparent from the foregoing descriptions, as previously explained, the image processing apparatus of the invention can properly select the filtering process in accordance with the ratio while varying the reference density in response to the ratio. As a consequence, the image quality of the processed image can become the optimum image quality in accordance with the ratio.

In the invention it is preferable that the image processing apparatus further comprises:

mode designating means for designating any one of a predetermined character mode for processing a character original and a predetermined photograph mode for processing a photograph original; and reference density setting means for setting the reference density used in the second comparing means in response to the designated mode, and the reference density set when the character mode is designated is made higher than the reference density set when the photograph mode is designated.

According to the invention, the image processing apparatus is realized by the above-described arrangement. For example, the character mode and the photograph mode are designated by the operator, depending upon such a condition as to whether an original having a large number of characters, or another original having a large number of photographic portions is represented on the image to be processed. The reference density is varied in response to the designated mode. This reason is given as follows. When the character mode rather than the photograph mode is selected, the filtering effect of the filtering process as explained in the above is made stronger. As a result, it can be expected that the image quality of the processed image can be furthermore improved. Under such a circumstance, since the image processing apparatus of the invention varies the reference density in response to the designated mode, the effect of the filtering process is changed in response to the designated mode. As a result, the image quality of the processed image can become optimum image quality suitable for the designated mode.

In the invention it is preferable that the image processing apparatus further comprises:

mode designating means for designating any one of a predetermined character mode for processing a character original and a predetermined mixed original mode for processing an image on which both a character and photograph are photographed; and reference density setting means for setting the reference density used in the second comparing means in responses to the designated mode, and the reference density set when the character mode is designated is made higher than the reference density set when the mixed original mode is designated.

According to the invention, the image processing apparatus is realized by the above-described arrangement. For example, the character mode and the mixed original mode are designated by the operator, depending upon such a condition as to whether an original having large number of characters, or another original having a 50-to-50 percent of photographic/character portions is represented on the image to be processed. Under such a circumstance, since the image processing apparatus of the invention varies the reference density in response to the designated mode, the effect of the filtering process is changed in response to the designated mode. As a result, the image quality of the processed image can become an optimum image quality suitable for the designated mode.

In the invention it is preferable that this image processing apparatus further comprises:

mode designating means for designating any one of a predetermined mixed original mode for processing an image on which both a character and a photograph are photographed, and a predetermined photograph mode for processing a photograph original; and reference density setting means for setting the reference density used in the second comparing means in response to the designated mode, and the reference density set when the mixed original mode is designated is made higher than the reference density set when the photograph mode is designated.

According to the invention, the image processing apparatus is realized by the above-described arrangement. For example, the mixed original mode and the photograph mode are designated by the operator, depending upon such a condition as to whether both the character and the photograph are displayed on the image to be processed in a better balance, or the photograph is mainly displayed on this image to be processed. Under such a circumstance, since the image processing apparatus of the invention varies the reference density in response to the designated mode, the effect of the filtering process is changed in response to the designated mode. As a result, the image quality of the processed image can become an optimum image quality suitable for the designated mode.

In the invention it is preferable that the image processing apparatus further comprises:

image producing means for producing the image by scanning a surface of an original to be processed, and for varying a ratio of a dimension of the image to the original;

separating means for separating the image to be processed into a character area for photographing a character, a halftone dot area for photographing a dotted picture represented by using a half tone image method, and a photograph area for photographing a photograph composed of pixels having gradation; and reference density setting means for selecting any one area containing the pixel of interest from the character area, the halftone dot area, and the photograph area, and also for setting the reference density used by the second comparing means in response to the selected area and the selected ratio, the higher the ratio becomes, the higher the reference density is set; the reference density set when the character area is selected is made higher than the reference density set when the photograph area is selected, and the reference density set when the photograph area is selected is made higher than the reference density set when the halftone dot area is selected.

According to the invention, the image processing apparatus is realized by employing the above-described arrangement. As a consequence, in the image processing apparatus the filtering process as explained above is carried out for the image to be processed by employing the reference density determined based upon both the area containing the interest pixel and the ratio. As a result, the image quality of the processed image can become an optimum image quality suitable for the above-described two conditions.

In the invention it is preferable that the image processing apparatus further comprises:

image producing means for producing the image by scanning a surface of an original to be processed, and for varying a ratio of a dimension of the image to the original;

mode designating means for designating any one of a predetermined character mode for processing a character original and a predetermined photograph mode for processing a photograph original; and reference density setting means for setting the reference density employed in the second comparing means in response to the designated mode and the ratio, the higher the ratio becomes, the higher the reference density is set; and the reference density set when the character mode is designated is made higher than the reference density set when the photograph mode is designated.

According to the invention, the image processing apparatus is realized by employing in the above-described arrangement. As a consequence, in the image processing apparatus the filtering process as explained above is carried out for the image to be processed by employing the reference density determined based upon both the ratio and the designated mode. As a result, the image quality of the processed image can become an optimum image quality suitable for the above-described two conditions.

In the invention it is preferable that the image processing apparatus further comprises:

image producing means for producing the image by scanning a surface of an original to be processed, and for varying a ratio of a dimension of the image to the original;

mode designating means for designating any one of a predetermined character mode for processing a character original and a predetermined mixed original mode for processing an image on which both a character and photograph are photographed; and reference density setting means for setting the reference density used by the second comparing means in response to the designated mode and the ratio, and the higher the ratio becomes, the higher the reference density is set; and the reference density set when the character mode is designated is made higher than the reference density set when the mixed original mode is selected.

According to the invention, the image processing apparatus is realized by employing the above-described arrangement. As consequence, in the image processing apparatus the filtering process as explained above is carried out for the image to be processed by employing the reference density determined based upon both the designated mode and the ratio. As a result, the image quality of the processed image can become an optimum image quality suitable for the above-described two conditions.

In the invention it is preferable that the image processing apparatus further comprises:

image producing means for producing the image by scanning a surface of an original to be processed, and for varying a ratio of a dimension of the image to the original;

mode designating means for designating any one of a predetermined mixed original mode for processing an image on which both a character and a photograph are photographed, and a predetermined photograph mode for processing a photograph original; and reference density setting means for setting the reference density used by the second comparing means in response to the designated mode and the ratio, the higher the ratio becomes, the higher the reference density is set, and the reference density set when the mixed original mode is designated is made higher than the reference density set when the photograph mode is designated.

According to the invention, the image processing apparatus is realized by employing the above-described arrangement. As consequence, in the image processing apparatus the filtering process as explained above is carried out for the image to be processed by employing the reference density determined based upon both the designated mode and the ratio. As a result, the image quality of the processed image can become an optimum image quality suitable for the above-described two conditions.

In the invention it is preferable that the image processing apparatus further comprises:

separating means for separating the image to be processed into a character area for photographing a character, a halftone dot area for photographing a dotted picture represented by using a half tone image method, and a photograph area for photographing a photograph composed of pixels having gradation; and mode designating means for designating any one of a predetermined character mode for processing a character original and a predetermined photograph mode for processing a photograph original; and reference density setting means for selecting any one area in which the pixel of interest is included, from the character area, the halftone dot area, and the photograph area; and for setting the reference density used in the second comparing means in response to the selected area and the designated mode, the reference density set when the character area is selected is made higher than the reference density set when the photograph area is selected; the reference density set when the halftone dot area is selected is made higher than the reference density set when the photograph area is selected, and also the reference density set when the character mode is designated is made higher than the reference density set when the photograph mode is designated.

According to the invention, the image processing apparatus is realized by employing the above-described arrangement. As a consequence, in the above-explained image processing apparatus the filtering process as described above is carried out for the image to be processed by using the reference density determined based upon the area containing the interest pixel and the designated mode. As a result, the image quality of the processed image can become an optimum image quality suitable for the above-explained two conditions.

In the invention it is preferable that the image processing apparatus further comprises:

separating means for separating the image to be processed into a character area for photographing a character, a halftone dot area for photographing a dotted picture represented by using a half tone image method, and a photograph area for photographing a photograph composed of pixels having gradation; and mode designating means for designating any one of a predetermined character mode for processing a character original and a predetermined mixed original mode for processing an image on which both a character and photograph are photographed; and reference density setting means for selecting any one area in which the pixel of interest is included, from the character area, the halftone dot area, and the photograph area; and for setting the reference density used in the second comparing means in response to the selected area and the designated mode, the reference density set when the character area is selected is made higher than the reference density set when the photograph area is selected; the reference density set when the halftone dot area is selected is made higher than the reference density set when the photograph area is selected, and also the reference density set when the character mode is designated is made higher than the reference density set when the mixed original mode is designated.

According to the invention, the image processing apparatus is realized by employing the above-described arrangement. As a consequence, in the above-explained image processing apparatus the filtering process as described above is carried out for the image to be processed by using the reference density determined based upon the area containing the interest pixel and the designated mode. As a result, the image quality of the processed image can become an optimum image quality suitable for the above-explained two conditions.

In the invention it is preferable that the image processing apparatus further comprises:

separating means for separating the image to be processed into a character area for photographing a character, a halftone dot area for photographing a dotted picture represented by using a half tone image method, and a photograph area for photographing a photograph composed of pixels having gradation; and mode designating means for designating any one of a predetermined mixed original mode for processing an image on which both a character and a photograph are photographed, and a predetermined photograph mode for processing a photograph original; and reference density setting means for selecting any one area in which the pixel of interest is included, from the character area, the halftone dot area, and the photograph area, and for setting the reference density used in the second comparing means in response to the selected area and the designated mode, the reference density set when the character area is selected is made higher than the reference density set when the photograph area is selected; the reference density set when the halftone dot area is selected is made higher than the reference density set when the photograph area is selected, and also the reference density set when the mixed original mode is designated is made higher than the reference density set when the photograph mode is designated.

According to the invention, the image processing apparatus is realized by employing the above-described arrangement. As a consequence, in the above-explained image processing apparatus the filtering process as described above is carried out for the image to be processed by using the reference density determined based upon the area containing the interest pixel and the designated mode. As a result, the image quality of the processed image can become an optimum image quality suitable for the above-explained two conditions.

In the invention it is preferable that the image processing apparatus further comprises:

image producing means for producing the image by scanning a surface of an original to be processed, and for varying a ratio of a dimension of the image to the original;

separating means for separating the image to be processed into a character area for photographing a character, a halftone dot area for photographing a dotted picture represented by using a half tone image method, and a photograph area for photographing a photograph composed of pixels having gradation; and mode designating means for designating any one of a predetermined character mode for processing a character original and a predetermined photograph mode for processing a photograph original; and reference density setting means for selecting any one area in which the pixel of interest is included, from the character area, the halftone dot area, and the photograph area, and for setting the reference density used in the second comparing means in response to the selected area, the designated mode, and the ratio, the higher the ratio becomes, the higher the reference density is set; the reference density set when the character mode is designated is made higher than the reference density set when the photograph area is designated, the reference density set when the character area is selected is made higher than the reference density set when the photograph area is selected, and also the reference density set when the halftone dot area is selected is made higher than the reference density set when the photograph mode is selected.

According to the invention, the image processing apparatus is realized by employing the above-described arrangement. Accordingly, the reference density is varied in response to the ratio, the area containing the interest pixel, and the designated mode. As a consequence, in the above-explained image processing apparatus the filtering process as described above is carried out by using the reference density determined in this manner. As a result, the image quality of the processed image can become an optimum image quality suitable for the above-explained three conditions.

In the invention it is preferable that the image processing apparatus further comprises:

image producing means for producing the image by scanning a surface of an original to be processed, and for varying a ratio of a dimension of the image to the original;

separating means for separating the image to be processed into a character area for photographing a character, a halftone dot area for photographing a dotted picture represented by using a half tone image method, and a photograph area for photographing a photograph composed of pixels having gradation; and mode designating means for designating any one of a predetermined character mode for processing a character original and a predetermined mixed original mode for processing an image on which both a character and photograph are photographed; and reference density setting means for selecting any one area in which the pixel of interest is included, from the character area, the halftone dot area, and the photograph area; and for setting the reference density used in the second comparing means in response to the selected area, the designated mode, and the ratio, the higher the ratio becomes, the higher the reference density is set; the reference density set when the character mode is designated is made higher than the reference density set when the mixed original mode is designated, the reference density set when the character area is selected is made higher than the reference density set when the photograph area is selected, and also the reference density set when the halftone dot area is selected is made higher than the reference density set when the photograph mode is selected; and further the reference density set when the halftone dot area is selected is made higher than the reference density set when the photograph area is selected.

According to the invention, the image processing apparatus is realized by employing the above-described arrangement. Accordingly, the reference density is varied in response to the ratio, the area containing the interest pixel, and the designated mode. As a consequence, in the above-explained image processing apparatus the filtering process as described above is carried out by using the reference density determined in this manner. As a result, the image quality of the processed image can become an optimum image quality suitable for the above-explained three conditions.

In the invention it is preferable that the image processing apparatus further comprises:

image producing means for producing the image by scanning a surface of an original to be processed, and for varying a ratio of a dimension of the image to the original;

separating means for separating the image to be processed into a character area for photographing a character, a halftone dot area for photographing a dotted picture represented by using a half tone image method, and a photograph area for photographing a photograph composed of pixels having gradation; and mode designating means for designating any one of a predetermined mixed original mode for processing an image on which both a character and a photograph are photographed, and a predetermined photograph mode for processing a photograph original; and reference density setting means for selecting any one area in which the pixel of interest is included, from the character area, the halftone dot area, and the photograph area, and for setting the reference density used in the second comparing means in response to the selected area, the designated mode, and the ratio, the higher the ratio becomes, the higher the reference density is set; the reference density set when the mixed original mode is designated is made higher than the reference density set when the photograph mode is designated, the reference density set when the character area is selected is made higher than the reference density set when the photograph area is selected, and also the reference density set when the halftone dot area is selected is made higher than he reference density set when the photograph area is selected.

According to the invention, the image processing apparatus is realized by employing the above-described arrangement. Accordingly, the reference density is varied in response to the ratio, the area containing the interest pixel, and the designated mode. As a consequence, in the above-explained image processing apparatus the filtering process as described above is carried out by using the reference density determined in this manner. As a result, the image quality of the processed image can become an optimum image quality suitable for the above-explained three conditions.

In the invention it is preferable that colors of the respective pixels of the image are defined based on the density, the saturation, and the hue; and the average value calculating means, the first comparing means, and the density replacing means are carried out with respect to the density.

According to the invention, the image processing apparatus is operated in the above-explained manner when the image to be processed is a so-called "color image". As a result, the image processing apparatus of the invention can reduce the Moire phenomenon caused by the filtering process, and at the same time, can avoid the white dropouts occurred in the black solid portion contained in the image by employing the apparatus equipped with the relatively low cost structure.

As previously described, in accordance with the present invention, the image processing apparatus first calculates the weighted avenge value of the density of the interest pixel by executing the filtering process identical to the conventional filtering process. Only when the corrected density is lower than the density of this interest pixel before being corrected, this image processing apparatus replaces the density of the interest pixel before being processed by the weighted average value. As a consequence, in the image processed by the above image processing apparatus, the character can be made sharp, and furthermore, the Moire phenomenon occurred in the image portion for displaying the halftone dot photograph can be reduced. Furthermore, it is possible to avoid the occurrence of so-called "white dropouts" in the black solid portion contained in the above-described image.

Also, according to the present invention, the image processing apparatus further compares the density of the interest pixel before being corrected with predetermined reference density. In the case where the density of this interest pixel before being corrected is lower than the reference density, the image processing apparatus replaces the corrected density of this interest pixel by the weighted average value. As a consequence, in the image processed by the above image processing apparatus, the character can further be made sharp, and furthermore, the Moire phenomenon occurred in the image portion for displaying the halftone dot photograph can be reduced. Furthermore, it is possible to avoid the occurrence of so-called "white dropouts" in the black solid portion contained in the above-described image.

Furthermore, according to the present invention, the above-explained image processing apparatus sets the reference density in response to at least one of the ratio of the original to the image to be processed, the mode corresponding to the original, and the feature amount of the area within the image where the interest pixel is included. As a result, the image processing apparatus can optimize the image quality of the processed image in accordance with at least one condition employed to set the reference density among the three conditions.

Also, according to the present invention, the above-described image processing apparatus performs the above-explained filtering process with respect to the density for the three elements used to define the colors of the pixel in such a case as the image to be processed is the color image. As a consequence, even when the image to be processed is the color image, the above-explained image processing apparatus can reduce the Moire phenomenon caused by correcting the density of the pixel, and at the same time, can avoid the occurrence of the white dropouts in the black solid portion within the image.

BRIEF DESCRIPTION OF THE DRAWINGS

Other and further objects, features, and advantages of the Invention will be more explicit from the following detailed description taken with reference to the drawings wherein:

FIG. 13 is a flow chart for describing an area separating process carried out by an area separating unit 83 provided in the image processing apparatus 82 of the third embodiment;

FIG. 19 shows a partially enlarged diagram of the image indicated in FIG. 17;

FIG. 30 represents the image produced by scanning the predetermined test original by the first conventional copying machine 1;

FIG. 32A and FIG. 32B are explanatory diagrams for explaining the filtering process carried out by the filter unit 16 employed in the second conventional image processing apparatus 15;

FIG. 33 illustratively shows the filters employed in the filter unit 16 employed in the second conventional image processing apparatus 15.

DETAILED DESCRIPTION OF THE PREFERRED EMBODIMENTS

Figure 1:
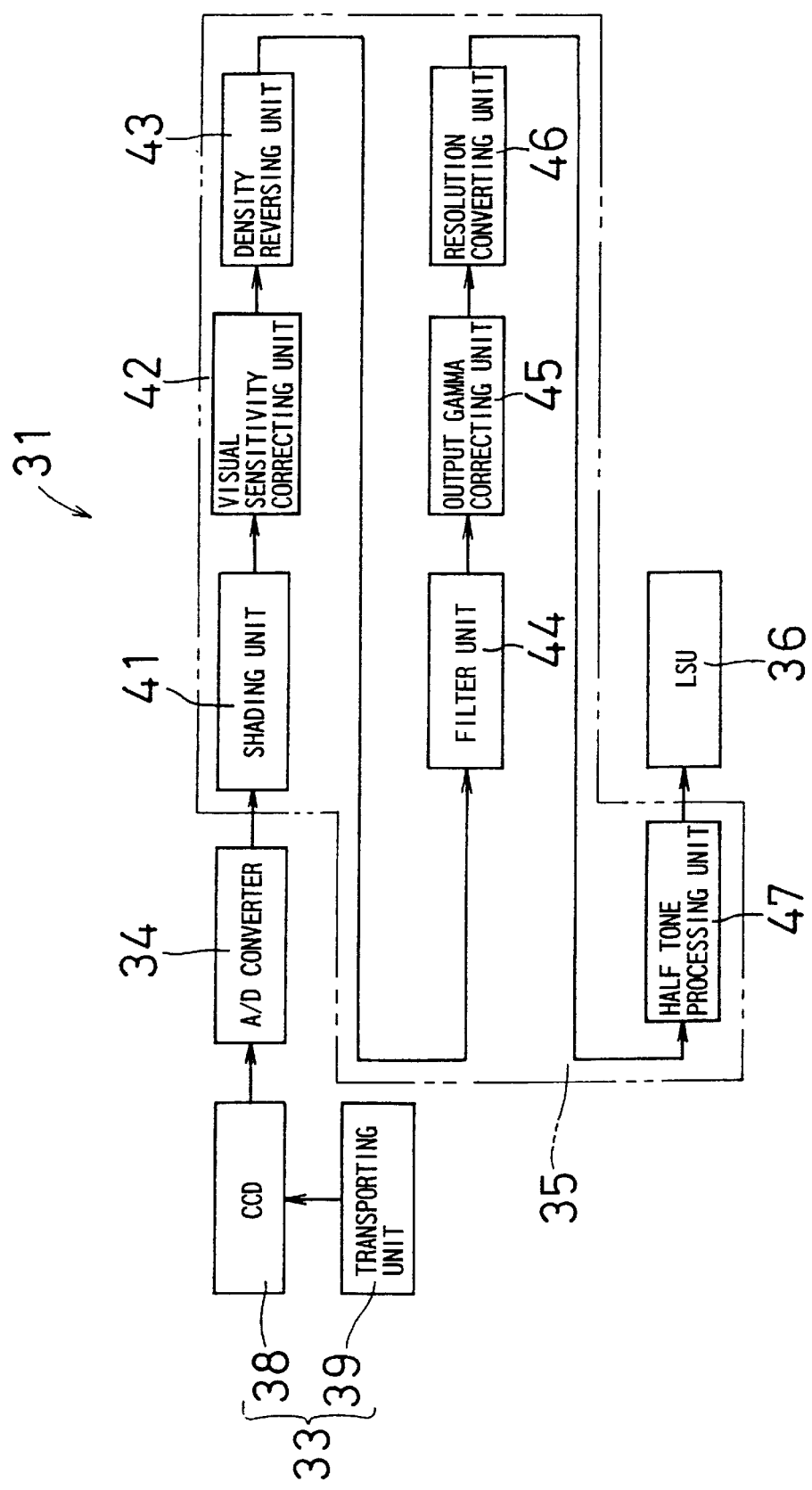
FIG. 1 is a schematic block diagram for indicating an electronic arrangement of a copying machine 31 containing an image processing apparatus 35 according to a first embodiment mode of the present invention.

Now referring to the drawings, preferred embodiments of the invention are described below.

FIG. 1 is a schematic block diagram for showing an electronic arrangement of a copying machine 31 containing an image processing apparatus 35 according to a first embodiment mode of the present invention. A copying machine 31 is a so-called "digital composite machine", and one of the major objects according to the present invention is to reduce entire system cost of this copying machine 31. Generally, the copying machine 31 optically scans a surface of an original to be scanned so as to produce an image signal. Then, this copying machine 31 performs a predetermined process with respect to this produced image signal, and prints the content of the processed image signal, namely an image indicative of image data on a surface of a recording paper. To this end, the copying machine 31 contains a scanning apparatus 33, an A/D (analog-to-digital) converter 34, an image processing apparatus 35, and a laser scanning unit (will be abbreviated as an "LSU" hereinafter) 36. The LSU 36 is included in a printing apparatus used to print out image data on a recording paper.

The image processing apparatus 35 performs various sorts of processes in order to improve an image quality of an image indicated by this image data. The image processing apparatus 35 functionally contains a shading unit 41, a visual sensitivity correcting unit 42, a density (concentration) reversing unit 43, a filter unit 44, an output gamma correcting unit 45, a resolution converting unit 46, and a half tone processing unit 47. The above-described respective units 41 to 47 employed in the image processing apparatus 35 correspond to functional arrangements of the image processing apparatus 35, and may be realized by calculation processes of calculation circuits equipped in this image processing apparatus 35. Alternatively, these units 41 to 47 may be realized by way of circuits capable of realizing the respective processes carried out in the respective units 41 to 47.

A detailed description will now be made of the copying machine 31.

The above-explained scanning apparatus 33 optically scans the surface of the above-described original so as to produce an analog signal indicative of an image for imaging this surface, namely an analog image signal. To produce such an analog image signal, the scanning apparatus 33 contains an imaging element 38 and a transporting unit 39. The imaging element 38 may be realized by a one-dimensional CCD line sensor constituted by such a structure that a plurality of light receiving elements are arrayed along a straight line. The transporting unit 39 transports a portion of the above-described original, which is imaged by the imaging element 38, along a predetermined direction and at a predetermined speed (velocity). It should be understood that a lens system containing either one or plural lenses may be interposed between the imaging element 38 and the surface of the original. Subsequently, it should be defined that a direction along which the above-explained plural light receiving elements are arrayed will be referred to as a "main scanning direction", whereas another direction along which the above-explained portion to be imaged is transported will be referred to as a "sub-scanning direction". The main scanning direction is positioned perpendicular to the sub-scanning direction. Furthermore, a plurality of pixels which are arrayed within the above-explained image along the main scanning direction may also be referred to as "pixels for 1 line". While the portion of the original to be imaged is transported by a transporting unit 39, the imaging element 38 sequentially images the surface of this original. As a result, the above-explained analog image signal is obtained.

The A/D converter 34 quantizes the above-described analog image signal acquired by the scanning apparatus 33. As a result, this analog image signal is A/D-converted to produce image data. The image data is a digital data set indicative of an image for imaging the surface of the original, and is composed of a plurality of pixel data sets. A plurality of pixel data sets are a data set corresponding to the respective plural pixels for constituting the image, and represent the respective colors of the corresponding pixels. In the below-mentioned description, it is assumed that the above-described image corresponds to a monochrome image, and also the respective pixel data sets indicate densities (concentrations) of the corresponding pixels. Also, a range allowable to the above-explained density, namely an effective range of the density is previously determined, depending upon the technical specification of the copying machine 31. It should be noted that such density equivalent to the brightest color, namely a density equivalent to a white color within the effective density range may be referred to as a "white level", whereas such density equivalent to the darkest color within the effective density range, namely such density equivalent to a black color may be referred to as a "black level". For example, one piece of the above-described pixel data corresponds to a set of 8-bit data, and the effective density range is selected to be larger than, or equal to "0", and be smaller than, or equal to "255". Another assumption is made as follows. When image data is derived from the A/D converter 34, the higher the density becomes, the brighter the pixel becomes. In other words, the higher the density becomes, the brighter the pixel becomes, so that the color of this pixel is approximated to the white color.

The shading unit 41 carries out the shading process with respect to the image data outputted from the A/D converter 34. This shading process is carried out so as to make the white levels of the plural pixels equal to the black levels of these pixels, which are arranged along the main scanning direction within the image. The reason why such a shading process is required is given as follows. That is, there are fluctuations in the photoelectric characteristics of the plural light receiving elements employed in the imaging element 38. As a consequence, when a portion of the above-described original is imaged by the imaging element 38, the white levels of the plural pixels may be fluctuated. Also, a plurality of imaging rays reflected on the surface of the above-described original may be refracted within the above-described lens system until these reflected rays are received by a plurality of light receiving areas of the imaging element 38 during the above-described imaging operation. As a result, a difference may be produced in lengths of optical paths of the plural rays, which are defined from the surface of the original up to the light receiving areas. When a comparison is made of white levels of the plural pixels, a white level of one pixel may be lowered from that of another pixel due to the difference in the optical paths. Under such a circumstance, the white levels of the plural pixels and the black levels thereof are different from each other. As a consequence, the shading unit 41 carries out the shading process for the image data, so that the white levels of the plural pixels and the black levels thereof are made equal to each other.

Next, the visual sensitivity correcting unit 42 performs the visual sensitivity correcting process with respect to the shading-processed image data. The reason why such a visual sensitivity correcting process is carried out is given as follows. That is, a photoelectric converting characteristic of a plurality of light receiving areas of the imaging element 38 represents such a linear characteristic with respect to a light amount of incident light. In other words, in the linear characteristic, the density indicated by the above-explained pixel data is increased in proportion to the increase in the above light amount. To the contrary, a human eye owns such a visual characteristic, namely, a logarithmic characteristic with respect to a light amount of incident light. As a result, it is useful to execute the image processing operation in such a manner that the relationship between the density of the pixel of the image data and the density of the portion of the original, which corresponds to this pixel is set to the relationship approximated to feelings of a human eye. Under such a circumstance, the above-explained visual sensitivity correcting process is carried out.

Specifically, the visual sensitivity correcting unit 42 digitally converts the image data which has been shading-processed by using a logarithm function as the above-explained visual sensitivity correcting process. To reduce cost required to execute the above-described visual sensitivity correcting process, the visual sensitivity correcting unit 42 may employ a so-called "one-dimensional lookup table (1D-LUT)". A one-dimensional lookup table is such a table that a plurality of input values are set in correspondence with a plurality of output values in an one-to-one relationship. In the one-dimensional lookup table used to perform the visual sensitivity correcting process, the input value corresponds to a density of a pixel and the output value corresponds to a density which should be replaced by the above-described density. When the one-dimensional lookup table is employed, the visual sensitivity correcting unit 42 converts the density indicated by a plurality of image data sets for constituting the image data with reference to the one-dimensional lookup table.

The density reversing unit 43 carries out the density reversing process with respect to the image data which has been corrected by the visual sensitivity correcting unit. Specifically, the density reversing unit 43 reverses a relationship between the density of a plurality of pixel data sets for constituting the above-described image data and the brightness of the pixels. As a result, the density equivalent to the black level becomes a maximum density within a density effective range, namely "255", whereas the density equivalent to the white level becomes a minimum density within the density effective range, namely "0". Therefore, the higher the density becomes, the darker the pixel becomes. This reason is given as follows: Generally, in an imaging element, the brighter a pixel becomes, the higher the density indicated by pixel data of this pixel becomes. In a printing apparatus, the higher the density indicated by pixel data becomes, the darker this pixel is printed out in a dark color. Thus, the relationship between the density and the brightness of the pixel when the pixel data is outputted from the imaging element is reversed with respect to the above-explained relationship when the pixel data is printed out by the printing apparatus. As a consequence, in order to match the image data which has been processed by the visual sensitivity correcting process with the technical specification of the LSU 36, the relationship between the brightness of the pixel and the density of this pixel should be reversed before the pixel data is supplied to the printing apparatus.

The filter unit 44 performs a predetermined filtering process with respect to the image data which has been processed by the density reversing process. The detailed content of this filtering process will be explained later. The output gamma correcting unit 45 carries out such a gamma correcting process matched with the gradation characteristic of the LSU 36 with respect to the image data which has been processed by the filtering process. In other words, the gamma correcting process is matched with the gradation characteristic of the printing apparatus employed in the copying machine 31. The reason why the gamma correcting process is required is given as follows: The above-described gradation characteristic and the reproducible density range of the LSU 36 are different from each other, depending upon the technical specifications thereof. This reproducible density range may be determined based upon, for instance, the beam diameter/strength of the laser beam scanned over the surface of the photosensitive material, and also the particle diameter of the toner in the case where the LSU 36 employs a so-called "electronic photographic system". On the other hand, when the LSU 36 employs a so-termed "ink jet system", the reproducible density range may be determined based on the dimension of the jetted ink droplet. As a consequence, in accordance with the technical specification of this LSU 36, the density indicated by each of the plural pixel data for constituting the image data must be converted into the density within the reproducible density range by the printer. Under such a circumstance, the gamma correcting process is carried out with respect to the image data which has been processed by the above-explained filtering process. Specifically, this gamma correcting process may be performed by employing a one-dimensional lookup table which is previously formed in accordance with the technical specification of the LSU 36.

The resolution converting unit 46 carries out a resolution converting process with respect to the image data which has been corrected by the gamma correcting process. The reason why such a gamma correcting process is required is given as follows: In a digital composite machine having one major object to reduce cost thereof, there are many possibilities that the resolution of the scanning apparatus 33 is different from that of the LSU 36, and the resolution of the gamma-corrected image data is made equal to that of this scanning apparatus 33. As a result, such an interpolating process capable of matching resolution of image data with that of the LSU 36, namely the above-explained resolution converting process must be carried out.

The half tone processing unit 47 carries out a half tone processing operation with respect to the image data which has been processed by the resolution converting process. The reason why such a half tone processing operation is carried out is given as follows: Since the above-described image data is handled as a set of 8-bit image data from the shading unit 41 up to the resolution converting unit 46, this image data constitutes so-called "multi-value data", namely such a data set that each of the plural pixel data for constituting this image data has more than, or equal to 2 bits. In the copying machine 31 designed to reduce the cost thereof, as the laser generating source for determining the density of the above-described pixel to be printed out, a binary laser generating source may be usually employed which is capable of switching two conditions as to whether or not the laser is radiated. In the case where this binary laser generating source is utilized, a color of a pixel to be printed out corresponds to either black or white. Under such a circumstance, in order that the image indicated by the above-explained image data is printed out on the recording paper with complete fidelity, the half tone processing operation must be carried out with respect to this image data, so that the above-explained image must be represented in a so-called "half tone representation". To this end, the half tone processing unit 47 converts the image data which has been processed by the resolution converting process in the multi-value/binary converting manner so as to produce so-termed "binary data". This binary data implies that each of the plural pixel data for constituting the image data constitutes 1-bit data. As the half tone processing operation, the dither method and the error spscanning method are known in the field.

The image data which has been processed by the above-explained all processes is supplied from the image processing apparatus 35 to the LSU 36. It should be understood that the above-explained density reversing process, filtering process, output gamma correcting process, and resolution converting process may be carried out in accordance with not only the above-described execution sequence, but also other execution sequences. The LSU 36 intermittently radiates the laser beam in response to the image data in order to print out, on a recording paper, an image indicated by the image data to which various processing operations have been performed by the image processing apparatus 35. The schematic operations of the copying machine 31 have been described in the above explanations.

Generally, the filter unit 44 performs an electronic filtering process with respect to a plurality of pixel data sets which constitute the image data which has been processed by the above-explained density reversing process, respectively. The electronic filtering process with respect to one pixel data to be processed, namely pixel data about a pixel of interest is carried out in accordance with the below-mentioned manner.

First, any one of the plural pixels contained in the image indicated by the image data which has been processed by the density reversing process is selected as a pixel of interest, and also the plural pixels located around this pixel of interest are selected as peripheral pixels. Next, an average density "ImgAV" is calculated in accordance with the below-mentioned formula (2) by using a density "Img 4" of the pixel of interest before being corrected; the respective density "Img 0" to Img 3", Img 5" to "Img 8" of a plurality of peripheral pixels; and furthermore, filter coefficients F0 to F8 of the respective pixels defined by a preset filter. In addition, the density "Img 4" of the pixel of interest before being corrected is compared with the average density ImgAV. As a result of this comparison, as indicated in formula (3), when the density Img 4 of the pixel of interest before being corrected is higher than, or equal to the average density ImgAV, the density Img 4 of the pixel of interest before being corrected is maintained as a density "Img 4#" of the pixel of interest after being corrected. Also, when the density Img 4 of the pixel of interest before being corrected is less than the average density ImgAV, the density Img 4 of the pixel of interest before being corrected is replaced by the average density ImgAV as the density Img 4# of this pixel of interest after being corrected.

$$\text{ImgAV} = (\Sigma_i \, (\text{Imgi} \times \text{Fi})) \div (\Sigma_i \text{Fi}) \quad \text{--- (2)}$$
$$\text{Img 4\#} = \text{Img 4} \quad (\text{Img 4} \geq \text{ImgAV})$$
$$\text{Img 4\#} = \text{ImgAV} \quad (\text{Img 4} \geq \text{ImgAV}) \quad \text{--- (3)}$$

In the following descriptions, the below-mentioned assumption is made. That is, peripheral pixels correspond to 8 pixels located near a pixel of interest. Also, an area within an image, which is constituted by 9 pieces (namely 3 lines×3 columns) of pixels while centering the above-described pixel of interest, is selected as an area which should be processed by the above-explained electronic filtering process. An arrangement of the pixels within the area to be processed is indicated in a table 1. In this table 1, a rectangular shape located at a center corresponds to a pixel of interest, whereas 8 rectangular shapes located around this central rectangular shape correspond to the respective peripheral pixels. It should be understood that reference numeral "Img 4" is applied to the density of the pixel of interest, namely the pixel data corresponding to the pixel of interest, and reference numerals "Img 0 to Img 3" and "Img 5 to Img 8" are applied to the pixel data corresponding to each of the plural peripheral pixels. Also, positions with respect to the respective peripheral pixels and the pixel of interest are explained by using upper/lower/left/right positions in the table 1. It is also assumed that a relationship between the pixel of interest/plural peripheral pixels and the filter coefficients F0 to F8 is defined in a table 2. The above-described filter may own the filter coefficients F0 to F8, depending upon the filter purposes. It is further assumed that as the above-explained filter, such a filter shown in FIG. 31 and capable of improving the MTF (Modulation Transfer Function) is used.

TABLE 1

| Img 0 | Img 1 | Img 2 |
| Img 3 | Img 4 | Img 5 |
| Img 6 | Img 7 | Img 8 |

TABLE 2

| F0 | F1 | F2 |
| F3 | F4 | F5 |
| F6 | F7 | F8 |

Figure 2:
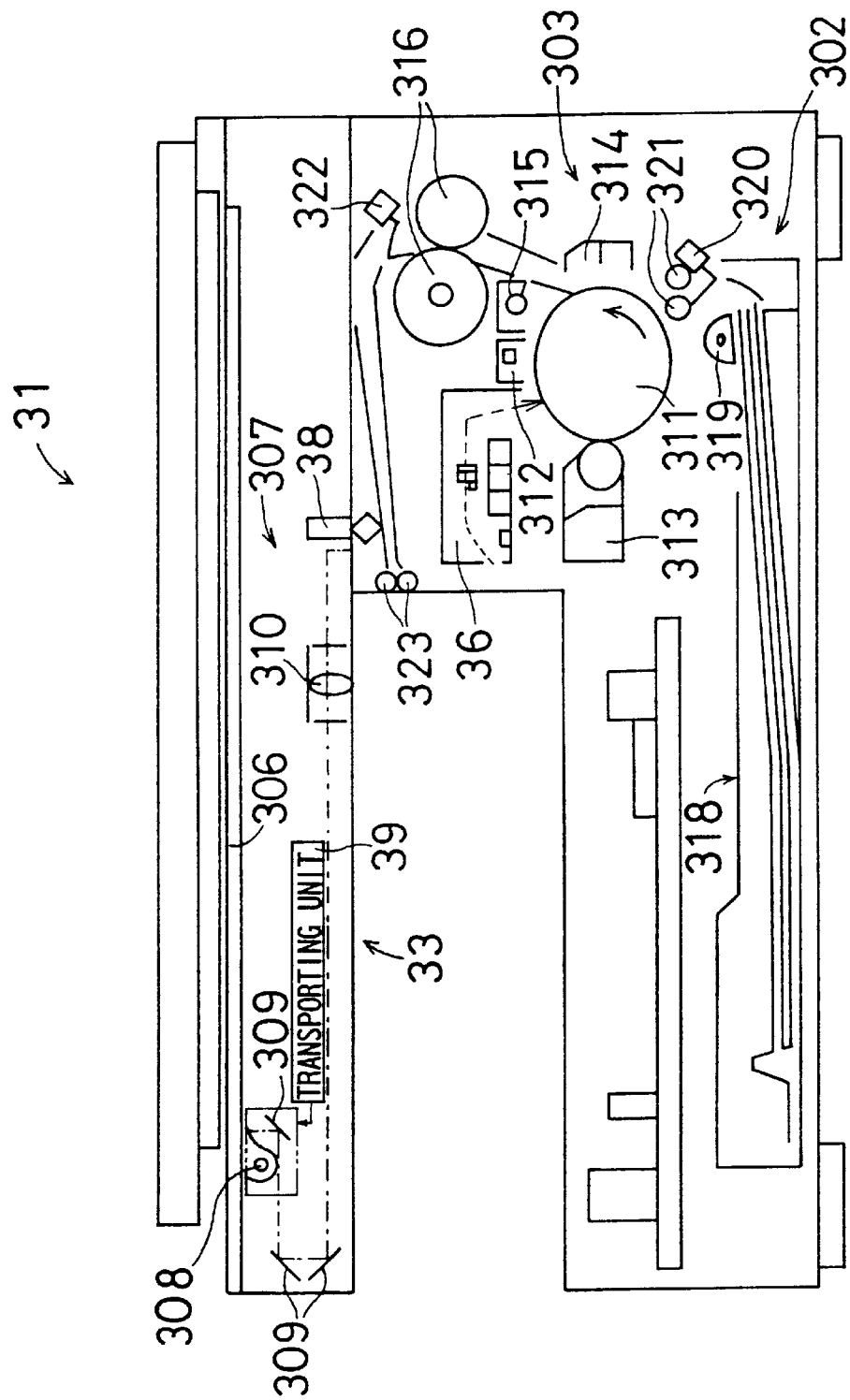
FIG. 2 schematically shows a mechanical arrangement of the copying machine 31 according to the first embodiment.

FIG. 2 is a sectional view for schematically showing a mechanical arrangement of the copying machine 31 according to the present invention. This copying machine 31 mechanically contains the above-described scanning apparatus 33, a transporting apparatus 302, and a printing apparatus 303 including the LSU 36.

The scanning apparatus 33 contains an original base 306, and a scanner optical system 307 in addition to the imaging element 30 and the transporting unit 39. The scanner optical system 307 is equipped with an exposing light source 308, a plurality of reflection mirrors 309, and an imaging lens 310. The original base 306 may be realized by employing, for example, a transparent glass plate. The printing apparatus 303 contains a photosensitive material 311, a main charging device 312, a developing device 313, a transferring device 314, a cleaning device 315, and a fixing device 316 in addition to the above-described LSU 36. The transporting apparatus 302 contains a paper cassette 318, a half-moon-shaped roller 319, a front register sensing switch 320, a pair of register roller 321, a fixing operation sensing switch 322, and a pair of ejection rollers 323.

An original to be scanned is mounted on the original base 306. The exposing light source 308 radiates light onto the original mounted on the original base 306. This light is reflected on a surface of this original, and thereafter, is successively reflected by a plurality of reflection mirrors 309, and furthermore, is focused on the image focusing plane of the imaging element 38 by the imaging lens 310. It should also be noted that the transporting unit 39 transports a unit along the sub-scanning direction and in a predetermined scanning speed. This unit is arranged by combining, for example, the exposing light source 308 with one of these plural reflection mirrors 309. When an image magnification of an image is variable, the larger the image magnification becomes, the slower the transport speed becomes.

The photosensitive material 311 is a drum-shaped member, and this drum-shaped member is rotated along a direction indicated by an arrow around a central axis of a cylinder. The main charging device 312, the LSU 36, the developing device 313, the transferring device 314, and the cleaning device 315 are arranged in this order around the photosensitive member 313 along a direction indicated by an arrow. The main charging device 312 uniformly charges the surface of the photosensitive member 311. As previously explained, the LSU 36 interruptedly radiates the laser light onto the surface of the photosensitive member 311 in response to the processed image data. As a result, an electrostatic latent image is formed on the surface of the photosensitive member 311. The developing device 313 develops the electrostatic latent image formed on the surface of this photosensitive member 311 to produce a toner image. As will be discussed later, while the toner image is formed, one sheet of recording paper is transported between the photosensitive member 311 and the transferring device 314 by the transporting apparatus 302. The above-described toner image is transferred to the recording paper by the charging device 314. The cleaning device 315 removes toner left on the surface of the photosensitive member 311 after the toner image has been transferred.

The recording paper before toner images are transferred is stored into the paper cassette 318. When the half-moon-shaped roller 319 is rotated, one sheet of recording paper is supplied from the paper cassette 318 toward the printing apparatus 303. The front register sensing switch 320 senses as to whether or not the recording paper is supplied between the half-moon-shaped roller 319 and the register roller 321. The register roller 321 registers the position of the toner image formed on the photosensitive member 311 and the position of the recording paper in response to the sensing result obtained from the front register sensing switch 320. As a result, the recording paper may be transported between the photosensitive member 311 and the transferring device 314.

The fixing device 316 is composed of a pair of rollers equipped with heaters. At least, one of these paired rollers is heated. The recording paper to which the toner image has been transferred is penetrated between one pair of rollers employed in the fixing device 316. As a result, the toner image is fixed on the recording paper by way of heat. The fixing device sensing switch 323 senses as to whether or not the recording paper passes through the fixing device 316. The ejecting paper roller 323 ejects the recording paper on which the toner image has been fixed outside the copying machine 31 in response to the sensing result of the fixing device sensing switch 322. With execution of the above-described operations, the toner image, namely the image is printed out on the recording paper. The above description is related to the mechanical arrangement of the copying machine 31.

Figure 3:
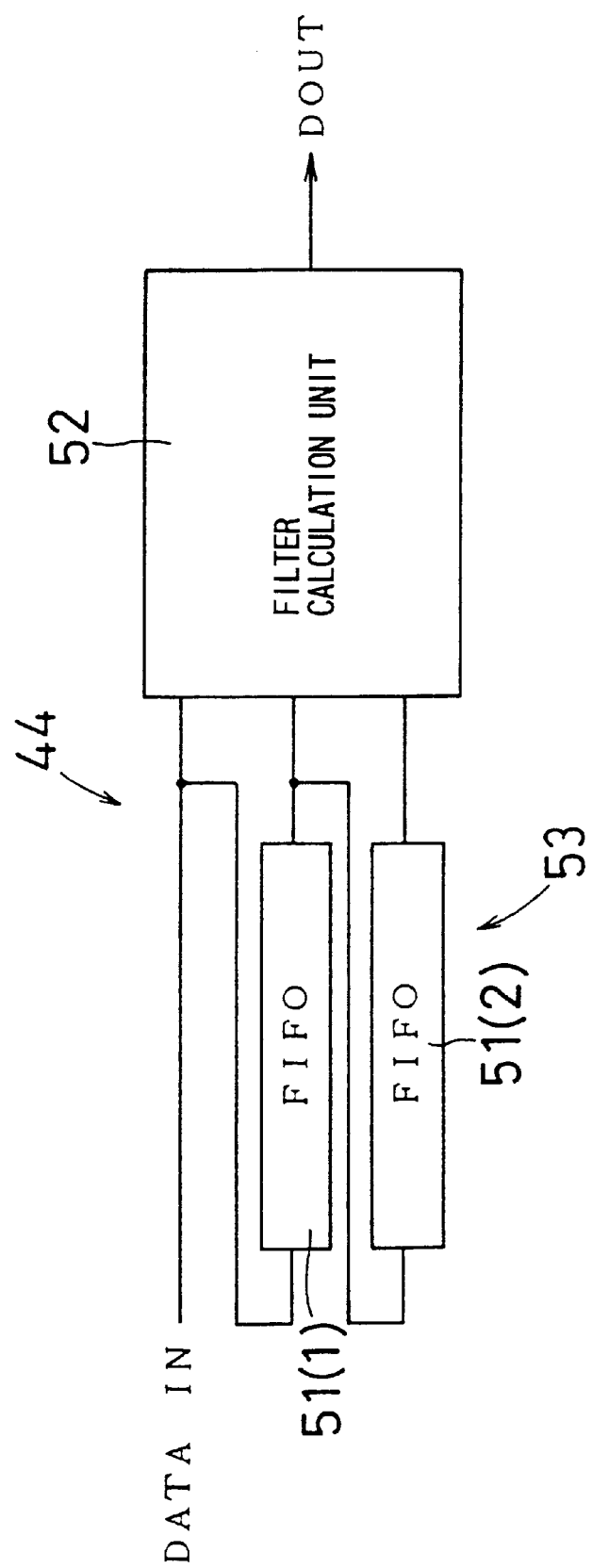
FIG. 3 is a schematic block diagram for representing a filter unit 44 employed in the image processing apparatus 35 according to the first embodiment.
Figure 4:
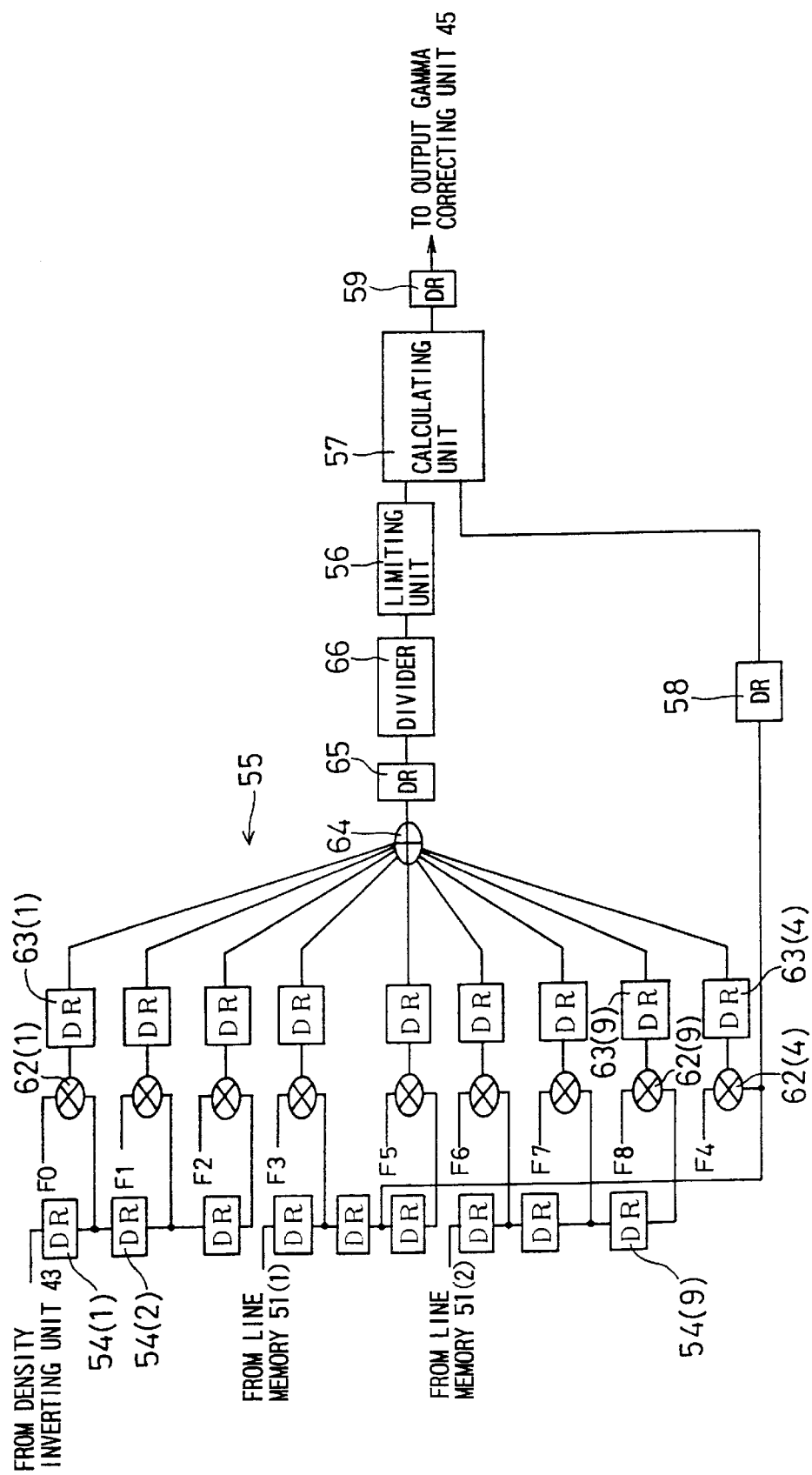
FIG. 4 is a schematic block diagram for indicating a concrete arrangement of a filter calculation unit 52 contained in the filter unit 44 employed in the image processing apparatus 35 according to the first embodiment.
Figure 5:
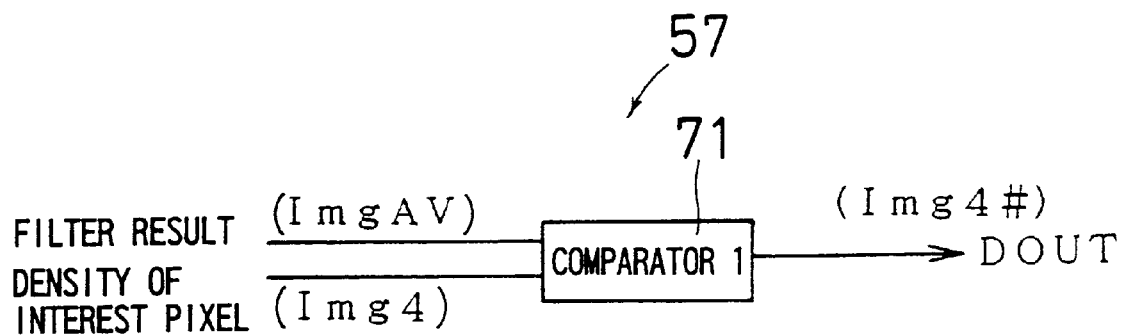
FIG. 5 is a schematic block diagram for showing a concrete arrangement of a calculation unit 57 employed in the filter calculation unit 52.

FIG. 3 is a schematic block diagram for representing an internal circuit arrangement of the filter unit 44. This filter unit 44 contains a plurality of line memories 51(1) to 52(N), and a filter calculation unit 52. A plurality of line memories 51(1) to 51(N) are connected in series to each other, so that a temporary storage unit 53. As indicated in FIG. 4, the filter calculation unit 52 contains a plurality of latch circuits 54(1) to 54(M), an average value calculating unit 55, a limiting unit 56, a calculating unit 57, and two sets of latch circuits 58, 59. The average value calculating unit 55 is composed of, as represented in FIG. 4, a plurality of multipliers 62(1) to 62(M), a plurality of latches circuits 63(1) to 63(M), an adder 64, a latch circuit 65, and a divider 66. As indicated in FIG. 5, the calculating unit 57 contains a first comparator 71. The above-explained latch circuits 58, 59, 63(1) to 63(M), and 65 may temporarily latch data sets which are supplied to these latch circuits in order to adjust the operation timing of such circuits provided before/after each of these latch circuits. It should be understood that specific explanations about the latch circuits 58, 59, 63(1) to 63(M), and 65 are omitted in the below-mentioned description.

Each of these line memories 51(1) to 51(N) is a so-called "first-in first-out (FIFO)" memory. Each of the line memories 51(1) to 51(N) can store thereinto pixel data whose number is equal to that of pixels which constitute 1 line. A total number "N" of these line memories 51(1) to 51(N) is smaller than a total number of lines contained in the area to be processed by 1. A total number of the above-described plural multipliers 62(1) to 62(M), and a total number of the above-described plural latch circuits 63(1) to 63(M) are equal to a total number of pixels which constitute the area to be processed, namely a total number of the above-explained pixel of interest and also plural peripheral pixels. The following assumption is made in the below-mentioned description. That is, the area to be processed is constituted by 3 lines×3 columns, namely 9 pieces of pixels, and the above-defined number "N" is equal to 2. The plural latch circuits 54(1) to 54(9) are subdivided into 3 sets of latch circuits, i.e., a first set of 54(1) to 54(3); a second set of 54(4) to 54(6), a third set of 54(7) to 54(9). These latch circuits are connected in a cascade connecting manner.

All of the pixel data which constitute the image data which has been processed by the density reversing process are supplied one by one from the density reversing process unit 43 to the filter unit 44. The latest pixel data supplied from the density reversing process unit 43 is supplied to the latch circuit 54(1) positioned at a top position. At the same time, the storage contents of the respective cells provided in two sets of these line memories 51(1) and 51(2) are transferred to cells located at one post stage. As a result, each of the pixel data is supplied from two sets of these line memories 51(1) and 51(2) to the filter calculation unit 54. Also, the latest pixel data is stored into a top cell contained in the first line memory 51(1). 3 pieces of the above-described pixel data are supplied to the top set of latch circuits 54(1), 54(4) and 54(9) among the above-explained 3 sets of latch circuits. At the same time, the pixel data which are stored into the plural latch circuits 54(1) to 54(9) respectively are supplied to a plurality of multipliers 62(1) to 62(9), respectively. These stored pixel data are equal to the pixel data Img 0 to Img 8 of the pixel of interest and also of the peripheral pixels thereof.

The above-described filter coefficients F0 to F8 have been previously supplied from the filter storage unit employed in the average value calculating unit 55 to the multipliers 62(1) to 62(9). These multipliers 62(1) to 62(9) multiply supplied pixel data Img 0 to Img 8 by all of the above-explained filter coefficients F0 to F8. As a result, the products calculated from the respective multipliers 62(1) to 62(9) are supplied via the latch circuits 63(1) to 63(9) to the adder 64. This adder 64 adds a plurality of given products to each other. A summation of the calculated products is applied via the latch circuit 65 to the divider 66. This divider 66 divides this summation of the above-described products by the summation of the filter coefficients F0 to F8 in order to normalize the summation of these products. As a result of this dividing calculation, the divided result is equal to the filtering result of the conventional filtering process with employment of the above-explained filter. The density indicated by the above-explained divided result, namely the average density ImgAV corresponds to a weighted average value which is obtained by weighting the above-explained pixel data Img 0 to Img 8 by the filter coefficients F0 to F8.

The limiting unit 56 limits the above-described average density ImgAV to such density existed within the density effective range. To this end, the limiting unit 56 firstly compares the divided result with each of an upper limit value and a lower limit value, which are previously determined so as to define the density effective range. Subsequently, when the divided result exceeds the above-explained upper limit value, this limiting unit 56 replaces this divided result by the upper limit value. When the divided result becomes less than the lower limit value, the limiting unit 56 replaces this divided result by the lower limit value. When the divided result is larger than, or equal to the upper limit value and also is smaller than, or equal to the lower limit value, the limiting unit 56 maintains the above-explained divided result.

It should also be noted that as previously explained, since the density value of the image data which has been filtered in the filter unit 44 is reversed by the density reversing unit 43, the above-explained upper limit value corresponds to the black level and the above-explained lower limit value corresponds to the white level. For example, in the case where the pixel data is equal to an 8-bit data set, the above-described upper limit value is "255" and the above-explained lower limit value is "0". Also, for example, in the case where the divided result is equal to "−128", this divided result is replaced by "0". When the divided result is equal to "+598", this divided result is replaced by "255". The above-explained divided result which is limited by the limiting unit 56 is supplied to a first comparator 71 employed in the calculating unit 57.

In addition to the above-described divided result processed by the limiting unit 56, the pixel data corresponding to the pixel of interest is supplied to this first comparator 71. The first comparator 71 compares the average density ImgAV indicated by the divided result processed by the limiting unit 56 with the density Img 4 of the pixel of interest which is represented by the pixel data and then selects such density equivalent to a dark color from two different densities. The selected result by the first comparator 71 is outputted from the calculating unit 57 as the density "Img 4#" of the corrected pixel of interest. For example, it is now assume that the pixel data indicative of the black level is defined as "255", whereas the pixel data indicative of the white level is defined as "0". In this case, the first comparator 71 compares the divided result processed by the limiting unit with the pixel data corresponding to the pixel of interest, and then, may output a larger value as the pixel data indicative of the density for the corrected pixel of interest.

The pixel data for representing the density of the corrected pixel of interest is sequentially supplied to the output gamma correcting unit 45. For instance, when one piece of the above-described pixel data is supplied from the density converting unit 43 to the filter unit 44, the pixel of interest is sequentially shifted in the raster sequence. The filter unit 44 repeatedly performs the above-described filtering process while changing the pixel of interest until all of the pixels are selected one by one as the pixel of interest and thereafter the above-described electronic filtering process is carried out with respect to these pixels of interest. A set of pixel data indicative of the corrected density for all of the pixels corresponds to the filtered image data.

Figure 6A:
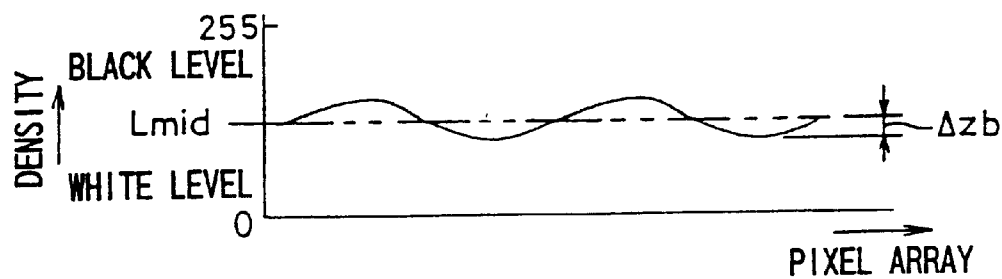
FIG. 6A to FIG. 6C are explanatory diagrams for explaining effects of filtering process achieved by the filter unit 44 employed in the image processing apparatus 35 according to the first embodiment.
Figure 6B:
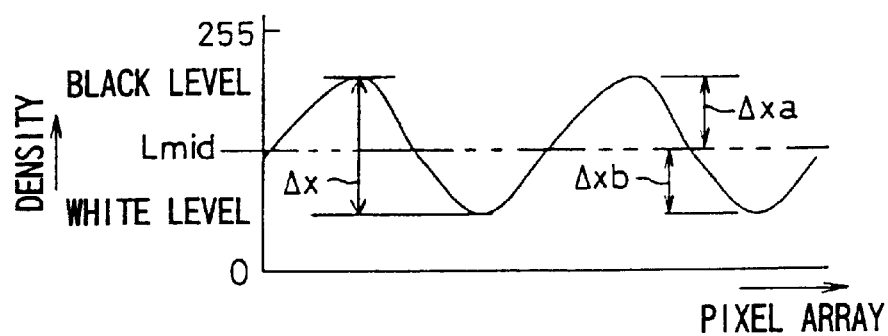
Figure 6C:
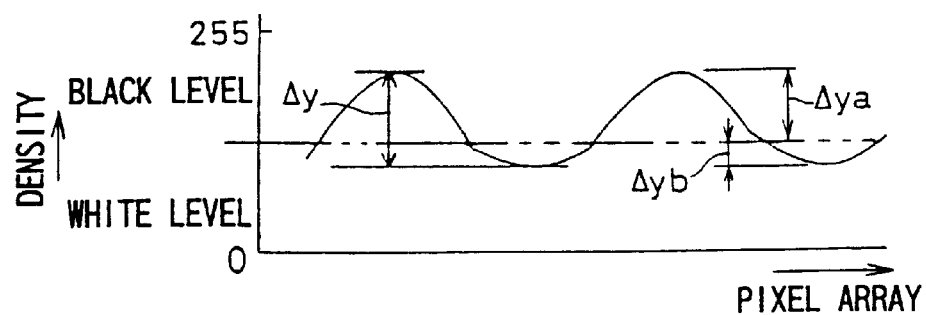

Referring now to FIG. 6A to FIG. 6C, filtering effects achieved by employing the filter unit 44 will be explained. FIG. 6A to FIG. 6C each represents a density distribution of an image which is constituted by arranging a plurality of pixels along a straight line. In the graphic representations shown in FIG. 6A to FIG. 6C, an abscissa thereof indicates density, and an ordinate thereof shows an arrangement of pixels. The image data indicative of the above-described image to which the filtering process has not yet been performed corresponds to such image data which is produced by scanning a mesh photograph by using the scanning apparatus 33 and then by carrying out the shading process, the visual sensitivity correcting process, and the intensity reversing operation with respect to the produced image data. It should be understood that as indicated in FIG. 6A, a curve represents a sine wave, and this sine curve indicates the density distribution of the image to which the filtering process has not yet been performed.

FIG. 6B is a graphic representation indicative of a density distribution of an image such that the filtering process is carried out for the image of the density distribution shown in FIG. 6A in the same manner to that of the above-described second prior art by employing the filter defined in the table 2 containing the edge enhancement component. FIG. 6C is a graphic representation indicative of a density distribution of an image such that the filtering process is carried out for the image of the density distribution shown in FIG. 6A by employing the filter defined in the table 2 containing the edge enhancement component and by using the filter unit 44 according to the first embodiment.

When the density distribution of FIG. 6B is compared with the density distribution of FIG. 6C, a difference "Δy" between maximum density and minimum density among the density of all pixels which constitute the image of FIG. 6C is smaller than another difference "Δx" between a maximum density and a minimum density among the densities of all pixels which constitute the image of FIG. 6B. It is now assumed that in 2 sets of the above-explained filtering processes, the maximum density is a boundary density "Lmid" among the density of the pixels before being corrected, where the average density ImgAV becomes smaller than the density Img4 before being corrected. This boundary density Lmid differs from each other, depending upon the density distribution of the image before being corrected.

When a detailed comparison is made between the density distributions shown in FIG. 6B and FIG. 6C, a difference "Δxa" between the boundary density Lmid and the minimum density of the image shown in FIG. 6B is substantially equal to another difference "Δya" between the boundary density Lmid and the minimum density of the image shown in FIG. 6C. However, a difference "Δyb" between the boundary density Lmid and the maximum density of the image shown in FIG. 6C is smaller than another difference "Δxb" between the boundary density Lmid and the maximum density of the image shown in FIG. 6B. Also, the difference "Δyb" between the boundary density Lmid and the maximum density of the image shown in FIG. 6C is substantially equal to another difference "Δzb" between the boundary density Lmid and the maximum density of the image before being processed, shown in FIG. 6A.

As previously explained, the density distribution of the image which has been filtered by the filter unit 44 according to the first embodiment mode becomes substantially equal to that of the image which has been filtered by the conventional filtering process as to such a portion where the density of the pixel is less than the boundary density Lmid, and as to another portion where the density of the pixel is higher than, or equal to the boundary density Lmid, the density distribution becomes substantially equal to that for the image before the filtering process is carried out. As a consequence, the Moire phenomenon occurred in the image shown in FIG. 6C can be reduced by ½, as compared with the image shown in FIG. 6B. As a result, it is possible to avoid an occurrence of white dropouts of the black solid portion within the image shown in FIG. 6C, as compared with the image indicated in FIG. 6B.

Figure 7:
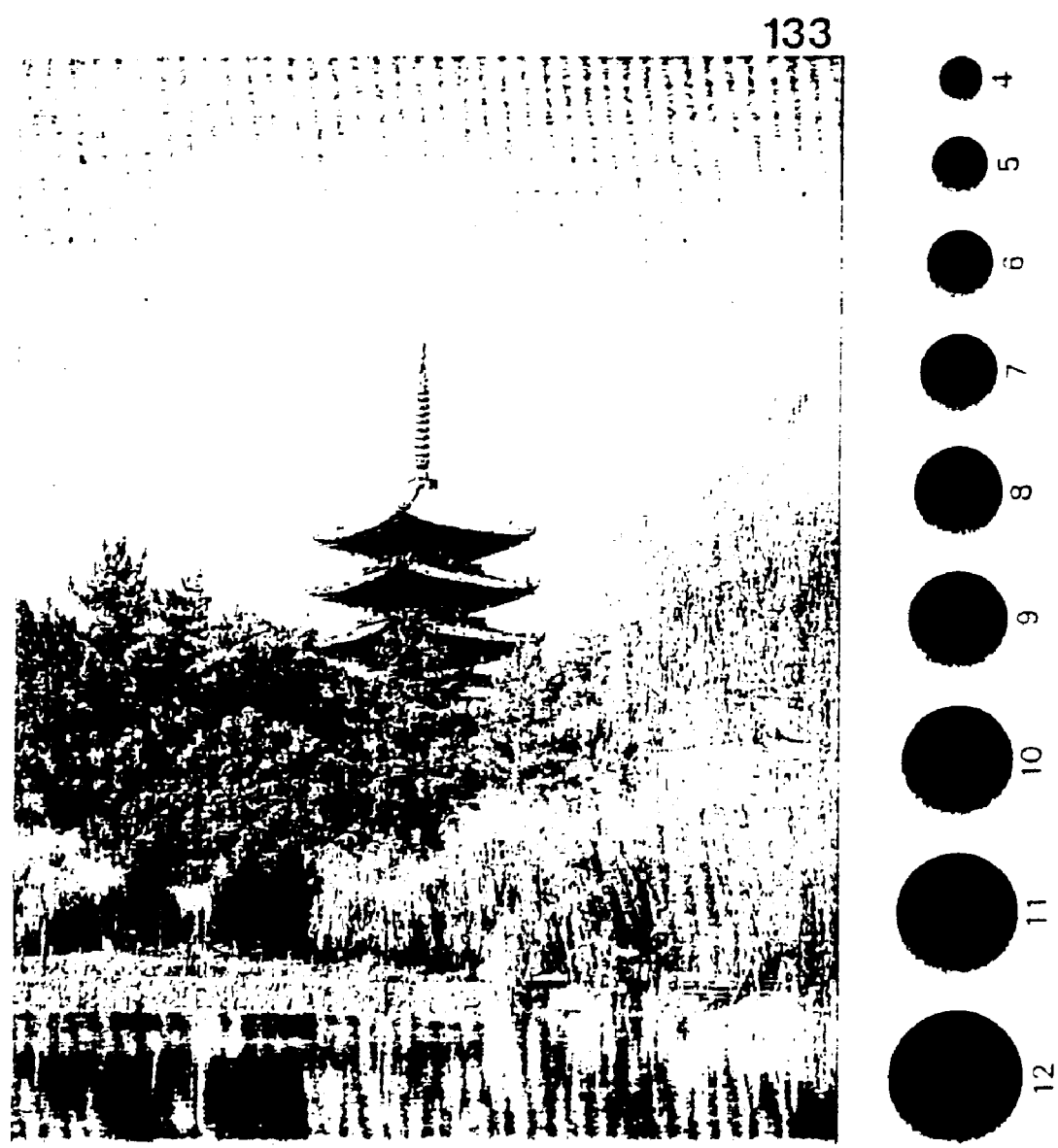
FIG. 7 indicates an image produced by scanning a predetermined test original by the copying machine 31 according to the first embodiment.

FIG. 7 represents an image obtained by processing the test original as explained with reference to FIG. 28 by employing the copying machine 31 of the first embodiment. While comparing the image shown in FIG. 7 with images indicated in FIG. 28 and FIG. 32, the following fact can be seen. That is, since the filter unit 44 of the first embodiment is employed, the characters in 7 class can be clearly outputted, and furthermore, the white dropouts of the black solid portion can be prevented. This is because the first comparator 71 selects such density approximated to the density equivalent to the black level from two sorts of the above-described density as the corrected density of the pixel of interest. Also, even when the Moire phenomenon is induced in the halftone dot photograph, it can be seen that the degree of this Moire phenomenon can be decreased, as compared with that of the Moire phenomenon occurred in the halftone dot photographed portion of the image which has been filtered by using the conventional filter.

As previously explained, in the filter unit 44, the temporary storage unit for temporarily storing the plural pixel data is provided at the prestage of the filter calculation unit 52 for carrying out the actual calculation required for the filter processing operation by employing the line memory such as the FIFO memory. As a result, even when the pixel data are outputted one by one from the density reversing process 43 by carrying out a so-called "real-time process", it is possible to simply obtain the pixel data of the plural pixels located within the area to be processed while setting the pixel of interest as a center. Also, in general, when a total number of line memories is selected to be "N", pixel data of the respective pixels located in an area which is composed of a plurality of pixels arranged by (N+1) lines×(N+1) columns. In this case, symbol "N" indicates a natural number. It should also be noted that when the real-time process is not carried out, a so-called "page memory" may be used instead of the line memory, and all of the pixel data which constitute the image data may be stored into this page memory.

Also, preferably, the above-described filter coefficients F0 to F8 are set in the average value calculating unit 55 in such a manner that the summation of all of the filter coefficients F0 to F8 becomes "N" power of 2. In this alternative case, symbol "N" indicates an arbitrary integer. When the above-described summary is equal to "N" power of 2, a bit column indicative of the summation of the above-described products may be shifted along the right direction by N digits, instead of dividing of the summation of products by the above-explained summation. In this case, in other words, the dividing device 66 may be replaced by the right shift circuit. As a consequence, the circuit arrangement of the filter calculating unit 52 can be reduced as compared with that obtained when the general-purpose dividing circuit is employed.

Next, a description will be made of a copying machine containing an image processing apparatus according to a second embodiment of the present invention. The copying machine according to this second embodiment has a different structure from that of the copying machine according to the first embodiment such that the calculating unit 57 contained in the filter calculation unit 52 employed in the filter unit 44 is replaced by the below-mentioned calculating unit 73. It should be understood that the same reference numerals shown in the copying machine 31 according to the first embodiment will be employed as those for denoting the same, or similar components employed in the copying machine according to the second embodiment, and therefore, explanations thereof are omitted. Furthermore, the descriptions concerning the same structural elements related to the copying machine according to the second embodiment as those for the copying machine 31 according to the first embodiment will be omitted.

Figure 8:
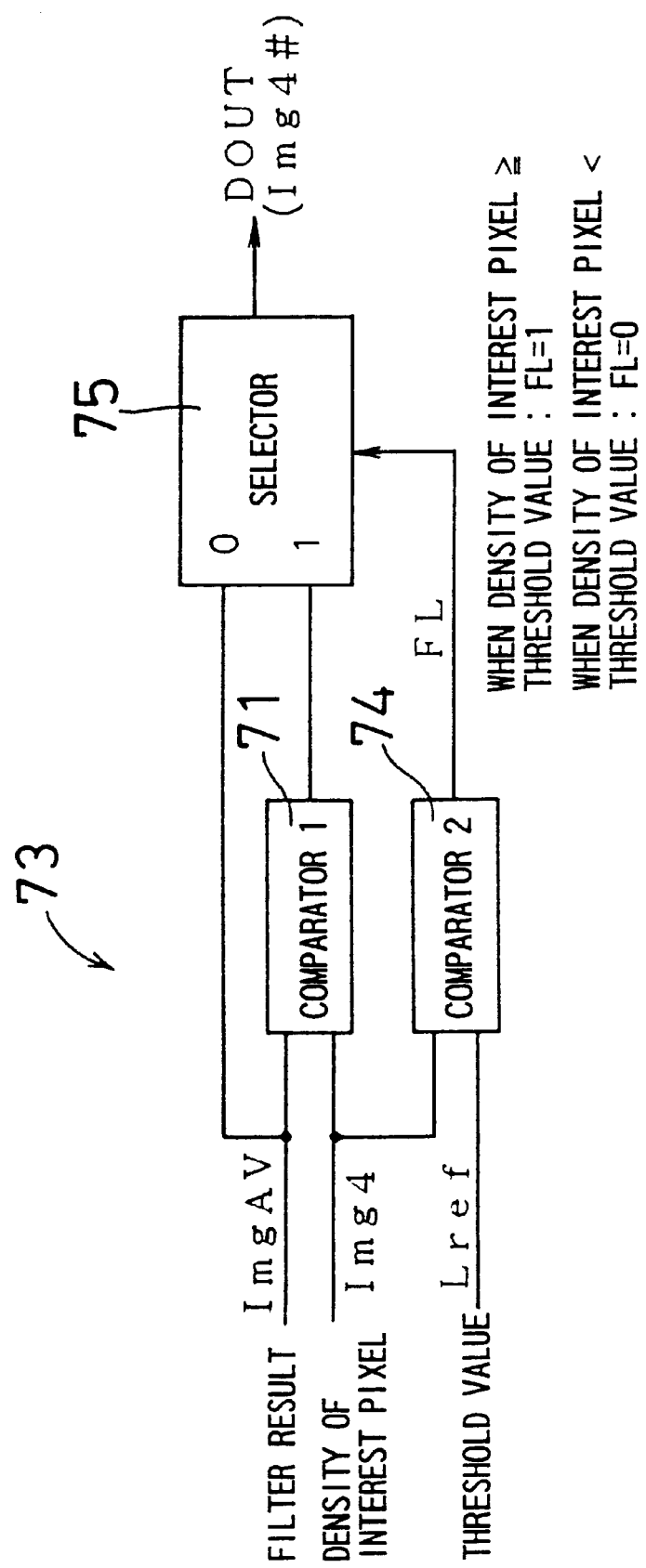
FIG. 8 is a schematic block diagram for showing a concrete arrangement of a calculation unit 78 employed in a filter unit of an image processing apparatus in a copying machine containing the image processing apparatus according to a second embodiment mode of the present invention.

FIG. 8 is a schematic block diagram for specifically showing a functional structure of the calculating unit 73 contained in the filter calculation unit 52 employed in the filter unit 44 of the copying machine according to the second embodiment. The calculating unit 73 contains both a second comparator 74 and a selector 75 in addition to the first comparator 71. The selector 75 is provided on the down stream side of the signal flow with respect to the first comparator 71. The selection result obtained from the first comparator 71 and the average density ImgAV are given to this selector 75.

The second comparator 74 compares a predetermined reference density Lref with the pixel data Img 4 indicative of the density of the pixel of interest before being corrected. Then, this second comparator 74 determines a value of a flag FL as defined in the below-mentioned formula 4 in response to the comparison result. It should be noted that this reference density "Lref" may also be referred to as a "threshold value". In the case where the density Img 4 of the pixel of the interest before being corrected is higher than, or equal to this reference density Lref, the second comparator 74 determines the value of this flag FL as 1. Also, in the case where the density Img 4 of the pixel of the interest before being corrected is less than this reference density Lref, the second comparator 74 determines the value of this flag FL as 0. The flag FL is supplied from the second comparator 74 to the selector 75. Based upon the value of this flag FL, the selector 75 selects the selection result of the first comparator 71 when the value of the flag FL is equal to 1, whereas when the value of the flag FL is equal to 0, the selector 75 selects the average density ImgAV. Thus, the density selected by the selector 75 is outputted from the calculating unit 73 as the above-described corrected density Img4# of the pixel of interest.

When density of interest pixel≧reference density, FL=1.
When density of interest pixel<reference density, FL=... (4)

That is to say, as a result, when the value of this flag FL becomes 1, the calculating unit 73 performs the filtering process as explained in connection with the first embodiment, namely such a filtering process that the corrected density of the pixel of interest is controlled to be higher than, or equal to the density of this interest pixel before being corrected. When the value of this flag FL becomes 0, the calculating unit 73 carries out the conventional filtering process. That is, in order to emphasize the edge portion of the image before being corrected to thus clearly print out the image, the filter control is carried out in such a manner that the corrected density of the pixel of interest becomes higher than, or equal to the density of this interest pixel before being corrected, otherwise less than the density of this interest pixel before being corrected.

Figure 31:
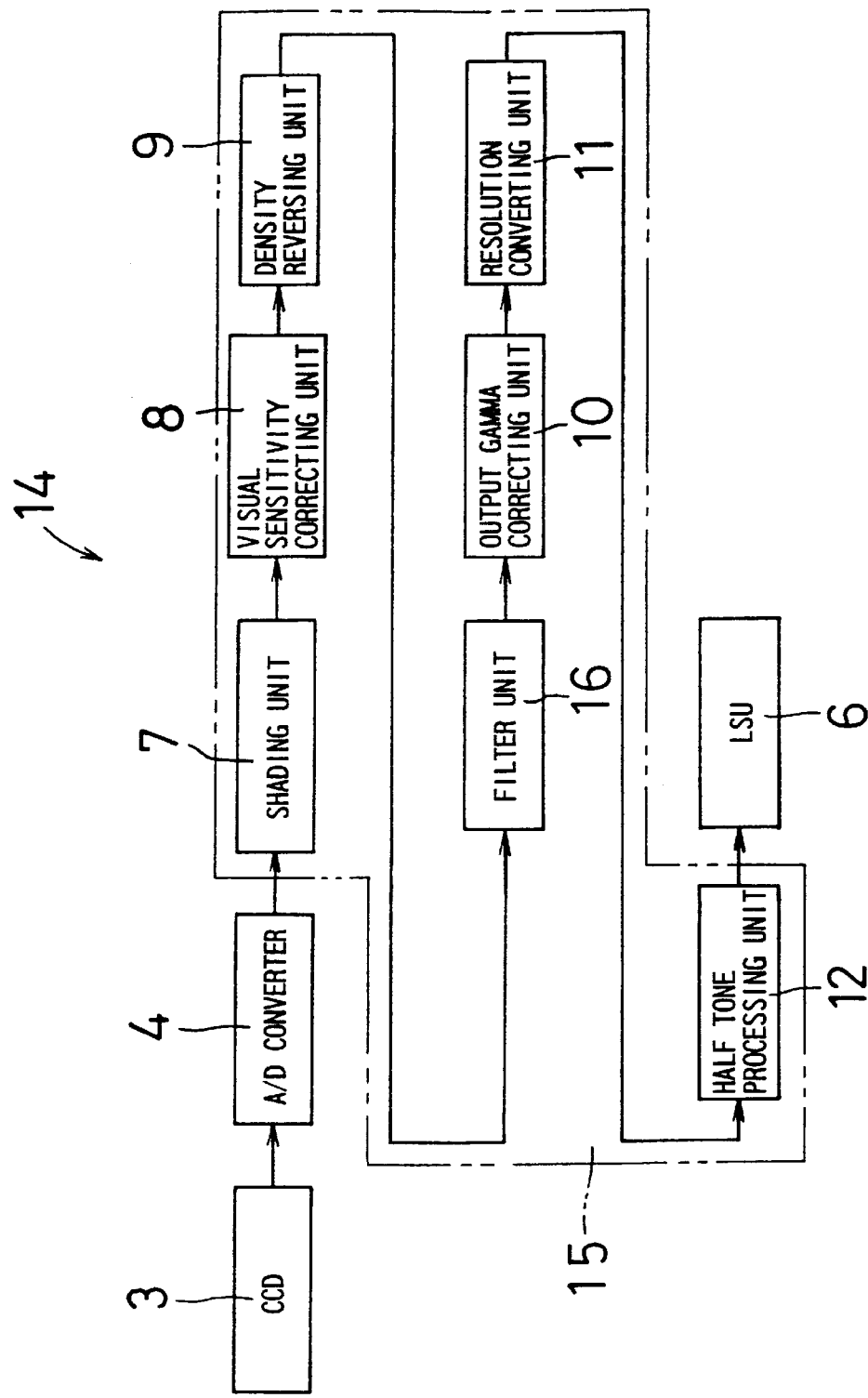
FIG. 31 is a schematic block diagram for showing the electronic arrangement of the copying machine 14 containing the second conventional image processing apparatus 15.
Figure 34:
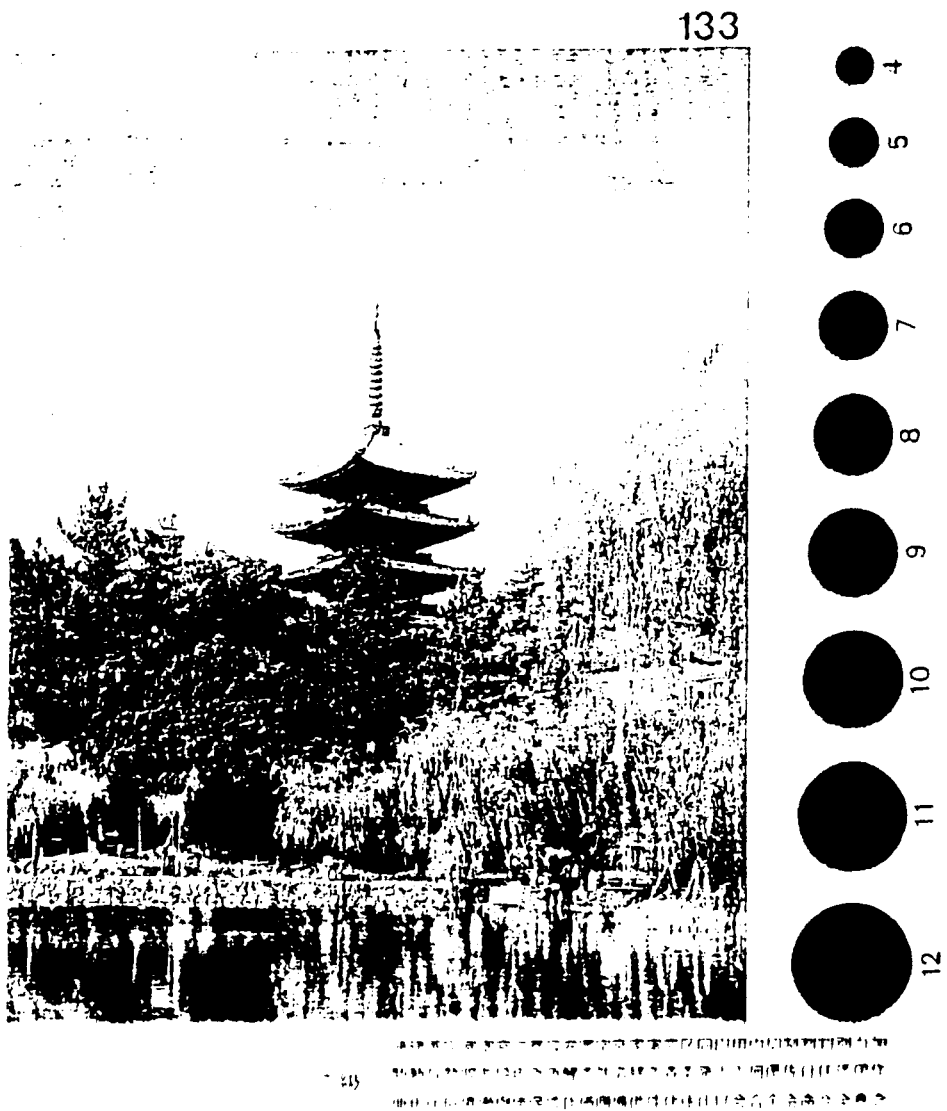
FIG. 34 represents the image produced by scanning the reselected test original by the second conventional copying machine 1.

A description will now be made of a specific operation of the filter unit equipped with the calculating unit 75 according to the second embodiment in the following example. That is, under a so-called "8-bit control" condition that the lower limit value of the density is equal to 0 and the upper limit value thereof is equal to 255, the reference density Lref is equal to 50. It is now assumed that as the filter, a filter as indicated in FIG. 31 is employed.

Figure 9:
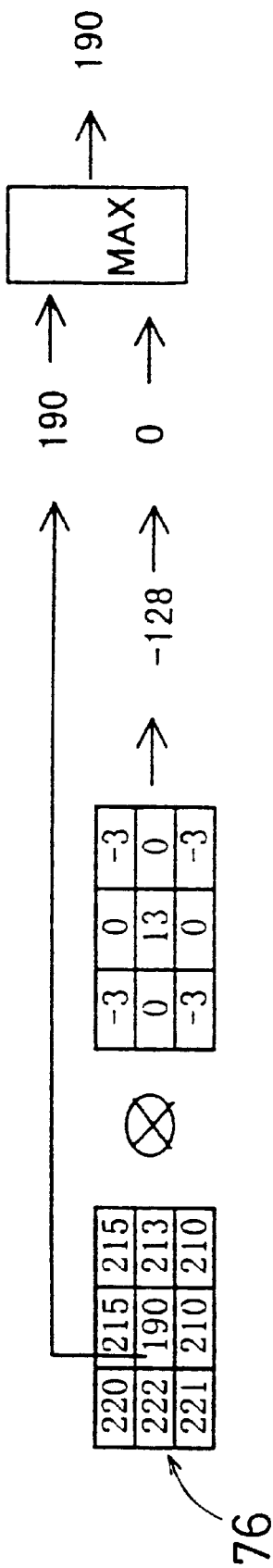
FIG. 9 is a schematic diagram for illustratively showing a process sequence operation carried out when a black solid portion contained in an image to be processed is filtered in the image processing apparatus according to the second embodiment.

First, as indicated in FIG. 9, it is also assumed that an area 76 to be processed is equal to a so-termed "entire black-solid portion". Densities of pixels of interest which constitute this entire black-solid portion and all peripheral pixels are approximated to the black level rather than the boundary density Lmid.

First, as represented in formula 5, the filter unit according to the second embodiment carries out the adding/multiplexing operation with respect to both the filter coefficients F0 to F8 and the density of the respective pixels for constituting the area 76 to be processed. Next, as indicated in formula 6, this filter unit normalizes the calculation result of this adding/multiplexing operation. Furthermore, as a result of this normalizing process, namely the divided result is limited to such a value defined within the above-explained effective density range. In this second embodiment, since the divided result is equal to −128, this divided result is smaller than the lower limit value of the above-explained effective density range. Therefore, this divided result is replaced by 0. When the conventional filtering process is carried out, since the above-explained divided result is directly outputted as the corrected density of the interest pixel, this density becomes "0", so that the color of this interest pixel becomes white. This may cause the white dropouts occurred in the black solid portion. To the contrary, the white dropouts can be prevented by the calculating unit 73.

$$220\times(-3)+215\times(0)+215\times(-3)+222\times(0)+190\times(13)+213\times(0)+221\times(-3)+210\times(0)+210\times(-3)=128 \quad (5)$$

$$-128\div\{(-3)+(0)+(-3)+(0)+(13)+(0)+(-3)+(0)+(-3)\}=-128 \quad (6)$$

In other words, the filter unit of this second embodiment progressively carries out the filter calculation. First, the reference density Lref "50" is compared with the density "190" of the interest pixel before being corrected by the second comparator 74. In this embodiment, since the density of the interest pixel before being corrected is larger than the reference interest Lrf, the value of the flag FL is set to 1. As a result, the selector 75 may recognize that the filtering process specific to the second embodiment becomes valid. As a result, the first comparator 71 compares the density "190" of the interest pixel before being corrected with the above-explained divided result "0" to select a dark pixel. In this case, since the density reversing process has been performed for the image data, the higher the density becomes, the darker the pixel becomes. As a consequence, the first comparing device 71 selects the density "190" of the interest pixel before being corrected. The density selected by the first comparator 71 is directly outputted via the selector 75 as corrected density of the pixel of interest. As a result, the filter unit according to the second embodiment may output as the corrected density of the interest pixel the same density "190" as the density of the interest pixel before being corrected. As a consequence, no white dropouts occur in the black solid portion.

Figure 10:
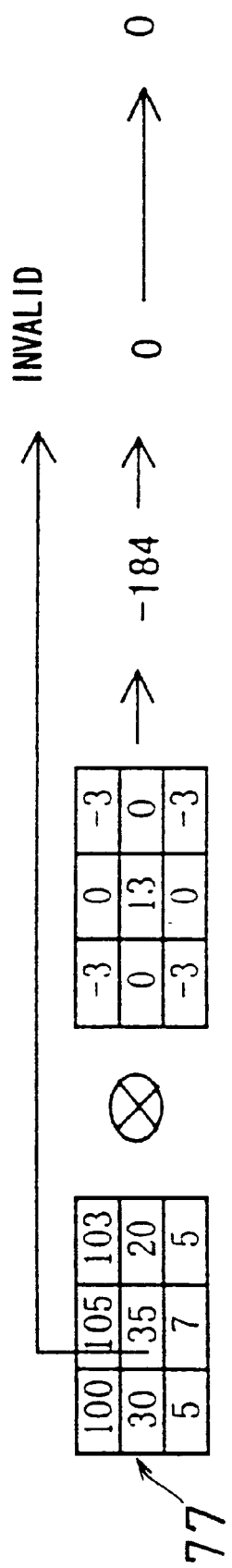
FIG. 10 is a schematic diagram for illustratively showing a process sequence operation carried out when a character portion contained in an image to be processed is filtered in the image processing apparatus according to the second embodiment.

Subsequently, as shown in FIG. 10, it is now assumed that the area 77 to be processed is a so-called "character portion", precisely speaking, such a portion containing a portion of a line segment which constitutes a character. In this case, densities of all pixels located in the area to be processed are fluctuated over the effective density range. Concretely speaking, the densities of the peripheral pixels equivalent to a portion of the line segment are "100", "105", and "103". It should be understood that the pixel of interest and the remaining peripheral pixels correspond to portions except for a portion of this line segment, namely a background portion.

First, as represented in formula 7, the filter unit according to the second embodiment carries out the adding/multiplexing operation with respect to the filter coefficients F0 to F8 and the densities of the respective pixels for constituting the area 77 to be processed. Next, as indicated in formula 8, this filter unit normalizes the calculation result of this adding/multiplexing operation. Furthermore, as a result of this normalizing process, namely the divided result is limited to such a value defined within the above-explained effective density range. In this second embodiment, since the divided result is equal to −184, this divided result is smaller than the lower limit value of the above-explained effective density range. Therefore, this divided result is replaced by 0.

$$100 \times (-3) + 105 \times (0) + 103 \times (-3) + 30 \times (0) + 35 \times (13) + 20 \times (0) + 5 \times (-3) + 7 \times (0) + 5 \times (-3) = -184 \quad (7)$$

$$-184 \div \{(-3) + (0) + (-3) + (0) + (13) + (0) + (-3) + (0) + (-3)\} = -184 \quad (8)$$

In other words, the filter unit of this second embodiment further carries out the filter calculation. First, the reference density Lref "50" is compared with the density "35" of the interest pixel before being corrected by the second comparator 74. In this embodiment, since the density of the interest pixel before being corrected is less than the reference interest Lref, the value of the flag FL is set to 0. As a result, the selector 75 may recognize that the filtering process specific to the second embodiment becomes invalid. As a result, irrespective of the comparison result by the first comparator 71, the above-explained limited result "0" namely the same process result as the conventional filtering process is outputted as the corrected density of the interest pixel.

As previously described, in the case where the density Img 4 of the interest pixel before being corrected is higher than, or equal to the reference density Lref, the calculating unit 73 according to the second embodiment carries out the same filtering process as that by the filter unit 44 according to the first embodiment. When the density Img 4 of the interest pixel before being corrected is less than the reference density Lref, this calculating unit 73 carries out the same filtering process as that of the conventional filter unit. The reason why such a filtering process is carried out is given as follows:

When an image which has been processed by employing the filter unit 44 of the first embodiment is observed in detail, the Moire phenomenon and also the white dropouts in the black solid portion can be avoided. However, a so-called "scattering phenomenon" may consciously appear around the characters of the 7-class character portion. In particular, when the LSU 36 outputs the binary output and the image data is processed by the half tone process, the above-described scattering phenomenon may consciously appear. This is because the portion composed of such pixels having a density lower than the boundary density Lmid, for example, the edge portion of the character portion is not emphasized. Therefore, this portion would also be reproduced in a half tone. To avoid such a scattering phenomenon, the portion composed of the pixels having the density lower than the boundary density is required to be filtered. To this end, the filtering process is carried out by employing the above-explained calculating unit 73 of the second embodiment.

Figure 11A:
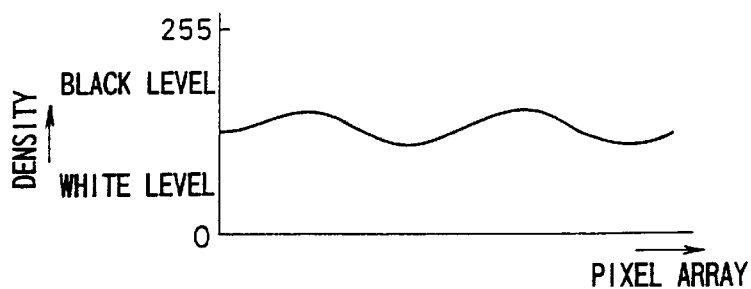
FIG. 11A to FIG. 11D are explanatory diagrams for explaining the filtering effects achieved by the filter unit employed in the image processing apparatus according to the second embodiment.
Figure 11B:
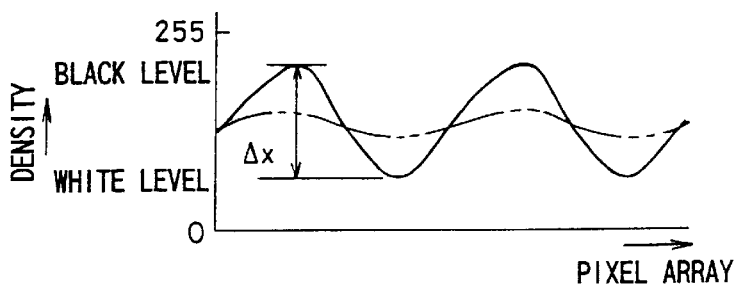
Figure 11C:
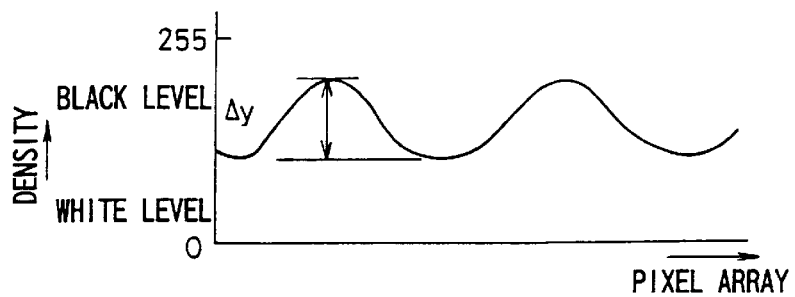
Figure 11D:
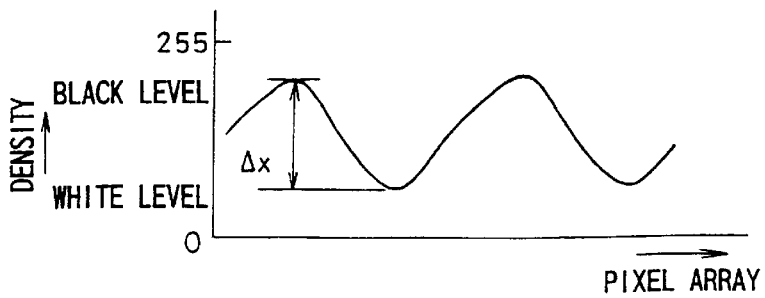

Referring now to FIG. 11A to FIG. 11D, effects achieved by the filtering processes with employment of the filter unit according to the second embodiment will be discussed. FIG. 11A to FIG. 11D represent density distributions of images constituted by arranging a plurality of pixels along a straight line. Since the graphic representations shown in FIG. 11A to FIG. 11B are the same as those of FIG. 6A and FIG. 6B, descriptions thereof are omitted. The graphic representation of FIG. 11C is such a graphic representation for indicating a density distribution of an image which is produced in such a manner that when the density of all pixels constituting the image shown in FIG. 11A is higher than the reference density Lref, the image data is processed by the filtering process by the filter unit according to the second embodiment by using the filter of the table 2. The graphic representation of FIG. 11D is such a graphic representation for indicating a density distribution of an image which is produced in such a manner that when the density of all pixels constituting the image shown in FIG. 11A is lower than the reference density Lref, the image data is processed by the filtering process by the filter unit according to the second embodiment by using the filter of the table 2. In FIG. 11C and FIG. 11D, an abscissa thereof a indicates density and an ordinate thereof represents a position of a pixel.

When the conventional filtering process is carried out for the image of the density distribution shown in FIG. 11A, such an image of the density distribution indicated in FIG. 11B is obtained irrespective of such a fact as to whether or not the black solid portion is present in this image. As a result, when the area to be processed is a character portion, the edge can be made sharp, and thus, the filtered area can have the higher quality than the original image quality. However, when the area to be processed is the black solid portion, the white dropouts are produced in the filtered area. Under such a circumstance, when the filter portion of the second embodiment is employed, since an enhancement process along the white level direction is controlled in response to the density of the interest pixel before being corrected, there is no problem of the above-described white dropout. This enhancement process along the white level direction implies such an enhancement process that a corrected pixel of interest becomes brighter than this pixel of interest before being corrected.

For example, assuming that the reference density is provisionally set to "50" and the pixel of interest is equal to a pixel having a density of 190 located in a black solid portion, the above-described filter unit does not execute the enhancement process along the white level. Also, assuming that the pixel of interest is equal to a pixel having a density of 20 and located around a small character, since the filter unit carries out the enhancement process along the white level direction, the filtered image does not become a so-called "blurred image". Also, another enhancement process along the black level direction is carried out by the similar strengths in any of the above-explained two cases, so that the processed image becomes clear. An enhancement process along the black level direction implies such an enhancement process that the corrected pixel of interest becomes darker than this interest pixel before being corrected. Furthermore, when the filter unit of the second embodiment is employed, the effects of this enhancement process is reduced, as compared with that achieved when the conventional filter unit is employed.

As apparent from the foregoing descriptions, it can be understood that since the filter unit according to the second embodiment is used, the scattering phenomenon of the character portion can be avoided, and the Moire phenomenon occurred in the halftone dot photograph portion can be reduced, and furthermore, the white dropouts occurred in the black solid portion can be prevented, as compared with the conventional case where the prior art filter unit is employed. As a result, it is possible to obtain an image having a better image quality.

It can be seen from the experiments that when the effective density range is larger than, or equal to "0" and also smaller than, or equal to "255", namely when the pixel data corresponds to an 8-bit data set, for instance, the above-described reference density "Lref" is preferably selected to be such a value included within a range defined by more than, or equal to 10 and less than, or equal to 200. This reason is given as follows: From the experiments, the below-mentioned cases many times occur. That is, a portion within an image which is composed of pixels whose density is higher than, or equal to 200 corresponds to a black solid portion. As a consequence, in order to avoid the white dropout from the black solid portion, the reference density Lref is preferably selected to be lower than, or equal to 200. Also, when the reference density is selected to be 0, since the overall image is filtered by the filtering process according to the first embodiment, there is no clear/sharp image portions in the filtered image. As a consequence, it can also be understood from the experiments that the reference density Lref is preferably selected to be higher than, or equal to 10 so as to produce clear/sharp image portions in the overall image.

Next, a description will be made of a copying machine 81 containing an image processing apparatus 82 according to a third embodiment of the present invention. The copying machine 81 according to this third embodiment has a different structure from that of the copying machine 31 according to the first embodiment such that the below-mentioned area separating unit 83 is additionally employed, the filter unit 44 is replaced by the below-explained filter unit 84, and furthermore, the resolution converting unit 46 is substituted by a resolution converting unit 85, and also other structural elements thereof are equivalent to those of the copying machine 31 according to the first embodiment. It should be understood that the same reference numerals shown in the copying machines according to the first and second embodiments will be employed as those for denoting the same, or similar components employed in the copying machine 81 according to the third embodiment, and therefore, explanations thereof are omitted. Furthermore, the descriptions concerning the same structural elements related to the copying machine 81 according to the third embodiment as those for the copying machines according to the first and second embodiments will be omitted.

Figure 12:
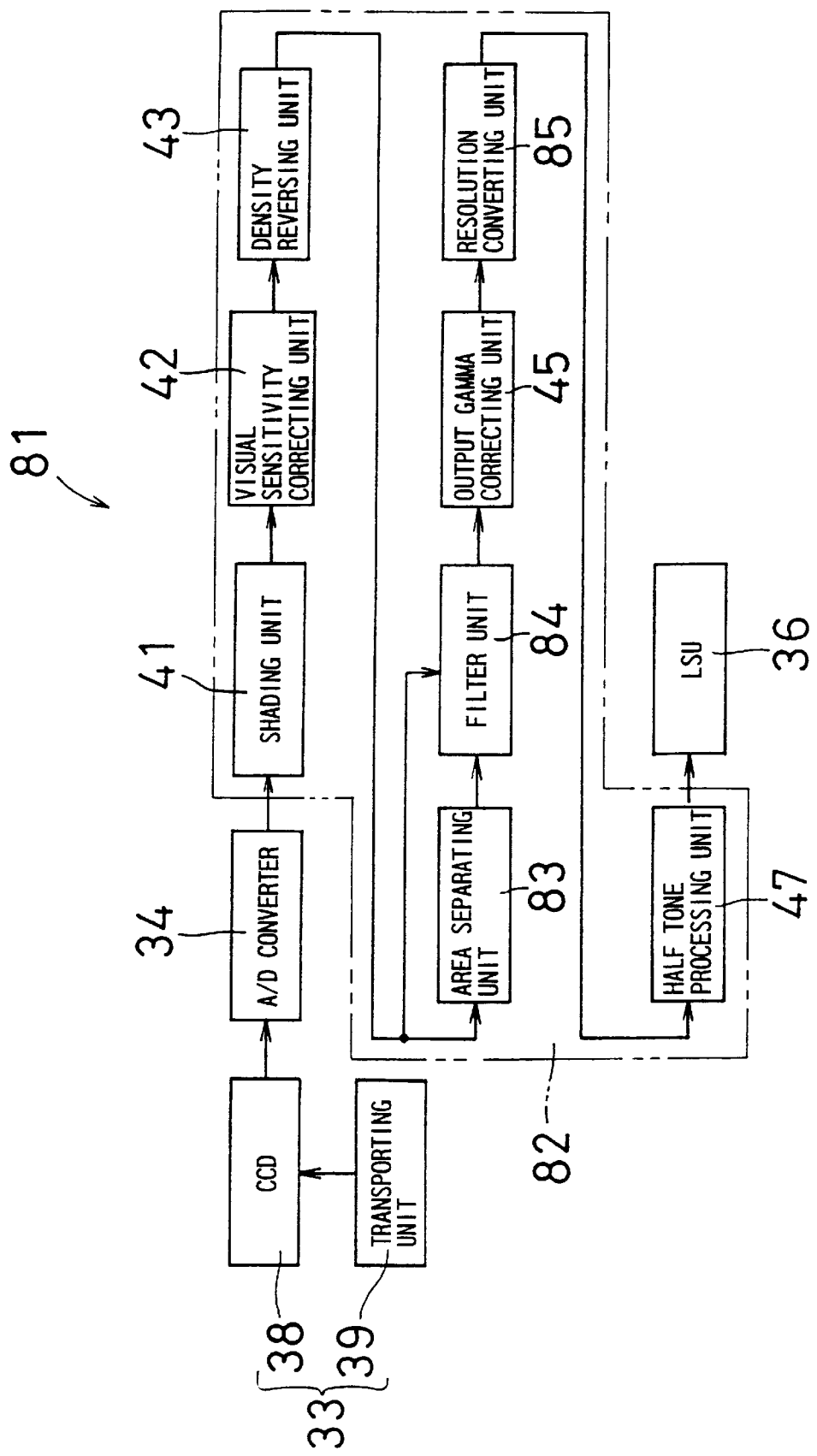
FIG. 12 is a schematic block diagram for representing an electronic arrangement of a copying machine 81 containing an image processing apparatus 82 according to a third embodiment of the present invention.

FIG. 12 is a schematic block diagram for representing an electronic arrangement of the copying machine 81 and also a mechanical structure of the image processing apparatus 82. This copying machine 81 contains a scanning apparatus 33, an A/D converter 34, an image processing apparatus 82, and an LSU 36. The image processing apparatus 82 functionally contains a shading unit 41, a visual sensitivity correcting unit 42, a density reversing unit 43, an area separating unit 83, a filter unit 84, an output gamma correcting unit 45, a resolution converting unit 85, and a half tone processing unit 47. The image processing apparatus 82 is interposed between the A/D converter 34 and the LSU 34.

The area separating unit 83 is interposed between the density reversing unit 43 and the filter unit 84. Image data outputted from this density reversing unit 43 is supplied to both the area separating unit 83 and the filter unit 84 in a parallel manner. The area separating unit 83 carries out an area separating process capable of separating an image indicated by this image data into a character area, a halftone dot area, and a photograph area, based on the image data which has been density-reversed. This character area is such an area where a character appearing within an image is imaged. The halftone dot area is such an area where a picture represented in a half tone is imaged within the image. The photograph area is such an area where a picture indicated in a continuous half tone is imaged within the image. The picture represented in the half tone corresponds to, for example, a halftone dot photograph, whereas the picture represented in the continuous half tone corresponds to, for instance, a silver halide photograph. The separation processing result by the area separating process is supplied to the filter unit 84.

Figure 16:
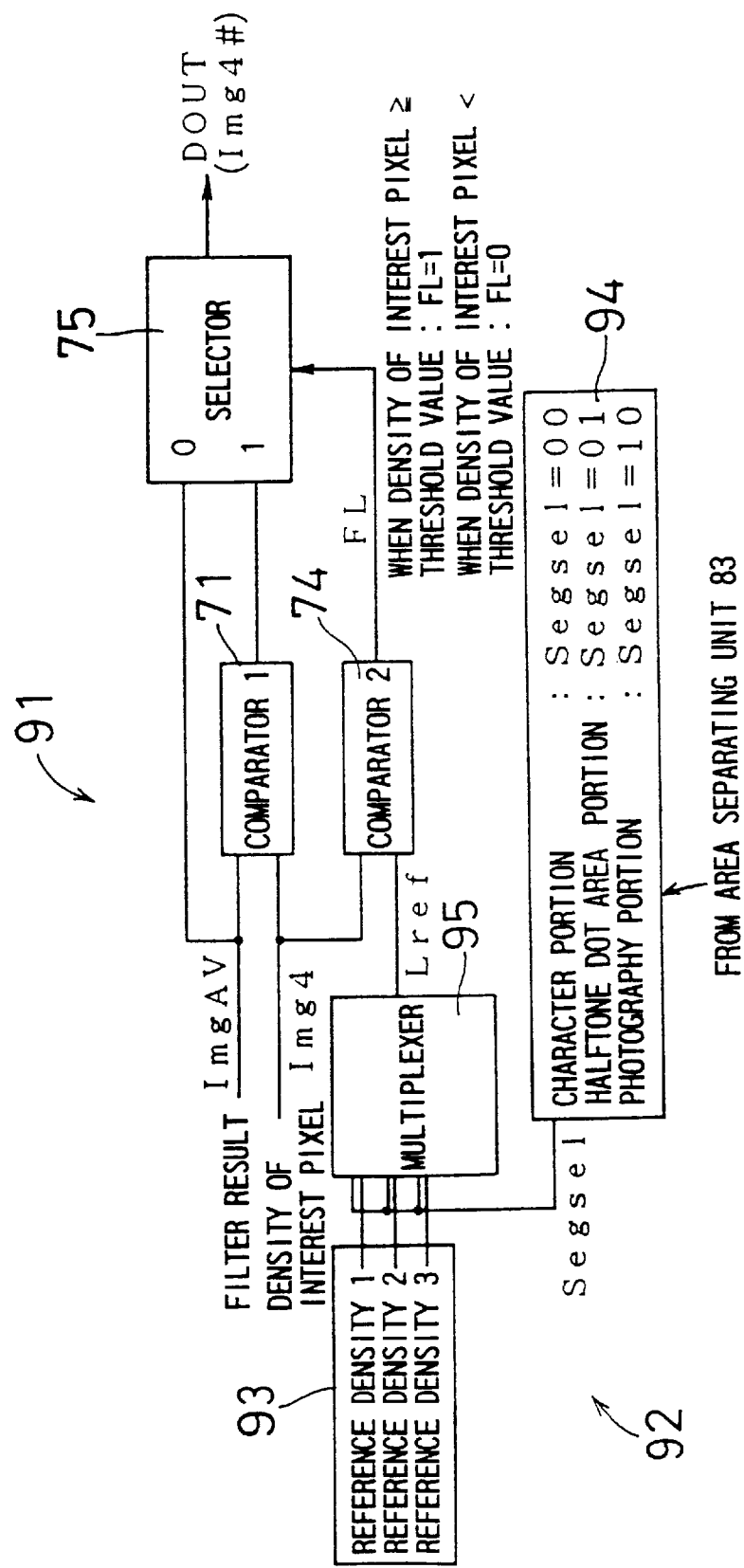
FIG. 16 is a schematic block diagram for showing a concrete arrangement of a calculation unit 91 employed in the filter unit provided in the image processing apparatus according to the third embodiment.

When comparing with the functional arrangement of the filter unit according to the second embodiment, a functional arrangement of the filter unit 84 owns such a different point that the calculating unit 73 according to the second embodiment is replaced by a calculating unit 91 indicated in FIG. 16, and other functional arrangements thereof are the same as those of the second embodiment. The filter unit 84 performs a filter processing operation based upon the area separation result of the area separating unit 83 (will be explained later). The filter processing operation of the filter unit 84 according to the third embodiment owns the following different point, as compared with the filter processing operation of the filter unit according to the second embodiment. That is, the reference density Lref differs from each other, depending upon such a condition that a pixel of interest is located in any one of the character area, the halftone dot area, and the photograph area. Other filter processing operations of the filter unit according to the third embodiment are the same as those according to the second embodiment. In the case where the filter processing operation according to the third embodiment is employed, even when there is an error in the above-described area separating process, such various problems as the Moire phenomenon and the white dropouts in the black solid portion never occur. As a consequence,the area separating process may be sufficiently realized with employment of a small circuit scale without requiring relatively high-precision-area separating process.

The image data which has been filtered by the filter unit is first adjusted to be fitted to a gradation characteristic of a printer in the output gamma processing unit 45. Next, the resolution converting unit 85 carries out a pixel interpolation processing operation related to an image enlarging/reducing process with respect to the above-explained image data. Finally, the half tone processing unit 47 performs a half tone processing operation with respect to the image data. Then, the image data which has been processed by the above-explained three processing operations is supplied to the LSU 36.

As previously described, there are two following reasons as to why the filter processing operation is changed, depending upon such a condition that the pixel of interest is located at which area within the image. The first reason is given as follows: As apparent from the waveform image diagram of FIG. 6, brightness of the entire image after the filtering process has been carried out may become darker than brightness of the overall image before the filtering process is carried out. In particular, when the filtering process is performed for such an image that a so-called "continuous gradation" area is mixed with a so-termed "dotted picture" area, there is a trend that brightness of the entire area of the "dotted picture" area becomes darker than brightness of the overall area of the "continuous gradation" area. A continuous gradation area implies a portion where, for example, similar to a silver halide photograph, a picture represented by arranging plural pixels so as to be continuously different in density from each other is photographed. A dotted picture area implies a portion where, for instance, similar to a halftone dot photograph, a picture represented by scattering a plurality of sets of two or more pixels different in density is photographed.

The second reason is given as follows: In the case where the filtering process is uniformly carried out with respect to an entire area of such an image that the above-described continuous gradation portion, the above-explained dotted picture portion, and the character displayed portion are mixed with each other, it is practically difficult to completely avoid occurrences of the Moire phenomenon and the white dropouts. This difficulty is caused by such a fact that both the Moire phenomenon and the white dropouts occur, because a strong edge enhancement filter is employed in the filtering process so as to clearly print out a small-sized character.

As explained above, in the case where the filtering process is carried out for the image where a plurality of areas are located, the resultant images having more better qualities can be produced due to the above-explained two reasons, when a so-called "area separating process" is carried out so as to separate these plural areas and also the filtering processes are performed with respect to the respective areas.

Referring not to FIG. 13, a concrete operation of the area separating unit 83 will be explained. Every time when one of the plural pixel data for constituting the image data which has been processed by the density reversing process is supplied from the density reversing unit 43 to the area separating unit 83, the process is advanced from a step a1 to another step a2. It is now assumed that the area separating unit 83 stores thereinto a plurality of pixel data sets containing one latest pixel data supplied from the density reversing unit 43, and these plural pixel data correspond to a plurality of pixels respectively, which are present in an area having a predetermined size within an image to be processed. This area is assumed as such an area constituted by 7 pixels×7 pixels while a pixel of interest is located at a center of this area.

At the step a2, the area separating unit 83 detects an edge present in the above-described area. To this end, the area separating unit 83 first carries out an electronic filtering process for this area so as to detect the edge. A filter used to execute the filtering process for detecting the edge is so designed that a summation of filter coefficients for constituting this filter becomes "−1". Next, the area separating unit 83 digitalizes the filtering result of the above-described filtering process to produce a binary value by employing a predetermined threshold value. The processed result of this binary process corresponds to edge information related to the edge located in this area. The area separating unit 83 stores thereinto the processed result of the binary processing operation, namely edge information.

In accordance with this third embodiment, a filter made of 3 pixels×3 pixels indicated in the below-mentioned table 3 is employed as the above-explained filter. In table 3, a rectangular shape located at a center thereof corresponds to a pixel of interest, and 8 rectangular shapes located around this interest pixel correspond to the respective peripheral pixels. Also, numeral values indicated in the respective rectangular shapes correspond to filter coefficients which should be multiplexed by the pixel data of the pixels corresponding to these rectangular shapes. It should also be noted that when the filter made of 3 pixels×3 pixels is employed in the filtering process so as to detect the edge, it is practically difficult that the pixels located at the edge portions of the area made of 7 pixels×7 pixels can be located at the center of this filter. As a result, the effective range of the filtering process for detecting the edge is equal to a portion made of 5 pixels×5 pixels where a pixel of interest is located at a center of this area. As a consequence, the edge information about the portion made of 5 pixels×5 pixels within the area is stored into the area separating unit 83. This edge information implies that either "0" or "1" is applied to the respective pixels which constitute the above-explained portion located in the area. In the case where there is an edge in this portion, "1" is applied to a pixel corresponding to this edge, namely such a pixel located over the edge, or near this edge.

TABLE 3

| -4 | 0  | -4 |
|----|----|----|
| 0  | 11 | 0  |
| -4 | 0  | -4 |

At a step a3, the area separating unit 83 calculates a continuous degree of the pixel of interest as a first feature amount "P0" based on the above-described edge information calculated at the previous step a2. A continuous degree of a pixel of interest implies a maximum number of pixels such that these pixels corresponding to edges are continued within the above-described area. Concretely speaking, this continuous degree is calculated as the following concrete example. First, in the portion made of 5 pixels×5 pixels, a check is made in each of lines as to whether or not pixels to which the edge information of "1" is applied are located adjacent to each other, and as to how many these pixels are continued to each other. Similarly, in the above-described portion, another check is made in each of columns as to pixels to which the edge information of "1" is applied are located adjacent to each other, and how many these pixels are continued to each other. Finally, the maximum numbers among the numbers of pixels which are continued to each other and to which the edge information of "1" is applied are selected as the continuous degree of this interest pixel in each of these lines and columns.

Next, at a step a4, the area separating unit 83 calculates as a second feature amount P2, a maximum density difference within the area made of 7 pixels×7 pixels. Concretely speaking, this maximum density difference is equal to a difference between a maximum density among the densities of all pixels located in the area, and a minimum density among the densities of all pixels located in the area.

Furthermore, at a step a7, the area separating unit 83 calculates a so-called "cumbersome degree" with the area made of 7 pixels×7 pixels as a third feature amount P2. This cumbersome degree implies a smaller summation value selected from a first summation value and a second summation value. The first summation value is defined by sequentially adding a density difference between two adjoining pixels along the main scanning direction. The second summation value is defined by sequentially adding a density difference between two adjoining pixels along the sub-scanning direction. In other words, for each pixel in the area, a calculation is made of differences between the density of the respective pixels and the density of such pixels which are located adjacent to the first-mentioned pixels and in parallel thereto along the main scanning direction. All of these calculated differences in the density of these pixels are summed, and this summation corresponds to the above-explained first summation. Similarly, for each pixel in the area, a calculation is made of differences between the densities of the respective pixels and the densities of such pixels which are located adjacent to the first-mentioned pixels and in parallel thereto along the sub-scanning direction. All of these calculated differences in the density of these pixels are summed, and this summation corresponds to the above-explained second summation.

Figure 14:
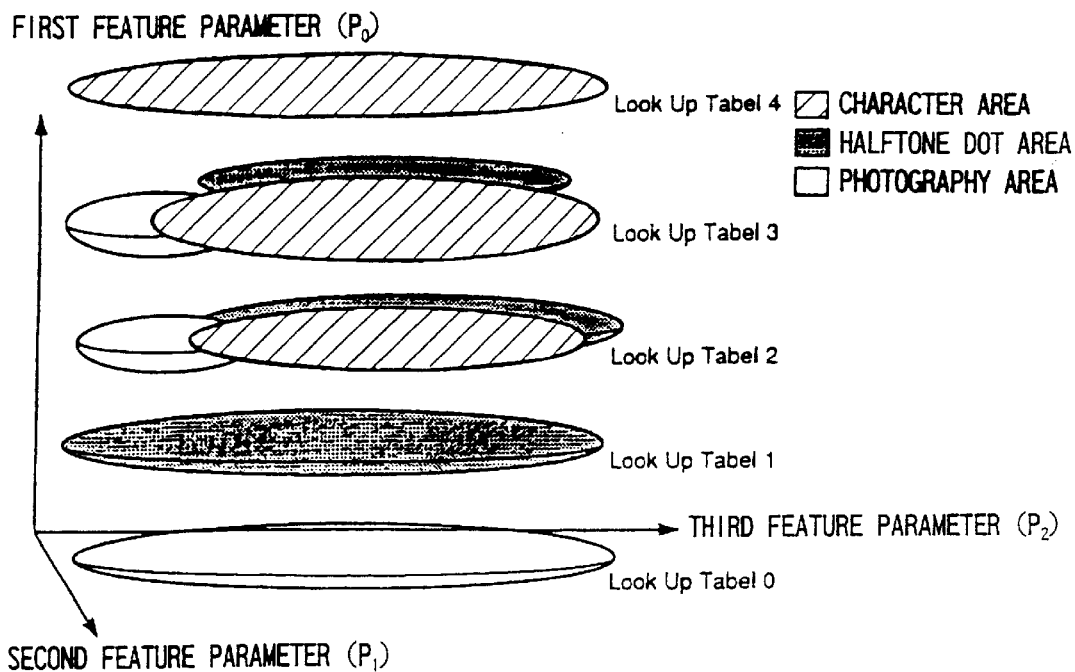
FIG. 14 is a diagram for representing a relationship between a plurality of lookup tables and a first predetermined feature amount employed in the above-explained area separating process.

Subsequently, at a step a6, the area separating unit 83 discriminates which one of the photograph area, the character area, and the halftone dot area contains the interest pixels in said area, by employing the first to third feature amounts P0 to P2. To this end, the area separating unit 83 is provided with a plurality of lockup tables. As represented in FIG. 14, the respective lockup tables are defined in correspondence with a portion of a range for values that the first feature amount P0 can be. The portions of the range corresponding to the respective lockup tables are different from each other. For example, the area separating unit 83 first selects any one of the lockup tables corresponding to the first feature amount P0 calculated at the step a3 from a plurality of lockup tables, based on the first feature amount P0. Next, the area separating unit 83 judges which one of the above-described three areas the pixel of interest belongs to based upon the selected lockup table in response to the second and third feature amounts El and P2.

At a step a7, the area separating unit 83 supplies the discrimination result obtained at the step a6, namely that which one of the three areas the pixel of interest is included in, to the filter unit 84. Then, the area separating process is accomplished at a step a8.

As shown in FIG. 14, when the first feature amount P0 is contained in the minimum value portion within the above range, in other words, when there is no edge within the area, the area separating unit 83 judges that the pixel of interest is included in the photograph area irrespective of the second feature amount P1 and the third feature amount P2. Also, when the first feature amount P0 is contained in the second minimum value portion within the above range, in other words, when there is a very small number of edges within the area, the area separating unit 83 judges that the pixel of interest is included in the halftone dot area irrespective of the second feature amount P1 and the third feature amount P2. Also, when the first feature amount P0 is contained in the second maximum value portion within the above range, in other words, when there are very large numbers of edges within the area, the area separating unit 83 judges that the pixel of interest is included in the character area irrespective of the second feature amount P1 and the third feature amount P2. In other words, the character area is such an area that when the edge detecting process is carried out with employment of such a filter that a summation of filter coefficients thereof is equal to "−1", no edge is detected within an image, or a very small number of edges is detected within the image.

Figure 15:
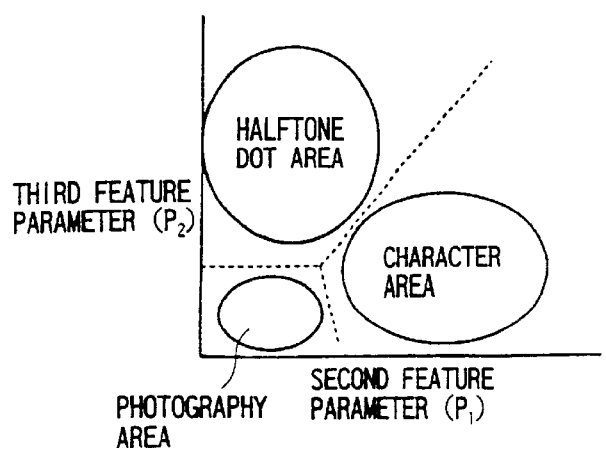
FIG. 15 is a diagram for representing a relationship between second/third predetermined feature amounts and separation results of the area representing processes in one arbitrary lookup table among the plural lookup tables.

Furthermore, in the case where the first feature amount P1 is included in a portion located between the second minimum portion and the maximum portion, an area where the pixel of interest is contained is defined in response to combinations of the second feature amount and the third feature amount based upon an area boundary shown in FIG. 15. In other words, the smaller both the second feature amount P1 and the third feature amount P2 are, the easier the area separating unit may judge that the pixel of interest is included in the photograph area. The larger only the second feature amount P1 becomes, the easier the area separating unit may judge that the pixel of interest is contained in the character area. Also, the larger only the third feature amount P2 becomes, the easier the area separating unit may judge that the pixel of interest is included in the halftone dot area. That is to say, the halftone dot area is such an area that the maximum density difference within the image is relatively large. The photograph area is such an area that the maximum density difference within the image is relatively small.

As previously explained, when the area separating unit 83 identifies which one of the above-described three areas the pixel of interest is included in, this area separating unit 83 auxiliarily employs both the maximum density difference within the area and the cumbersome degree within the area while using the edge information of the area as the first feature amount P0. As a result, since the area separating process is carried out in the multi-dimensional manner, the area separating unit 83 can execute the area separating process in a very high accuracy. It should be understood that when an image can be separated to the above-explained three areas, not only the above-described process, but also other processes may be added to the area separating process. Furthermore, the area separating unit 84 may alternatively separate an image into more than two areas, otherwise may separate this image into two areas. The above-described processes are related to the explanations of the area separating unit 83.

FIG. 16 is a schematic block diagram for representing a functional arrangement of the calculating unit 91 employed in the filter unit 84 according to the third embodiment. The calculating unit 91 contains a first comparator 71, a second comparator 74, a selector 75, and furthermore, a reference density setting unit 92. This reference density setting unit 92 is provided on the upper stream side of the signal flow from the second comparator 74. The reference density setting unit 92 includes a reference density storage unit 93, a switching control unit 94, and a multiplexer 95. The area separating unit 83 supplies the area separation result to the switching control unit 94.

The reference density storage unit 93 stores thereinto a plurality of reference densities which are set in correspondence with the character area, the photograph area, and the halftone dot area, respectively. The reference density storage unit 93 is connected to the multiplexer 95 by employing selection lines. A total number of these selection lines is equal to that of the reference density stored into this reference density storage unit 93. Signals indicative of these plural sets of reference densities are superimposed on the respective selection lines. The reference density corresponding to the character area is higher than the reference density corresponding to the photograph area, whereas the reference density corresponding to the photograph area is higher than the reference density corresponding to the halftone dot area. For instance, the reference density corresponding to the character area is 50, an d the reference density corresponding to the halftone dot area is 0.

In response to the above-explained area separation result, the switching control unit 94 determines a value of a control signal "Segsel" used to control the multiplexer 95, depending upon which one of the character area, the halftone dot area, and the photograph area the pixel of interest corresponds to. In response to the control signal Segsel, the multiplexer 95 selects any one of the selection lines specified by this control signal Segsel from the above-described selection lines, and then acquires the signal superimposed on this selected selection line. As a result, the multiplexer 95 acquires such reference density of any one of areas, which contains the pixel of interest, selected from the character area, the halftone dot area, and the photograph area. The reference density acquired by the multiplexer 95 is supplied to the second comparator 74. As a result, the second comparator 74 employs the reference density acquired by the multiplexer 95 as the reference density Lref.

Concretely speaking, the control signal is a digital signal having plural bits. The multiplexer 95 selects any one of the plural selection lines in response to the bits of the control signal. For example, when the pixel of interest is located within the halftone dot area, the switching control unit 94 sets the control signal Segsel to "01".

Since the reference density is selected to be "0" when the pixel of interest is located in the halftone dot area, the density of this interest pixel is always higher than, or equal to the reference density, namely higher than, or equal to the reference density Lref. As a consequence, the second comparator 74 continuously sets the flag FL to "1". As a result, when the pixel of interest is located in the halftone dot area, the calculating unit 91 always carries out the filtering process according to the first embodiment. As a consequence, all of the corrected pixels located within the halftone dot area do not become brighter than the pixels before being corrected. As a result, since the Moire phenomenon occurred in such an area that the entire area becomes relatively bright, for example, the halftone dot area, can be improved, the image which has been processed by the filtering process can be made with having a high image quality.

Figure 17:
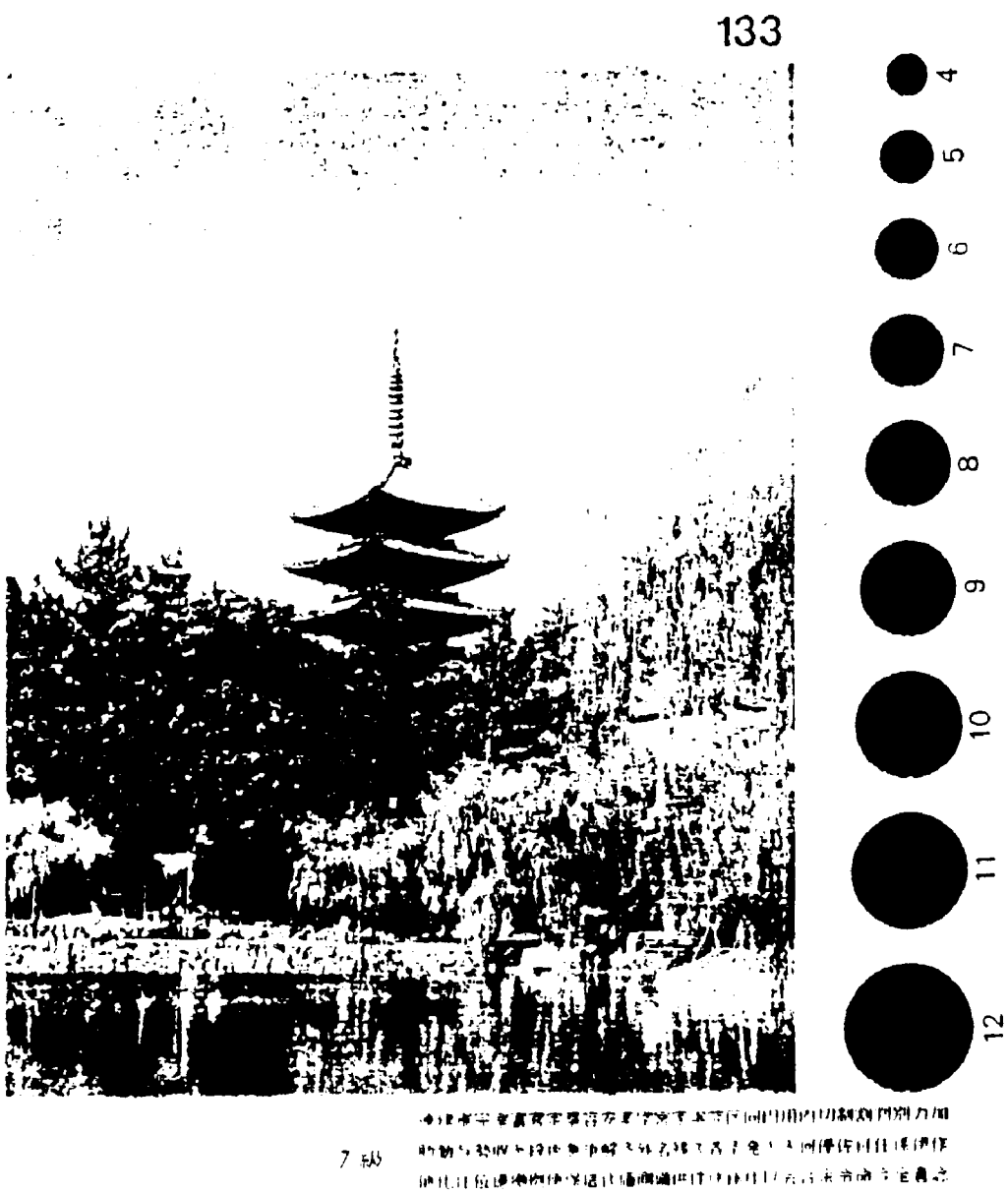
FIG. 17 is an image produced by scanning a predetermined test original by the copying machine of the third embodiment.
Figure 28:
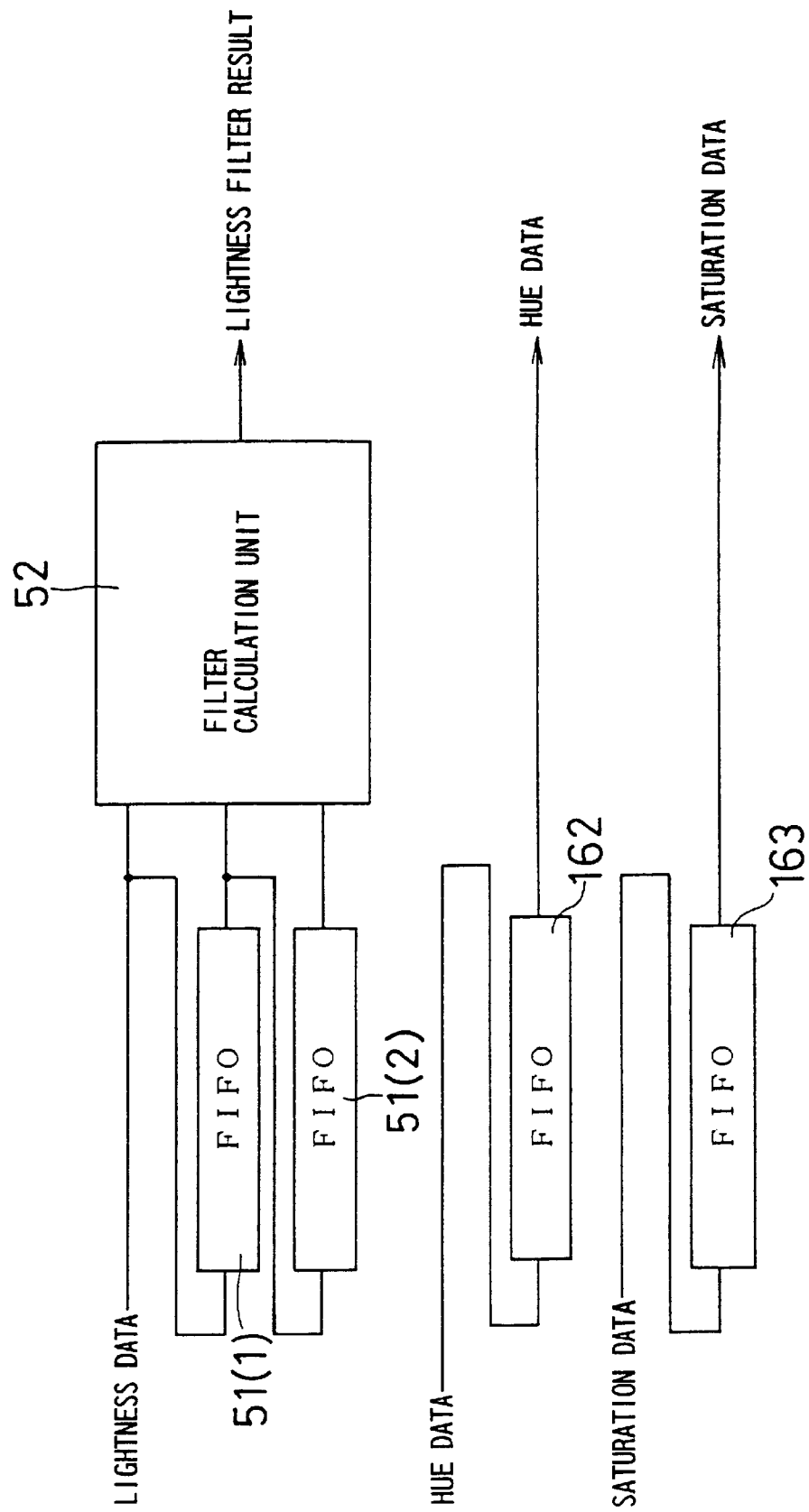
FIG. 28 is a schematic block diagram for showing an arrangement of a filter unit 161 provided in the image processing apparatus according to the tenth embodiment.
Figure 29:
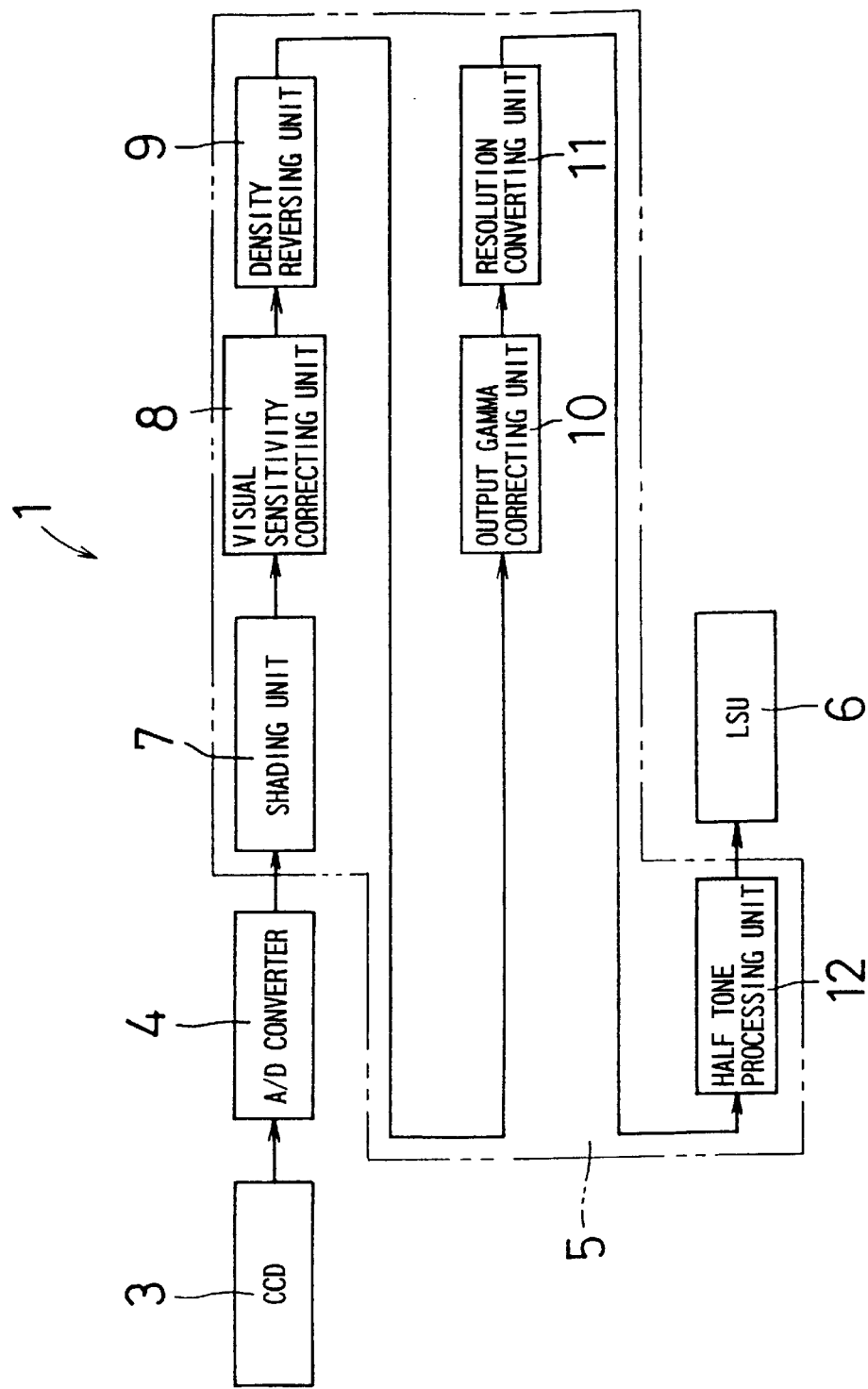
FIG. 29 is a block diagram for indicating the electronic arrangement of the copying machine 1 containing the first conventional image processing apparatus 5.

FIG. 17 represents such an image produced by filtering the test original as previously explained in FIG. 28 by employing the filter unit 84 according to the third embodiment. When the image indicated in FIG. 17 is compared with the images shown in FIG. 7, FIG. 28, and FIG. 32, it can be seen that no Moire phenomenon occurs in the halftone dot photograph portion by employing the filter unit 84 according to the third embodiment. This is because the halftone dot photograph portion is recognized by way of the above-explained area separating process to change the reference density. Moreover, in the character portion, the filter processing operation with employment of the edge enhancement filter shown in FIG. 33 is carried out. As a result, it can be seen that neither the scattering phenomenon, nor the blurring phenomenon occur, so that the clear-cut image can be represented.

Figure 18:
FIG. 18 shows a partially enlarged diagram of the image indicated in FIG. 7.

FIG. 18 shows such an image made by enlarging the character portion of the image shown in FIG. 7, and FIG. 19 shows such an image made by enlarging the character portion of the image indicated in FIG. 17. When the image of FIG. 18 is compared with the image of FIG. 19, it can be seen that the character portion of the image shown in FIG. 17 can be displayed sharper than that of FIG. 7.

Next, a description will be made of a copying machine containing an image processing apparatus according to a fourth embodiment of the present invention. The copying machine according to this fourth embodiment has a different structure from that of the copying machine 31 according to the first embodiment such that an image magnifying function is additionally employed with a scanning apparatus, and furthermore, the calculating unit 57 employed in the filter unit 44 is substituted by the below-mentioned calculating unit 101, and also other structural elements thereof are equivalent to those of the copying machine 31 according to the first embodiment. It should be understood that the same reference numerals shown in the copying machines according to the first to third embodiments will be employed as those for denoting the same, or similar components employed in the copying machine 81 according to the fourth embodiment, and therefore, explanations thereof are omitted. Furthermore, the descriptions concerning the same structural elements related to the copying machine according to the fourth embodiment as those for the copying machines according to the first to third embodiments will be omitted.

The scanning apparatus of the copying machine according to the fourth embodiment is equipped with an image magnifying function capable of enlarging, or reducing an original in response to an image magnifying ratio instructed from a user, namely a so-called "electronic zooming function". In a copying machine having a major object to reduce cost, when the above-explained image magnifying function is carried out, there are many cases that an adjustment of scanning operation along the main scanning direction is realized by way of a so-called "electronic zooming function", and an adjustment of scanning operation along the sub-scanning direction is realized by way of a scanning speed of an optical system, namely by way of the transport speed of either the reflection mirror or the imaging element 38 employed in the scanner optical system. The reason of such adjustment operations is given as follows. When the adjustment along the sub-scanning direction is carried out by way of the electronic zooming function, a line memory is necessarily required in order to save pixels of images of lines which are interposed among the plural lines acquired in the case where the image magnifying ratio is selected to be 100%, among the lines of the image pixels acquired when the original is scanned. As a result, the employment of such a line memory would possibly increase the entire system cost of this copying machine.

In the case where the sub-scanning direction is adjusted by way of the scanning speed of the optical system, when an original whose density is varied in a certain pattern is scanned plural times in different image magnifying ratios from each other, if a plurality of image data sets are acquired, then pattern periods of density changes within images indicated by these image data are different from each other. As a consequence, the image processing apparatus of the fourth embodiment must change the characteristic of the filter unit in correspondence with the image magnifying ratios.

Figure 20A:
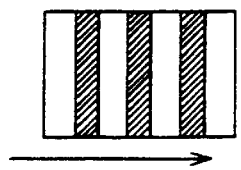
FIG. 20A to FIG. 20D are explanatory diagrams for explaining a relationship between an image magnification and an image density pattern in a copying machine containing an image processing apparatus according to a fourth embodiment mode of the present invention.
Figure 20B:
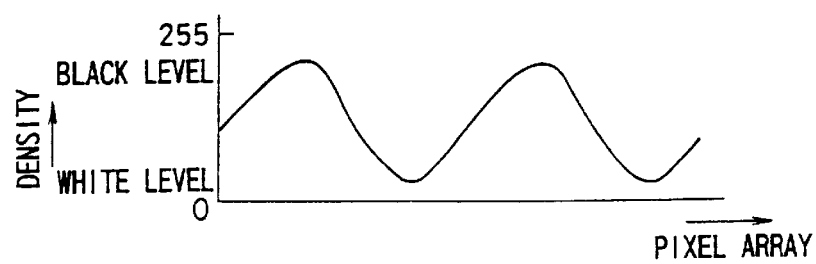
Figure 20C:
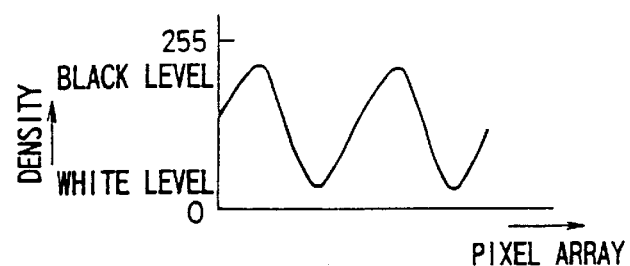
Figure 20D:
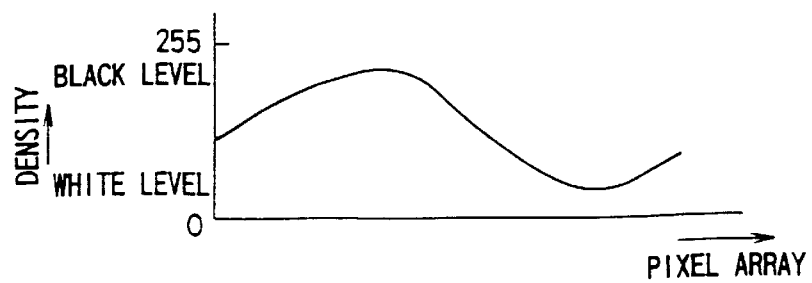

For example, it is now assumed that an original having a stripe pattern shown in FIG. 20A is scanned by the above-explained scanning apparatus more than one time in order that an arrow direction is positioned in parallel to the sub-scanning direction, and therefore, a plurality of image data sets are produced. FIG. 20B represents an image density distribution indicated by image data acquired when the image magnifying ratio is selected to be 100%. FIG. 20C indicates an image density distribution indicated by image data acquired when the image magnifying ratio is selected to be 50%. FIG. 20C represents an image density distribution indicated by image data acquired when the image magnifying ratio is selected to be 200%. When the image magnifying ratio is selected to be 100%, an original is scanned in an original size thereof. In the graphic representations of FIG. 20B to FIG. 20D, an abscissa thereof indicates density, and an ordinate thereof represents a pixel array of an image along the sub-scanning direction. When the image magnifying ratio is 50%, namely when the original is scanned by the reduction mode, since the scanning speed of the optical system is faster than that obtained when the image magnifying ratio is 100%, the period of the pattern along the sub-scanning direction becomes shorter than that obtained when the image magnifying ratio is 100%. When the image magnifying ratio is 200%, namely the original is scanned in the enlargement mode, the period of pattern along the sub-scanning direction must be prolonged, as compared with that of the pattern when the image magnifying ratio is selected to be 100%.

As previously described, the pattern period of the image along the sub-scanning direction is changed in connection with a change in the image magnifying ratio. As a result, the image processing apparatus of the fourth embodiment must change the characteristic of the filter unit in accordance with the image magnifying ratio. The reason why such an image magnifying ratio is change is given as follows: For example, when the image data acquired in the case where the image magnifying ratio is selected to be 200% is filtered by employing the filter coefficient used in the case where the image magnifying ratio is 100%, the resultant image indicated by the filtered image data would become an image having no clear/sharp image portion, namely an image having blurred edges. As a consequence, when the image magnifying ratio is selected to be 200%, such a filter with a stronger edge enhancement component must be employed, instead of the filter used when the image magnifying ratio is 100%. Moreover, in general, an edge of an image has been blurred, and this image is indicated by the image data acquired when the image magnifying ratio is selected to be larger than, or equal to 200%. As a consequence, even when this image is filtered by using a filter having a relatively strong edge enhancement component, the Moire phenomenon can not relatively occur.

As apparent from the foregoing description, when the image magnifying ratio exceeds 100%, namely when the original is scanned in the enlargement mode, the edge enhancement component of the filter must be strengthened. When the image magnifying ratio is smaller than 100%, namely when the original is scanned in the reduction mode, the edge enhancement component of he filter must be weakened so as to suppress the Moire phenomenon. Under such a circumstance, the filter unit employed in the image processing apparatus according to the fourth embodiment varies the reference density Lref used in the above calculating unit. As a result, since it is possible to achieve the same effect as that obtained when the edge enhancement component of the filter is increased/decreased, the quality of the filtered image can be further improved.

Figure 21:
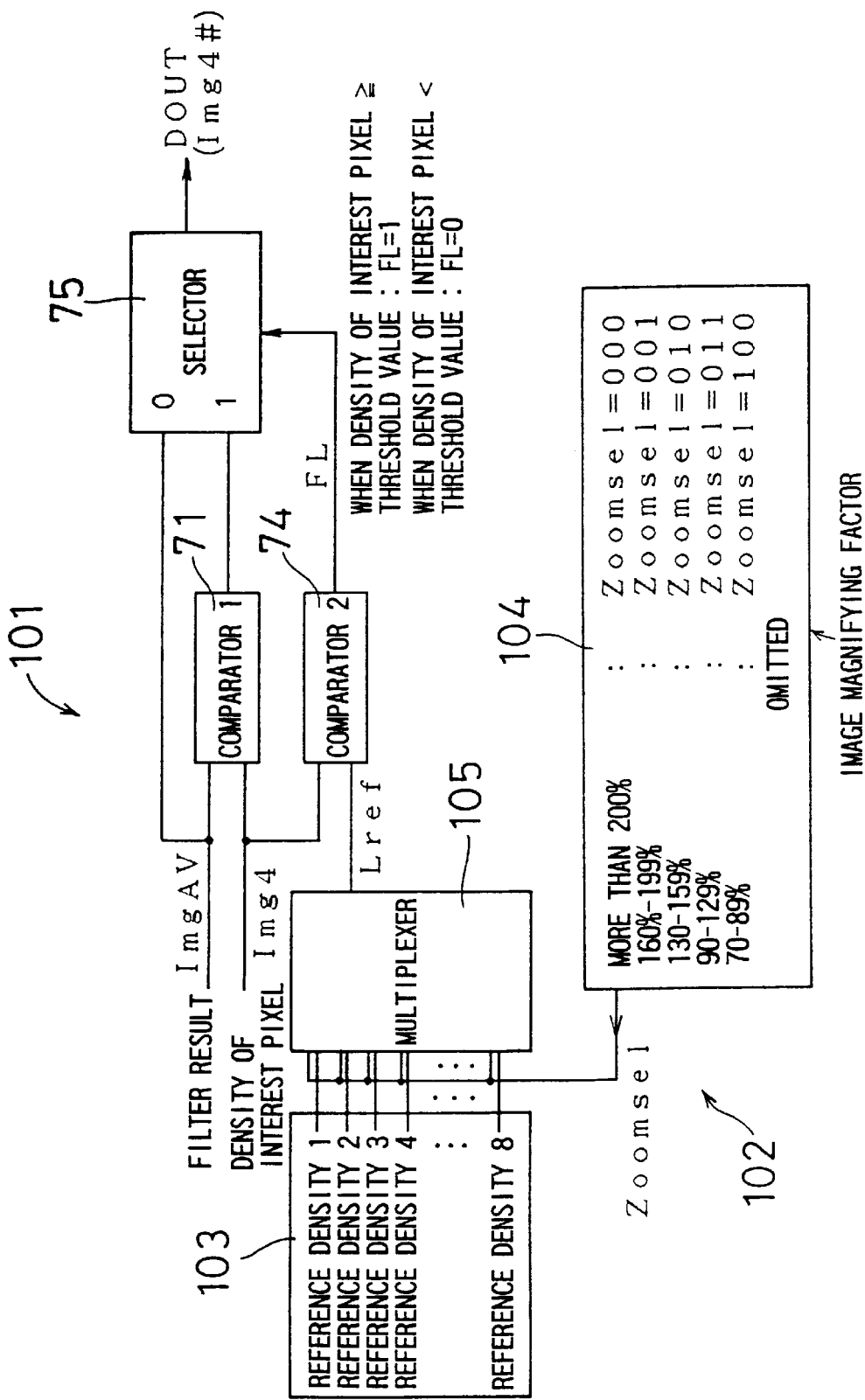
FIG. 21 is a schematic block diagram for indicating a concrete arrangement of a calculating unit 101 contained in a filter unit employed in the image processing apparatus provided in the copying machine according to the fourth embodiment.

FIG. 21 is a schematic block diagram for representing a functional arrangement of the calculating unit 101 contained in the filter unit of the fourth embodiment. The calculating unit 101 contains a reference density setting unit 102 in addition to the first comparator 71, the second comparator 74, and the selector 75. The reference density setting unit 102 is provided on the up stream side of the signal flow from the second comparator 74. The reference density setting unit 102 sets the reference density Lref to be low levels, depending upon the image magnifying ratio set to the scanning apparatus 33, while the image magnifying ratio is increased. The set reference density Lref is supplied to the second comparator 74.

Concretely speaking, the reference density setting unit 102 contains a reference density storage unit 103, a switching control unit 104, and a multiplexer 105. The reference density storage unit 103 stores thereinto a plurality of reference densities in accordance with a plurality of preset image magnifying ranges. A plurality of image magnifying ratio ranges correspond to a plurality of small ranges obtained by subdividing all ranges where the image magnifying ratio can be varied into a plurality of stages. For example, as to the plural magnifying ranges, a reference density corresponding to such a range containing a maximum image magnifying ratio is equal to 120, whereas a reference density corresponding to such a range containing a minimum image magnifying ratio is equal to 30. A connecting relationship between this reference density storage unit 103 and the multiplexer 105 is substantially equal to the connecting relationship between the above-described reference density storage unit 93 of the third embodiment and the multiplexer 95.

Based on the image magnifying ratio designated by the user, the switching control unit 104 determines a value of a control signal Zoomsel used to control the multiplexer 105, depending upon which one of the plural image magnifying ratio ranges this image magnifying ratio is included in. In response to the control signal Zoomsel, the multiplexer 105 selects any one of the plural selection lines, which is specified by this control signal Zoomsel, and thus acquires a signal superimposed on this selected selection line. Also, for instance, in the case where the filter coefficient can be switched into 8 stages, depending upon the image magnifying ratio, when this switching control unit 104 switches the filter coefficient, and also switches the reference density lref employed in the calculating unit 101 at the same time, a specific effect may be achieved.

For example, when the image magnifying ratio is set to be equal to or larger than 200%, the value of the control signal Zoomsel is set to "000". As a result, the multiplexer 105 selects a maximum reference density value from all of the reference density values, for example, "120". In other words, the reference density equivalent to the darkest color is selected from all of the reference density. As a result, an effective range of the filtering process of the first embodiment becomes the narrowest range. This effective range of the filtering process according to the first embodiment implies such a density range that the flag FL becomes 1 within the effective density range. Only when the pixel of interest is equal to the density within the effective range of the filter processing operation according to the first embodiment, the filtering process as explained with reference to the first embodiment is carried out for the area made of 3 pixels×3 pixels, which contains this pixel of interest. As a result, since the total number of pixels which are processed by the conventional filtering process is increased, as compared with that of selecting another image magnifying ratio range, the filtered image can have the clear/sharp image portions. Moreover, when such a pixel whose density becomes higher than, or equal to 120, constitutes a pixel of interest, since the filtering process according to the first embodiment is carried out, it is possible to prevent the white dropouts from the black solid portion.

Also, in the case where the image magnifying ratio is set below 50%, the control signal Zoomsel is set to a maximum value, for example, "111". As a result, the multiplexer 105 selects a minimum value, for example, "30" among all of the reference density. In other words, such reference density equivalent to the brightest color is selected from all of the reference density. As a result, the effective range of the filtering process according to the first embodiment becomes the widest range. Accordingly, since a total number of pixels to which the filtering processes of the first embodiment is carried out is increased, as compared with the total number of pixels when another image magnifying ratio range is selected, this filtering process is controlled so as to prevent the occurrence of the Moire phenomenon. Consequently, the image quality of the filtered image can be improved.

It should also be noted that the above-described reference density may be increased in the stepwise manner with respect to the image magnifying ratio, as described in this embodiment, or may be increased in continuous manner with respect to the image magnifying ratio. Also, when the reference density is increased in the continuous manner, this reference density may be increased in proportional to the image magnifying ratio, or may be increased while taking a relationship with the image magnifying ratio, other than the proportional relationship.

Next, a description will be made of a copying machine containing an image processing apparatus according to a fifth embodiment of the present invention. The copying machine according to this fifth embodiment has a different structure from that of the copying machine 31 according to the first embodiment such that a so-called "mode setting function" is additionally employed, and furthermore, the calculating unit 57 employed in the filter unit 44 is substituted by the below-explained calculating unit 111, and also other structural elements thereof are equivalent to those of the copying machine 31 according to the first embodiment. It should be understood that the same reference numerals shown in the copying machines according to the first to fourth embodiments will be employed as those for denoting the same, or similar components employed in the copying machine 81 according to the fifth embodiment, and therefore, explanations thereof are omitted. Furthermore, the descriptions concerning the same structural elements related to the copying machine 81 according to the fifth embodiment as those for the copying machines according to the first to fourth embodiments will be omitted.

The copying machine according to the fifth embodiment causes a user to designate any one of plural modes so as to adjust operations of various operation units provided in this copying machine in response to the designated mode. The reason why a plurality of modes are provided is given as follows: That is, there are many cases that the operators of this copying machine may have different expectations as to image qualities of images outputted from this copying machine in accordance with originals to be processed. For instance, generally speaking, when an original having a dark background such as a newspaper is copied, it is not desirable to also reproduce the background on an outputted image. To the contrary, when another original having a bright background such as a silver halide photograph is copied, it is required that the background can be reproduced in detail on an outputted image. As previously explained, in order that the user causes the copying machine to adjust the image qualities of the images outputted from the copying machine in response to the original to be processed, a plurality of modes are prepared in this copying machine. Since any one of these plural modes is selected, the overall operation condition of this copying machine is adjusted in such a manner that the image quality of the image outputted from this copying machine can be optimized when the original is scanned in response to the mode. As one manner of this adjustment, the filter unit 111 changes the reference density Lref employed in the calculating unit in response to the selected mode. As a result, the image quality of the filtered image can be furthermore improved.

Subsequently, it is now assumed that the copying machine according to the embodiment is equipped with 5 modes such as a character mode, a photograph/character mode, a photograph mode, a soft photograph mode, and an automatic exposure mode. The character mode is an optimum mode when only a character is drawn on an original to be processed. The photograph/character mode is an optimum mode in the case where a halftone dot photograph is mixed with a character in an original to be processed, for example, a leaflet containing a halftone dot photograph is an original to be processed. The photograph mode is an optimum mode when an original to be processed is a silver halide photograph. The soft photograph mode is an optimum mode when an original to be processed is a paint photograph. A paint photograph corresponds to a picture which is displayed in a continuous gradation, and in which reflectivity of an original surface is smaller than that of a silver halide photograph, for example, a watercolor painting. The automatic exposure mode corresponds to a mode under which the operation condition of the copying machine becomes default. While the automatic exposure mode is selected, when a newspaper is selected as the original to be processed, the copying machine can perform a so-called "underground removing operation".

Figure 22:
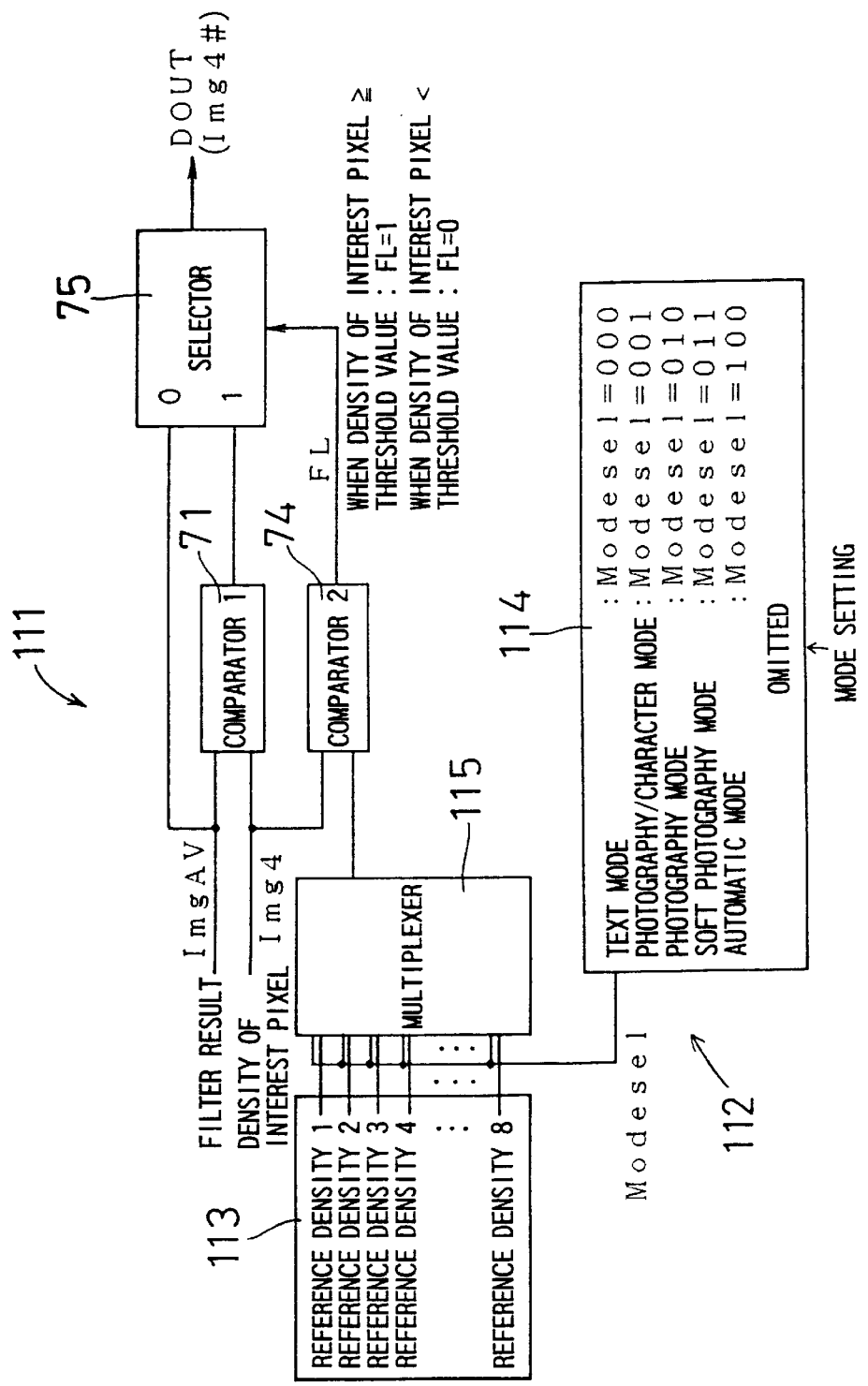
FIG. 22 is a schematic block diagram for indicating a concrete arrangement of a calculating unit 111 contained in a filter unit provided in an image processing apparatus in a copying machine containing an image processing apparatus according to a fifth embodiment mode of the present invention.

FIG. 22 is a schematic block diagram for representing a functional arrangement of the calculating unit 111 contained in the filter unit of the fifth embodiment. The calculating unit 111 contains a reference density setting unit 112 in addition to the first comparator 71, the second comparator 74, and the selector 75. The reference density setting unit 112 is provided on the up stream side of the signal flow from the second comparator 74. The reference density setting unit 112 sets a reference density in response to a mode set by a user.

Concretely speaking, the reference density setting unit 112 contains a reference density storage unit 113, a switching control unit 114, and a multiplexer 115. The reference density storage unit 113 stores thereinto a plurality of reference densities in accordance with a plurality of preset modes. For example, a reference density corresponding to the character mode is higher than that corresponding to the character/photograph mode, and a reference density corresponding to the character/photograph mode is higher than a reference density corresponding to the photograph mode. A reference density corresponding to the automatic exposure mode is substantially equal to the reference density corresponding to the character mode. Also, a reference density corresponding to the soft photograph mode is substantially equal to the reference density corresponding to the photograph mode. A connecting relationship between this reference density storage unit 113 and the multiplexer 115 is substantially equal to the connecting relationship between the above-described reference density storage unit 93 of the third embodiment and the multiplexer 95.

Based on the mode designated by the user, the switching control unit 114 determines a value of a control signal Modesel used to control the multiplexer 115. In response to the control signal Modesel the multiplexer 115 selects any one of the plural selection lines, which is specified by this control signal Modesel, and thus acquires a signal superimposed on this selected selection line. As a result, the reference density selected in accordance with the mode designated by the operator is supplied as a reference density to the second comparator 74. The second comparator 74 performs the process by employing the supplied reference density.

For example, when the character mode is designated, the value of the control signal Modesel is set to "000". As a result, the multiplexer 115 selects a maximum reference density value from all of the reference density values, for example, "120". As a consequence, the effective range of the filter processing operation according to the filter processing operation according to the first embodiment mode becomes the narrowest range. Therefore, the filtered image becomes the clear/sharp image. Moreover, in the case where a pixel whose density is higher than, or equal to 120 will constitute a pixel of interest, since the filtering process according to the first embodiment is carried out, it is possible to prevent the white dropouts in the black solid portion.

Also, When the photograph mode is designated, the control signal Modesel is set to "010". Thus, the multiplexer 115 selects a minimum reference density value from all of the reference density values, for example, 10. As a result, the effective range of the filtering process according to the first embodiment becomes the widest range. Therefore, the filtered image becomes a smooth image. Moreover, in the case where a pixel whose density is higher than, or equal to 10 will constitute a pixel of interest, since the filtering process according to the first embodiment is carried out, it is possible to prevent the while dropouts in the black solid portion. Also, the resulting character can become clear.

Next, a description will be made of a copying machine containing an image processing apparatus according to a sixth embodiment of the present invention. The copying machine according to this sixth embodiment has a different structure from that of the copying machine 31 according to the first embodiment such that an area separating unit 83 and the above-mentioned image magnifying function are additionally employed, and furthermore, the calculating unit 57 employed in the filter unit 44 is substituted by the below-mentioned calculating unit 121 and also other structural elements thereof are equivalent to those of the copying machine 31 according to the first embodiment. It should be understood that the same reference numerals shown in the copying machines according to the first to fifth embodiments will be employed as those for denoting the same, or similar components employed in the copying machine according to the fifth embodiment, and therefore, explanations thereof are omitted. Furthermore, the descriptions concerning the same structural elements related to the copying machine according to the sixth embodiment as those for the copying machines according to the first and fifth embodiments will be omitted.

The image processing apparatus according to the sixth embodiment adjusts a strength of a filtering process carried out in a filter unit provided in the image processing apparatus of the sixth embodiment based upon a process result of an area separating process and an image magnifying ratio designated by an operator. The reason why such a filtering process strength is adjusted is given as follows: In the case where a scanning speed along the sub-scanning direction is adjusted in response to the image magnifying ratio during scanning operation of an original, when an image is enlarged as compared with the original, edges contained in this image may be readily blurred. As a consequence, these edges must be emphasized in the filter unit before the image is printed out. Also, in the above-described case, when the image is reduced as compared with the original, the edges thereof can be hardly blurred as compared with the image enlargement case. However, when this image is filtered by employing a filter having a strong edge enhancement component, the Moire phenomenon may occur in a halftone dot area within the image. As a consequence, the image is edge-emphasized in the filter unit before this image is printed out at a weaker edge enhancement degree than that for the image enlargement. Alternatively, a so-called "smoothing process" must be carried out for the above image. Furthermore, it is preferable to change the filtering process characteristic in response to feature amounts of areas containing a pixel of interest when a plurality of areas whose feature amounts are different from each other are located in an image. For example, a filtering process with using a so-called "smoothing filter" is carried out for a photograph area, whereas another filtering process with using an edge enhancement filter is carried out for a character area.

As a consequence, when the edge enhancement carried out in the filtering process with using the filter unit 121 is adjusted in response to both the process result of the area separating process and the image magnifying ratio, the image quality of the image which has been filtered can become higher than that which has not yet been filtered. Concretely speaking, the larger the image magnifying ratio is, the stronger the strength of the above-described edge enhancement becomes. The strengths of this edge enhancement are sequentially decreased in the case where the pixel of interest is included in the character area, in the case where the pixel of interest is included in the halftone dot area, and in the case where the pixel of interest is contained in the photograph area in this order. When the reference density is increased/decreased, the same effect can be achieved as in the case where the edge enhancement component of the filter is increased/decreased. The larger the strength of the above-described edge enhancement becomes, the larger the reference density is set.

A table 4 represents a reference density corresponding to the respective typical conditions of first setting conditions employed in the copying machine. The first setting conditions indicate combinations between process results of area separating process and image magnifying ratios, may be conditions other than the setting conditions shown in this table 4. Concrete values of the reference density indicated in this table 4 are acquired by way of experiments. These concrete values are varied in accordance with a technical specification of an imaging element employed in a copying machine. The high/low relationship among the reference density corresponding to the respective first setting conditions shown in a table 4 is not changed irrespective of the technical specification of the imaging element. Even when the copying machine can set the copy mode, the reference density of the respective first setting conditions shown in this table 4 is suitable for outputting such an image having an optimum image quality irrespective of the set mode.

TABLE 4

| first setting condition | | | |
|---|---|---|---|
| image-magnifying ratio | area containing interest pixel | reference density | degree of edge enhancement |
| max. (enlarge) | character area | 113 | maximum |
| min. (reduce) | character area | 100 | ↓ |
| max. (enlarge) | halftone dot area | 85 | |
| min. (reduce) | halftone dot area | 73 | |
| max. (enlarge) | photograph area | 56 | |
| min. (reduce) | photograph area | 46 | minimum |

Figure 23:
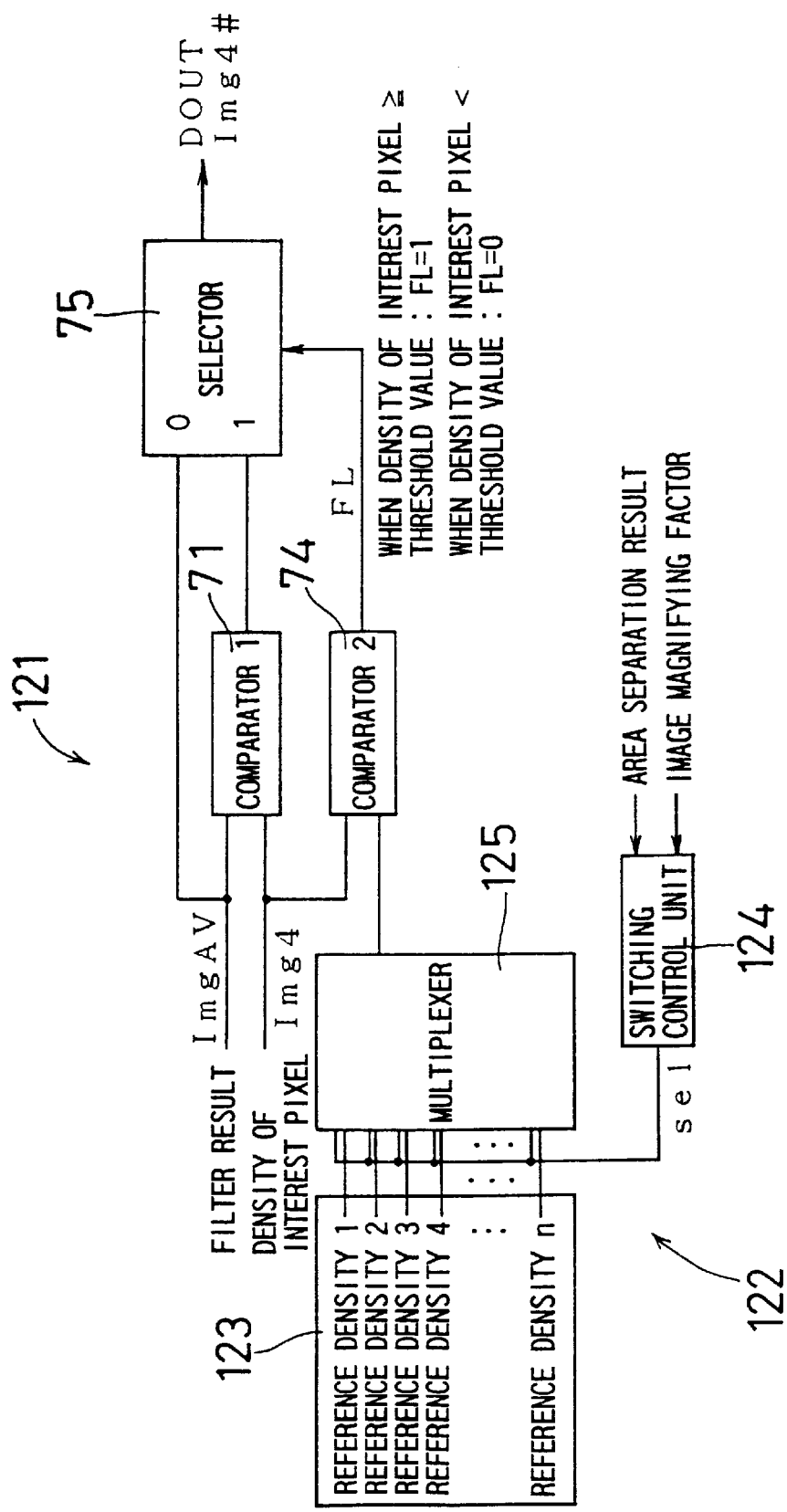
FIG. 23 is a schematic block diagram for showing a concrete arrangement of a calculating unit 121 contained in a filter unit provided in an image processing apparatus in a copying machine according to a sixth embodiment mode of the present invention.

FIG. 23 is a schematic block diagram for representing a functional arrangement of the calculating unit 121 contained in the filter unit of the sixth embodiment. The calculating unit 121 contains a reference density setting unit 122 in addition to the first comparator 71, the second comparator 74, and the selector 75. The reference density setting unit 122 is provided on the up stream side of the signal flow from the second comparator 74. The reference density setting unit 122 sets a reference density in accordance with the first setting condition, namely the combination between the image magnifying ratio and the area in which the pixel of interest is contained.

Concretely speaking, the reference density setting unit 122 contains a reference density storage unit 123, a switching control unit 124, and a multiplexer 125. The reference density storage unit 123 stores thereinto a plurality of reference densities in accordance with a plurality of the above-described first setting conditions. A connecting relationship between this reference density storage unit 123 and the multiplexer 125 is substantially equal to the connecting relationship between the reference density storage unit 93 of the third embodiment and the multiplexer 95 thereof. The switching control unit 124 is equipped with a truth table as a table. This truth table indicates concrete values of control signals "sel" corresponding to a plurality of first setting conditions. A table 5 represents the above-explained truth table. Based upon both the area separating result obtained from the area separating unit 83 and the image magnifying ratio designated by the user, the switching control unit 124 determines a value of the control signal sel used to control the multiplexer 125 with reference to the above table. In response to the control signal sel, the multiplexer 125 selects any one of the plural selection lines, which is specified by this control signal sel and thus acquires a signal superimposed on this selected selection line. As a result, the reference density corresponding to the combination between both the area separating result obtained from the area separating unit 83 and the image magnifying ratio designated by the operator is supplied as the reference density to the second comparator 74. The second comparator 74 carries out the process by using the given reference density.

TABLE 5

| setting condition | | |
|---|---|---|
| electronic image magnification | area separation | sel |
| equal to or more than 200% | character area | 00000 |
| 160%~199% | character area | 00001 |
| 130%~159% | character area | 00010 |
| 90%~129% | character area | 00011 |
| 70%~89% | character area | 00100 |
| : | : | : |
| equal to or more than 200% | photograph area | 01000 |
| 160%~199% | photograph area | 01001 |
| 130%~159% | photograph area | 01010 |
| 90%~129% | photograph area | 01011 |
| 70%~89% | photograph area | 01100 |
| : | : | : |
| equal to or more than 200% | halftone dot area | 10000 |
| 160%~199% | halftone dot area | 10001 |
| 130%~159% | halftone dot area | 10010 |
| 90%~129% | halftone dot area | 10011 |
| 70%~89% | halftone dot area | 10100 |
| : | : | : |

For example, in the case where the image magnifying ratio is set to be more than, or equal to 200%, namely when it is so judged that the image is enlarged and further the pixel of interest is located in the character area, the control signal sel is set to "00000". As a result, the multiplexer 125 selects a maximum reference density value from all of the reference density values, for example, "120". As a result, an effective range of the filtering process of the first embodiment becomes the narrowest range, so that the filtered image can have the clear/sharp image portions. Moreover, when such a pixel whose density becomes higher than, or equal to 120, constitutes a pixel of interest, since the filtering process according to the first embodiment is carried out, it is possible to prevent the white dropouts from the black solid portion. On the other hand, when the image magnifying ratio is selected to be 50%, namely the image is reduced and the pixel of interest is judged as being located in the photograph area, the control signal sel is set to "011111". As a consequence, the multiplexer 125 selects a minimum reference density value from all of the reference density values, for example, 10. As a result, the effective range of the filtering process according to the first embodiment becomes the widest range. Therefore, the filtered image becomes a smooth image. Moreover, in the case where a pixel whose density is higher than, or equal to 10 will constitute a pixel of interest, since the filtering process according to the first embodiment is carried out, it is possible to prevent the white dropouts in the black solid portion. Also, the resulting character can become clear.

Next, a description will be made of a copying machine containing an image processing apparatus according to a seventh embodiment of the present invention. The copying machine according to this seventh embodiment has a different structure from that of the copying machine 31 according to the first embodiment such that an area separating unit 83 and the above-described "mode setting function" are additionally employed, and furthermore, the calculating unit 57 employed in the filter unit 44 is substituted by the below-explained calculating unit 131, and also other structural elements thereof are equivalent to those of the copying machine 31 according to the first embodiment. It should be understood that the same reference numerals shown in the copying machines according to the first to sixth embodiments will be employed as those for denoting the same, or similar components employed in the copying machine according to the seventh embodiment, and therefore, explanations thereof are omitted. Furthermore, the descriptions concerning the same structural elements related to the copying machine according to the seventh embodiment as those for the copying machines according to the first to sixth embodiments will be omitted.

The copying machine according to the seventh embodiment adjusts an image quality of an outputted image in response to a designated mode by an operator. As previously explained, this is because operators have different expectations about image qualities of images to be printed out in accordance with originals to be processed. For example, in a character mode, an edge within an image to be printed out must be made clear. For instance, in a photograph mode, it is important even for an image to be outputted that the smoothness of the density gradation characteristic in the original must be maintained. As a result, it is preferable not to emphasize an edge, as compared with an image to be printed out in the character mode. In the case where a plurality of areas whose feature amounts are different from each other are provided in a single image, filter processing characteristics are preferably changed in response to feature amounts of areas in which pixels of interest are contained.

As a consequence, when the edge enhancement carried out in the filtering process with using the filter unit of the image processing apparatus according to the sixth embodiment is adjusted in response to both the process result of the area separating process and the mode designated by the operator, the image quality of the image which has been filtered can become higher than that which has not yet been filtered. Concretely speaking, the strength of the above-described edge enhancement is decreased in this order when the character mode is selected, when the character photograph mode is selected, and when the photograph mode is selected. Furthermore, the strengths of the edge enhancement mode are decreased in the case where the pixel of interest is included in the character area, in the case where the pixel of interest is included in the halftone dot area, and in the case where the pixel of interest is contained in the photograph area in this order. When the reference density is increased/decreased, the same effect can be achieved as in the case where the edge enhancement component of the filter is increased/decreased. The larger the strength of the above-described edge enhancement becomes, the larger the reference density is set.

A table 6 represents a reference density corresponding to the respective typical conditions of second setting conditions employed in the copying machine. The second setting conditions indicate combinations between process results of area separating process and the designated modes, may be conditions other than the setting conditions shown in this table 6. Concrete values of the reference density indicated in this table 6 are acquired by way of experiments. These concrete values are varied in accordance with a technical specification of an imaging element employed in a copying machine. The high/low relationship among the reference density corresponding to the respective second setting conditions is not changed irrespective of the technical specification of the imaging element. Even when the image magnifying ratio of the copying machine can be varied, the reference density of the second setting conditions shown in this table 6 is suitable for outputting such an image having an optimum image quality irrespective of the image magnifying ratio.

TABLE 6

| second setting condition | | | |
|---|---|---|---|
| area containing interest pixel | mode | reference density | degree of edge enhancement |
| character area | character mode | 123 | maximum |
| halftone dot area | character mode | 91 | ↓ |
| photograph area | photograph mode | 74 | |
| character area | character mode | 59 | |
| halftone dot area | photograph mode | 55 | |
| photograph area | photograph mode | 37 | minimum |

Figure 24:
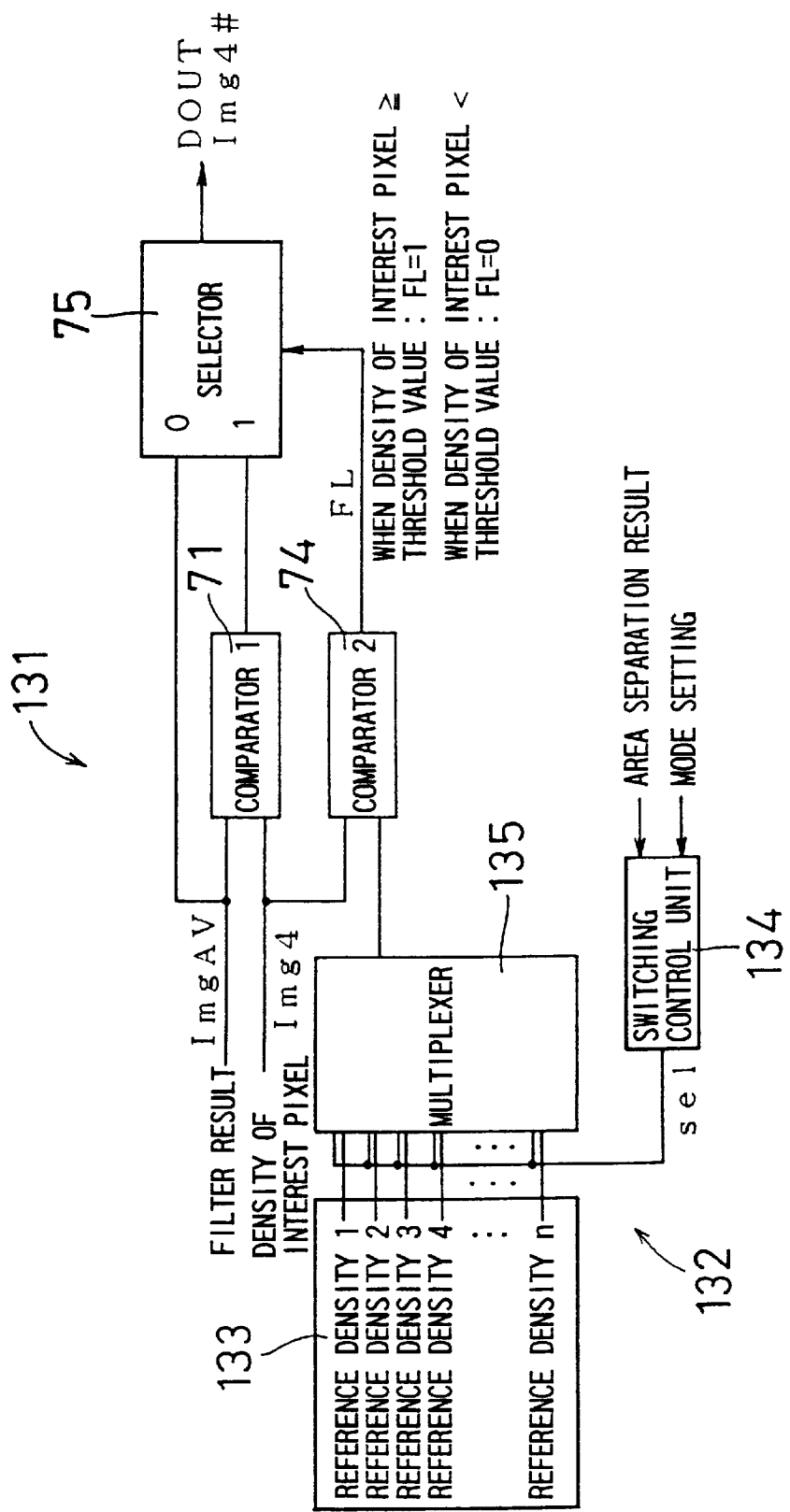
FIG. 24 is a schematic block diagram for indicating a concrete arrangement of a calculating unit 131 contained in a filter unit provided in an image processing apparatus in a copying machine containing an image processing apparatus according to a seventh embodiment mode of the present invention.

FIG. 24 is a schematic block diagram for representing a functional arrangement of the calculating unit 131 contained in the filter unit of the sixth embodiment. The calculating unit 131 contains a reference density setting unit 132 in addition to the first comparator 71, the second comparator 74, and the selector 75. The reference density setting unit 132 is provided on the up stream side of the signal flow from the second comparator 74. The reference density setting unit 132 sets a reference density in accordance with the second setting condition, namely the combination between the designated mode and the area in which the pixel of interest is contained.

Concretely speaking, the reference density setting unit 132 contains a reference density storage unit 133, a switching control unit 134, and a multiplexer 135. The reference density storage unit 133 stores thereinto a plurality of reference densities in accordance with a plurality of the above-described second setting conditions. A connecting relationship between this reference density storage unit 133 and the multiplexer 135 is substantially equal to the connecting relationship between the reference density storage unit 93 of the third embodiment and the multiplexer 95 thereof. The switching control unit 134 is equipped with a truth table as a table. This truth table indicates concrete values of control signals "sel" corresponding to a plurality of second setting conditions. A table 7 represents the above-explained truth table. Based upon both the area separating result obtained from the area separating unit 83 and the image magnifying ratio designated by the sperator, the switching control unit 134 determines a value of the control signal sel used to control the multiplexer 135 with reference to the above table. In response to the control signal sel, the multiplexer 135 selects any one of the plural selection lines which is specified by this control signal sel, and thus acquires a signal superimposed on this selected selection line. As a result, the reference density corresponding to the combination between the combination between both the area separating result obtained from the area separating unit 83 and the mode designated by the operator is supplied as the reference density to the second comparator 74. The second comparator 74 carries out the process by using the given reference density.

TABLE 7

| setting condition | | |
|---|---|---|
| mode | area separation | sel |
| text mode | character area | 0000 |
| text mode | halftone dot area | 0001 |
| text mode | photograph area | 0010 |
| text/photograph mode | character area | 0011 |
| text/photograph mode | halftone dot area | 0100 |
| text/photograph mode | photograph area | 0101 |
| photograph mode | character area | 0110 |
| photograph mode | halftone dot area | 0111 |
| photograph mode | photograph area | 1000 |
| photograph mode | character area | 1001 |

For example, in the case where the character mode is designated, and furthermore, it is so judged that the pixel of interest is located in the character area, the control signal sel is set to "0000". As a result, the multiplexer 135 selects a maximum reference density value from all of the reference density values, for example, "120". As a result, an effective range of the filtering process of the first embodiment becomes the narrowest range, so that the filtered image can have the clear/sharp image portions. Moreover, when such a pixel whose density becomes higher than, or equal to 120, constitutes a pixel of interest, since the filtering process according to the first embodiment is carried out, it is possible to prevent the white dropouts from the black solid portion. On the other hand, in the case where the photograph mode is designated and the pixel of interest is located in the photograph area, the control signal sel is set to "1001". As a consequence, the multiplexer 135 selects a minimum reference density value from all of the reference density values, for example, 10. As a result, the effective range of the filtering process according to the first embodiment becomes the widest range. Therefore, the filtered image becomes a smooth image. Moreover, in the case where a pixel whose density is higher than, or equal to 10 will constitute a pixel of interest, since the filtering process according to the first embodiment is carried out, it is possible to prevent the white dropouts in the black solid portion. Also, the resulting character can become clear.

Now, a description will be made of a copying machine containing an image processing apparatus according to an eighth embodiment of the present invention. The copying machine according to seventh embodiment has a different structure from that of the copying machine 31 according to the first embodiment such that the image magnifying function and the above-described "mode setting function" are additionally employed, and furthermore, the calculating unit 57 employed in the filter unit is substituted by the below-explained calculating unit 141, and also other structural elements thereof are equivalent to those of the copying machine 31 according to the first embodiment. It should be understood that the same reference numerals shown in the copying machines according to the first to seventh embodiments will be employed as those for denoting the same, or similar components employed in the copying machine according to the eighth embodiment, and therefore, explanations thereof are omitted. Furthermore, the descriptions concerning the same structural elements related to the copying machine according to the eighth embodiment as those for the copying machines according to the first to seventh embodiments will be omitted.

As previously described in the third to seventh embodiment modes, in the case where the strength of the edge enhancement component of the filter processing operation is strengthened when the character mode is designated whereas the strength of the edge enhancement component of the filter processing operation is weakened when the photograph mode is selected, the image qualities of the images which have been filtered in the respective modes can be improved. Also, the larger the image magnifying ratio is, the higher the image quality of the filtered image with a stronger edge enhancement component is. Under such a circumstance, when the strength of the edge enhancement component is adjusted based upon both the image magnifying ratio and the mode designated by the operator, the image quality of the image which has been filtered can be furthermore improved, as compared with the image quality of the image which has not yet been filtered. Concretely speaking, the strengths of the edge enhancement component are decreased when the character mode is selected, when the character/photograph mode is selected, and when the photograph mode is selected in this order. Moreover, the larger the image magnifying ratio is, the stronger the strength of the edge enhancement component is. The larger the strength of the above-described edge enhancement becomes, the larger the reference density is set.

A table 8 represents a reference density corresponding to the respective typical conditions of third setting conditions employed in the copying machine. The third setting conditions indicate combinations between designated modes and image magnifying ratios, may be conditions other than the setting conditions shown in this table 8. Concrete values of the reference density indicated in this table 8 are acquired by way of experiments. These concrete values are varied in accordance with a technical specification of an imaging element employed in a copying machine. The high/low relationship among the reference densities corresponding to the combinations between the image magnifying ratios and the designated modes shown in the table 6 is not changed irrespective of the technical specification of the imaging element. Even when the area separating unit 83 is further added to the copying machine, the reference densities of the respective combinations shown in this table 8 are suitable for outputting such an image having an optimum image quality irrespective of the set mode.

TABLE 8

| third setting condition | | | degree of |
| --- | --- | --- | --- |
| image-magnifying ratio | mode | reference density | edge enhancement |
| max. (enlarge) | character area | 96 | maximum |
| min. (reduce) | character area | 86 | ↓ |
| max. (enlarge) | photograph area | 63 | |
| min. (reduce) | photograph area | 48 | minimum |

Figure 25:
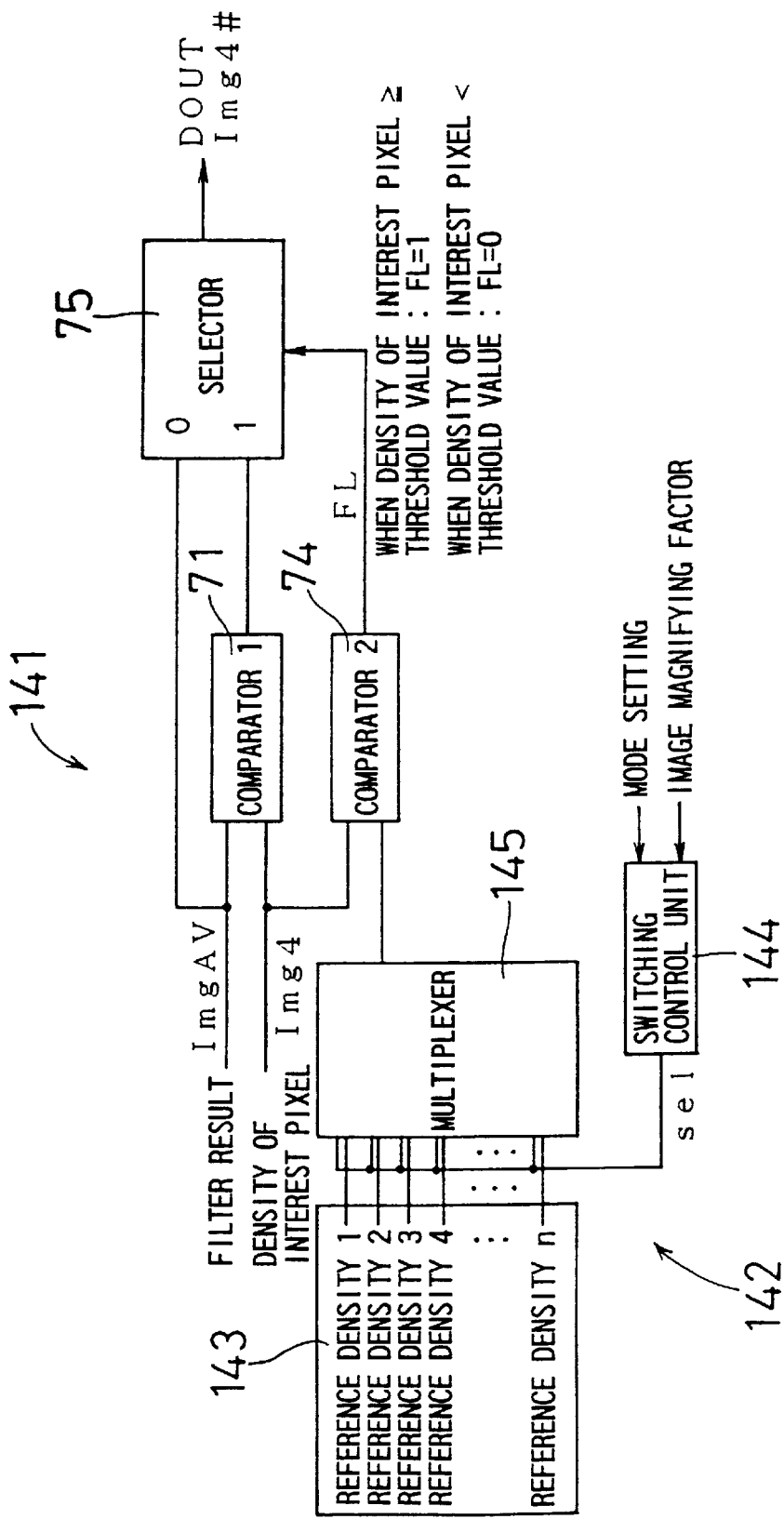
FIG. 25 is a schematic block diagram for showing a concrete arrangement of a calculating unit 141 contained in a filter unit provided in an image processing apparatus in a copying machine according to an eighth embodiment mode of the present invention.

FIG. 25 is a schematic block diagram for representing a functional arrangement of the calculating unit 141 contained in the filter unit of the eighth embodiment. The calculating unit 141 contains a reference density setting unit 142 in addition to the first comparator 71, the second comparator 74, and the selector 75. The reference density setting unit 142 is provided on the up stream side of the signal flow from the second comparator 74. The reference density setting unit 142 sets reference density in accordance with the third setting condition, namely the combination between the image magnifying ratio and the designated mode.

Concretely speaking, the reference density setting unit 142 contains a reference density storage unit 143, a switching control unit 144, and a multiplexer 145. The reference density storage unit 143 stores thereinto a plurality of reference densities in accordance with a plurality of the above-described and preset third setting conditions. A connecting relationship between this reference density storage unit 143 and the multiplexer 145 is substantially equal to the connecting relationship between the reference density storage unit 93 of the third embodiment and the multiplexer 95 thereof. The switching control unit 144 is equipped with a truth table as a table. This truth table indicates concrete values of control signals "sel" corresponding to a plurality of third setting conditions. A table 9 represents the above-explained truth table. Based upon both the mode and the image magnifying ratio designated by the user, the switching control unit 144 determines a value of the control signal sel used to control the multiplexer 145 with reference to the above table. In response to the control signal sel, the multiplexer 145 acquires any one of the plural reference densities, which is specified by this control signal sel. As a result, the reference density corresponding to the combination between both the mode and the image magnifying ratio designated by the operator is supplied as the reference density to the second comparator 74. The second comparator 74 carries out the process by using the given reference density.

TABLE 9

| setting condition | | |
| --- | --- | --- |
| electronic image magnification | mode | sel |
| equal to or more than 200% | automatic mode | 00000 |
| 160%~199% | automatic mode | 00001 |
| 130%~159% | automatic mode | 00010 |
| 90%~129% | automatic mode | 00011 |
| 70%~89% | automatic mode | 00100 |
| ⋮ | ⋮ | ⋮ |
| equal to or more than 200% | text mode | 01000 |
| 160%~199% | text mode | 01001 |
| 130%~159% | text mode | 01010 |
| 90%~129% | text mode | 01011 |
| 70%~89% | text mode | 01100 |
| ⋮ | ⋮ | ⋮ |

TABLE 9-continued setting condition

| electronic image magnification | mode | sel |
|---|---|---|
| equal to or more than 200% | photograph mode | 10000 |
| 160%~199% | photograph mode | 10001 |
| 130%~159% | photograph mode | 10010 |
| 90%~129% | photograph mode | 10011 |
| 70%~89% | photograph mode | 10100 |
| : | : | : |

For example, in the case where the image magnifying ratio is set to be equal to 200%, namely when it is so judged that the image is enlarged and further the character mode is designated, the control signal sel is set to "01000". As a result, the multiplexer 145 selects a maximum reference density value from all of the reference density values, for example, "120". As a result, an effective range of the filtering process of the first embodiment becomes the narrowest range, so that the filtered image can have the clear/sharp image portions. Moreover, when such a pixel whose density becomes higher than, or equal to 120, constitutes a pixel of interest, since the filtering process according to the first embodiment is carried out, it is possible to prevent the white dropouts from the black solid portion. On the other hand, in the case where the image magnifying ratio is selected to be 50%, namely the image is reduced, and also the photograph mode is designated, the control signal sel is set to "111111". As a consequence, the multiplexer 135 selects a minimum reference density value from all of the reference density values, for example, 10. As a result, the effective range of the filtering process according to the first embodiment becomes the widest range. Therefore, the filtered image becomes a smooth image. Moreover, in the case where a pixel whose density is higher than, or equal to 10 will constitute a pixel of interest, since the filtering process according to the first embodiment is carried out, it is possible to prevent the white dropouts in the black solid portion. Also, the resulting character can become clear. It should be understood that the copying machine of the eighth embodiment dose not contain the area separating unit 83, as compared with the copying machines of the sixth embodiment and the seventh embodiment. As a consequence, since the overall circuit arrangement of this copying machine can be decreased, cost of this copying machine according to the eighth embodiment can be reduced.

Next, a description will be made of a copying machine containing an image processing apparatus according to a ninth embodiment of the present invention. The copying machine according to this ninth embodiment has a different structure from that of the copying machine 31 according to the first embodiment such the image magnifying function, the "mode setting function", and also the area separating unit 83 are additionally employed, and furthermore, the calculating unit 57 employed in the filter unit 44 is substituted by the below-explained calculating unit 151, and also other structural elements thereof are equivalent to those of the copying machine 31 according to the first embodiment. It should be understood that the same reference numerals shown in the copying machines according to the first to eighth embodiments will be employed as those for denoting the same, or similar components employed in the copying machine according to the ninth embodiment, and therefore, explanations thereof are omitted. Furthermore, the descriptions concerning the same structural elements related to the copying machine according to the ninth embodiment as those for the copying machines according to the first to eighth embodiments will be omitted.

As previously described in the third to seventh embodiment modes, in the case where the strength of the edge enhancement component of the filter processing operation is strengthened when the character mode is designated whereas the strength of the edge enhancement component of the filter processing operation is weakened when the photograph mode is selected, the image qualities of the images which have been filtered in the respective modes can be improved. Also, the larger the image magnifying ratio is the higher the image quality of the filtered image with a stronger edge enhancement component is. Moreover, in the case where a plurality of areas whose feature amounts are different from each others are present in an original, when the strength of the edge enhancement component of the filtering process is adjusted, depending upon which area the pixel of interest is included in, the image quality of the filtered image can be improved. In other words, when the pixel of interest is contained in the character area, the strength of the edge enhancement component is strengthened, whereas when the pixel of interest is contained in the photograph area, the strength of the edge enhancement component is weakened.

As apparent from the foregoing descriptions, when the strength of the edge enhancement component is adjusted based on both the mode and the image magnifying ratio designated by the user and also the area where the pixel of interest is included, the image quality of the image which has been filtered can be furthermore improved, as compared with the image quality of the image which has not yet been filtered. Concretely speaking, the strengths of the edge enhancement component are decreased when the character mode is selected, when the character/photograph mode is selected, and when the photograph mode is selected in this order. Moreover, the larger the image magnifying ratio is, the stronger the strength of the edge enhancement component is. In addition, the strengths of the edge enhancement component are decreased when the pixel of interest is included in the character area, when the pixel of interest is contained in the halftone dot area, and when the pixel of interest is contained in the photograph area in this order. The larger the strength of the above-described edge enhancement becomes, the larger the reference density is set.

A table 10 represents reference densities corresponding to the respective typical conditions of fourth setting conditions employed in the copying machine. The fourth setting conditions indicate combinations modes, areas where pixels of interest are included, and image magnifying ratios, may be conditions other than the setting conditions shown in this table 10. Concrete values of the reference densities indicated in this table 10 are acquired by way of experiments. That is to say, a reference density corresponding to an arbitrary one condition of these fourth setting conditions is defined in the following sequence. While this arbitrary fourth setting condition is set to the copying machine and a reference density is provisionally set, an original is acquired by this copying machine so as to print an image of this original. While this operation is carried out plural times by changing the reference density, a plurality of printed images are observed by an operator. Then, such provisional reference density when an image having an optimum image quality can be obtained may be defined as a reference density corresponding to this fourth setting condition. These concrete values shown in the table 10 are varied in accordance with a technical specification of an imaging element employed in a copying machine. The high/low relationship among the reference densities corresponding to the combinations between the image-magnifying ratios and the designated modes indicated in the table 10 is not changed irrespective of the technical specification of the imaging element.

TABLE 10 fourth setting condition

| image-magnifying ratio | area containing interest pixel | mode | reference density | degree of edge enhancement |
|---|---|---|---|---|
| max. (enlarge) | character area | character mode | 128 | maximum ↓ |
| min. (reduce) | character area | character mode | 118 | |
| max. (enlarge) | halftone dot area | character mode | 96 | |
| min. (reduce) | halftone dot area | character mode | 86 | |
| max. (enlarge) | character area | photograph mode | 84 | |
| max. (enlarge) | photograph area | character mode | 64 | |
| min. (reduce) | character area | photograph mode | 64 | |
| max. (enlarge) | halftone dot area | photograph mode | 63 | |
| min. (reduce) | photograph area | character mode | 54 | |
| min. (reduce) | halftone dot area | photograph mode | 48 | |
| max. (enlarge) | photograph area | photograph mode | 42 | |
| min. (reduce) | photograph area | photograph mode | 32 | minimum |

Figure 26:
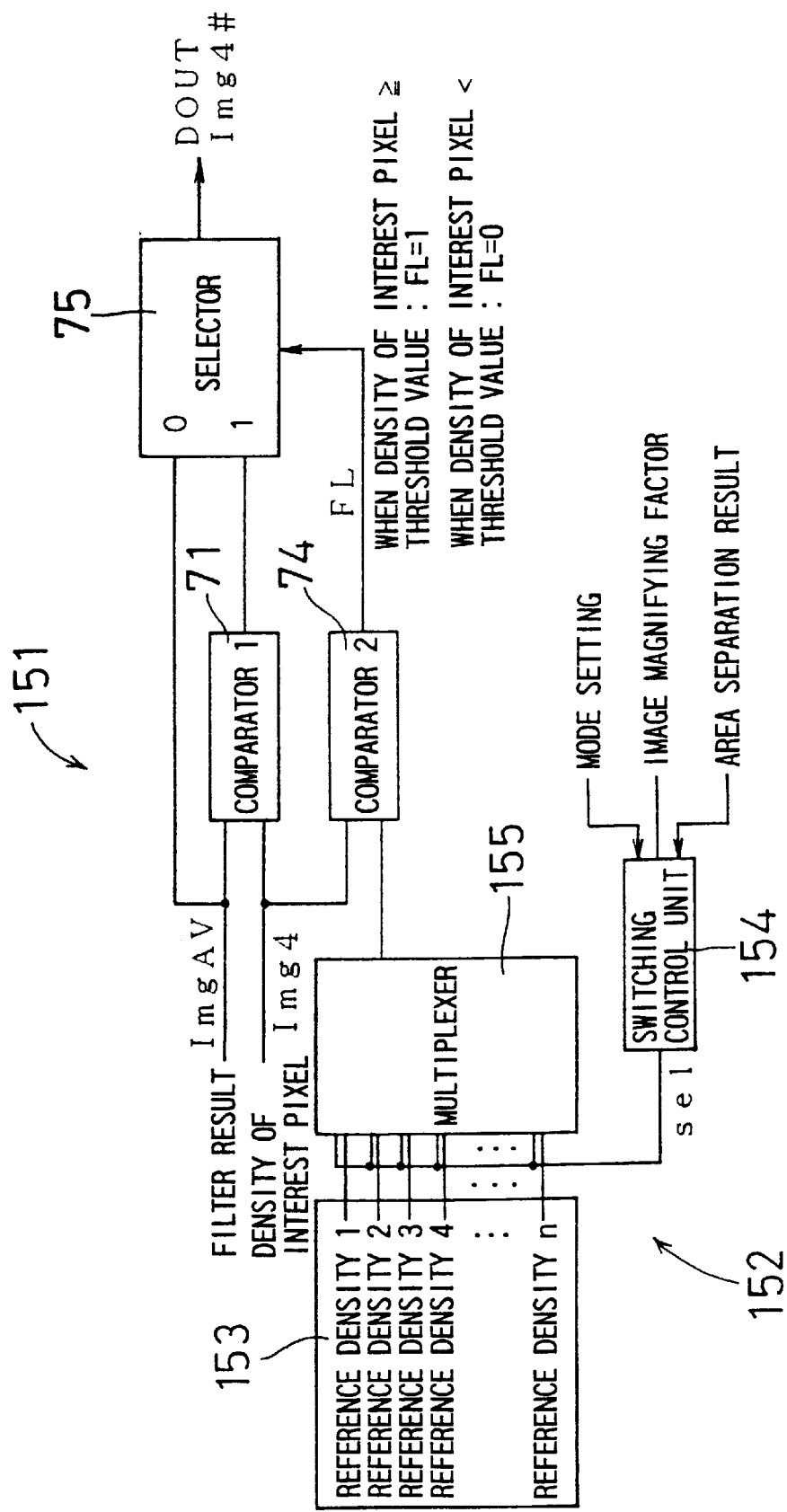
FIG. 26 is a schematic block diagram for indicating a concrete arrangement of a calculation unit 151 contained in a filter unit provided in an image processing apparatus in a copying machine containing an image processing apparatus according to a ninth embodiment mode of the present invention.

FIG. 26 is a schematic block diagram for representing a functional arrangement of the calculating unit 151 contained in the filter unit of the ninth embodiment. The calculating unit 151 contains a reference density setting unit 152 in addition to the first comparator 71, the second comparator 74, and the selector 75. The reference density setting unit 152 is provided on the up stream side of the signal flow from the second comparator 74. The reference density setting unit 152 sets reference density in accordance with the fourth setting condition, namely the combination among the designated mode, the designated image magnifying ratio and the area in which the pixel of interest is contained. The set reference density is supplied to the second comparator 74.

Concretely speaking, the reference density setting unit 152 contains a reference density storage unit 153, a switching control unit 154, and a multiplexer 155. The reference density storage unit 153 stores thereinto a plurality of reference densities in accordance with a plurality of the above-described and preset fourth setting conditions. A connecting relationship between this reference density storage unit 153 and the multiplexer 155 is substantially equal to the connecting relationship between the reference density storage unit 93 of the third embodiment and the multiplexer 95 thereof. The switching control unit 154 is equipped with a truth table as a table. This truth table indicates concrete values of control signals "sel" corresponding to a plurality of fourth setting conditions. A table 11 represents the above-explained true table. Based upon both the mode and image magnifying ratio designated by the user, and the area containing the interest pixel detected by the area separating unit 83, the switching control unit 154 determines a value of the control signal sel used to control the multiplexer 155 with reference to the above table. In response to the control signal sel, the multiplexer 155 acquires any one of the plural reference density, which is specified by this control signal sel. As a result, the reference density corresponding to the combination between both the mode and the image magnifying ratio designated by the operator is supplied as the reference density to the second comparator 74.

TABLE 11 setting condition

| electronic image magnification | mode | area separation | sel |
|---|---|---|---|
| equal to or more than 200% | automatic mode | character portion | 000000 |
| 160%~199% | automatic mode | character portion | 000001 |
| 130%~159% | automatic mode | character portion | 000010 |
| 90%~129% | automatic mode | character portion | 000011 |
| 70%~89% | automatic mode | character portion | 000100 |
| : | : | : | : |
| equal to or more than 200% | text mode | character portion | 001000 |
| 160%~199% | text mode | character portion | 001001 |
| 130%~159% | text mode | character portion | 001010 |
| 90%~129% | text mode | character portion | 001011 |
| 70%~89% | text mode | character portion | 001100 |
| : | : | : | : |
| equal to or more than 200% | photograph mode | character portion | 010000 |
| 160%~199% | photograph mode | character portion | 010001 |
| 130%~159% | photograph mode | character portion | 010010 |
| 90%~129% | photograph mode | character portion | 010011 |
| 70%~89% | photograph mode | character portion | 010100 |
| : | : | : | : |
| equal to or more than 200% | automatic mode | halftone dot portion | 100000 |
| 160%~199% | automatic mode | halftone dot portion | 100001 |
| 130%~159% | automatic mode | halftone dot portion | 100010 |
| 90%~129% | automatic mode | halftone dot portion | 100011 |
| 70%~89% | automatic mode | halftone dot portion | 100100 |
| : | : | : | : |
| equal to or more than 200% | text mode | halftone dot portion | 101000 |
| 160%~199% | text mode | halftone dot portion | 101001 |
| 130%~159% | text mode | halftone dot portion | 101010 |

For example, in the case where the image magnifying ratio is set to be more than, or equal to 200%, namely when it is so judged that the image is enlarged, the character mode is designated, and further the pixel of interest is located in the character area, the control signal sel is set to "0000000". As a result, the multiplexer 155 selects a maximum reference density value from all of the reference density values, for example, "120". As a result, an effective range of the filtering process of the first embodiment becomes the narrowest range, so that the filtered image can have the clear/sharp image portions. Moreover, when such a pixel whose density becomes higher than, or equal to 120, constitutes a pixel of interest, since the filtering process according to the first embodiment is carried out, it is possible to prevent the white dropouts from the black solid portion. On the other hand, when the image magnifying ratio is selected to be 50%, namely the image is reduced, the photograph mode is designated, and the pixel of interest is judged as being located in the photograph area, the control signal sel is set to "1111111". As a consequence, the multiplexer 155 selects a minimum reference density value from all of the reference density values, for example, 10. As a result, the effective range of the filtering process according to the first embodiment becomes the widest range. Therefore, the filtered image becomes a smooth image. Moreover, in the case where a pixel whose density is higher than, or equal to 10 will constitute a pixel of interest, since the filtering process according to the first embodiment is carried out, it is possible to prevent the white dropouts in the black solid portion. Also, the resulting character can become clear.

Next, a description will be made of a copying machine containing an image processing apparatus according to a tenth embodiment of the present invention. The copying machine according to seventh embodiment has a different structure from that of the copying machine 31 according to the first embodiment such that an image to be processed is a color image, a color converting process (will be discussed later) is additionally employed, and furthermore, the filter unit 44 is substituted by the below-explained filter unit 161, and also other structural elements thereof are equivalent to those of the copying machine 31 according to the first embodiment. It should be understood that the same reference numerals shown in the copying machines according to the first to ninth embodiments will be employed as those for denoting the same, or similar components employed in the copying machine according to the tenth embodiment, and therefore, explanations thereof are omitted. Furthermore, the descriptions concerning the same structural elements related to the copying machine according to the tenth embodiment as those for the copying machines according to the first to ninth embodiments will be omitted.

A scanning apparatus of the copying machine according to the tenth embodiment scans an original to be processed to thereby produce image data representative of a color image. In this case, the image data is composed of a plurality sets of image data sets which represent colors of plural pixels for constituting an image. In general, one arbitrary pixel data is pixel data having a so-called "RGB" format when this arbitrary pixel data is outputted from the A/D converter 34. This pixel data is composed of a red color component, a blue color component, and a green color component in order to represent the color of the image.

Figure 27:
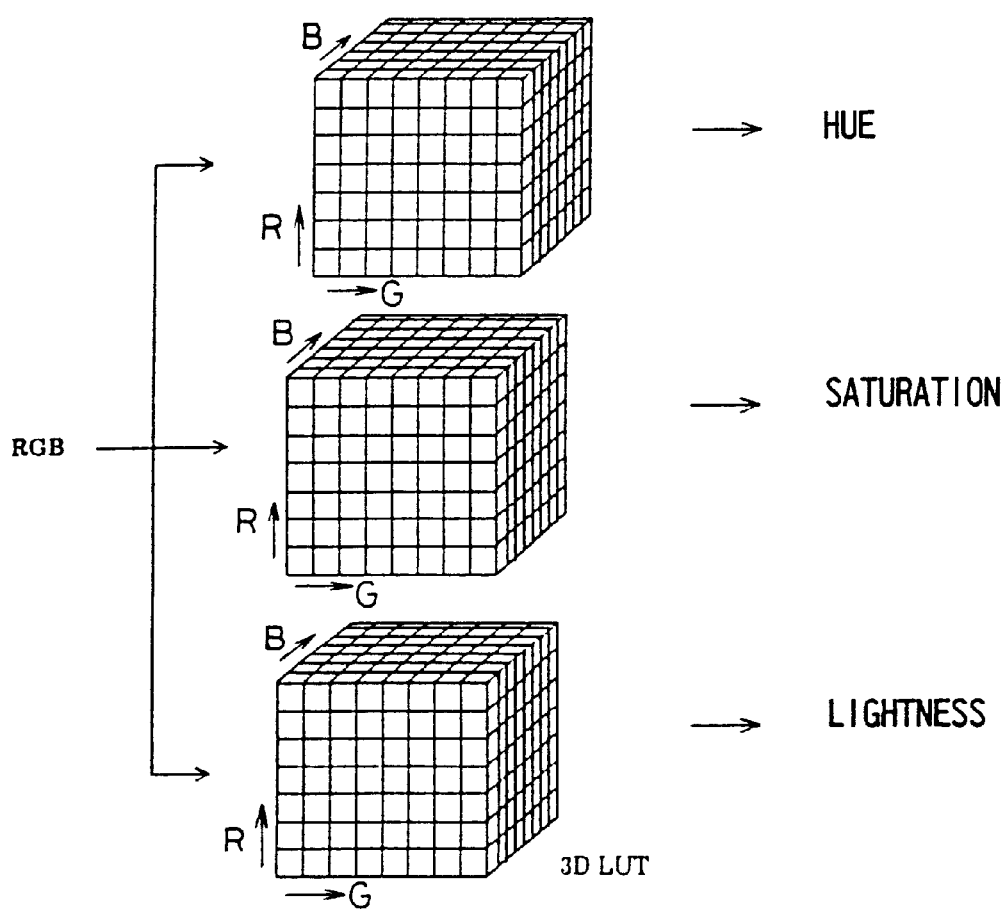
FIG. 27 illustratively represents a color converting process performed in an image processing unit contained in a copying machine, according to a tenth embodiment mode of the present invention.

The pixel data having the RGB format is converted by way of a so-called "color converting process" into pixel data having a so-termed "HSV" format. This pixel data having the HSV format is composed of a hue component, a saturation component, and a lightness component. The lightness component represents lightness of a pixel, namely density (concentration). The above-described color converting process is carried out by employing, for example, a so-called "three-dimensional lookup table", as indicated in FIG. 27. The three-dimensional lookup table is set to individual aspects of hue, saturation, and lightness, and in accordance with a combination of the above-described three color components, hue, saturation, and lightness are determined. Alternatively, the color converting process may be carried out by using conversion formulae for previously setting these 3 color components as parameters. Also, this color converting process may be carried out at any timing defined from the A/D converting unit up to the filter unit. As a result, when the pixel data is supplied to the filter unit 161, the format of this pixel data has been converted into the HSV format.

FIG. 28 is a schematic block diagram for indicating an arrangement of the filter unit 161. This filter unit 161 contains either one or plural sets of hue/saturation line memories 162/163 in addition to plural sets of line memories 51(1) to 51(N) and a filter 52. Among the pixel dates, only the lightness component contained in the pixel data is supplied to the filter calculation unit 52 and a top cell of the top line memory 51(1). Both the hue component and the saturation component contained in the pixel data are supplied to top cells of the hue/saturation line memories 162/163. The filter calculation unit 52 performs the process as previously explained with reference to the first to ninth embodiments by using the lightness component contained in the pixel data of the color image instead of the pixel data of the monochromatic image. The hue/saturation line memories 162/163 are provided so as to adjust timing at which both the hue component and the saturation component are outputted from the filter component. In other words, both the hue/saturation line memories 162/163 may cause both the hue component and the saturation component to be delayed in such a manner that the corrected lightness component outputted from the filter calculation unit 52 is applied to the output gamma correcting unit at the same time when both the hue component and the saturation component, which are combined with the lightness component before being corrected, are applied thereto.

When a total number of cells employed in a single set of the hue line memory 162 and a single set of the saturation line memory 163 is equal to that of a signal set of the line memory 51(1), and an area to be processed by the filter calculation unit 52 is such an area made of N pixels×N pixels, (N–1) sets of the line memories 51 for storing thereinto the lightness component are required, whereas a total number of each of the hue/saturation line memories is required to be equal to a half of the above-described total number of the brightness line memories, namely (N–1)/2 sets of line memories are required.

As previously described, the image processing apparatus employed in the copying machine according to the tenth embodiment performs the filtering process only for the lightness component contained in the pixel data, namely only for the density of the pixel. As a result, it is possible to adjust the image quality related to the brightness of the image. Therefore, the image quality of the filter-processed image can be improved with employment of the low-cost structure. It should be understood that in this tenth embodiment, the delay process for the timing adjustment is carried only for the hue component and the saturation component. Alternatively, the optimum processing operation related to the image quality adjustment may be performed also for both the hue component and the saturation component. As a consequence, the image quality of the processed image can be furthermore improved.

It should also be noted that the above-described image processing apparatuses according to the first to tenth embodiments have been merely exemplified as the image processing apparatus of the present invention. When major operations of other types of image processing apparatuses are equivalent to those of this image processing apparatus according to the present invention, these different types of image processing apparatuses may belong to the technical scope and spirit of the present invention. In particular, when the same processing results can be obtained as to the detailed operations of the various structural elements, the inventive image processing apparatus may be realized by executing other different operations. Also, these image processing apparatuses may be employed within the copying machines, but also may be solely utilized. Alternatively, these image processing apparatuses may be used in combination with other apparatuses capable of execution image processing operations. Furthermore, a portion, or all of the functional elements 41 to 43 and 45 to 47 except for the filter provided in these image processing apparatuses may be omitted. In addition, these image processing apparatuses may be realized by executing a calculation process by a computer. In an alternative case to operate a computer as the above-explained image processing apparatus, software is stored into a computer-readable storage medium, and then, this software is installed in such a computer capable of inputting/storing image data. This software is used to cause the CPU of the computer to execute the image processing calculation for the above-explained image processing apparatus. Thereafter, when this CPU is operated in accordance with the installed software, the overall computer system may function as the image processing apparatus of the present invention. As the above-explained storage medium, a CD-ROM and a floppy disk may be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus comprising:

area designating means for selecting any one of pixels as a pixel of interest, which are contained in an image composed of a plurality of reversed density pixels, to thereby designate as an area to be processed, an area contained in said image which is composed of a predetermined number of pixels including the pixel of interest;

average value calculating means for performing a weighted average calculation of densities of all of the pixels within the area to be processed by employing a plurality of weighting coefficients corresponding to a positional relationship between each of the all pixels and the pixel of interest so as to thereby calculate weighted average values of the densities of all of the pixels;

limiting means for limiting the weighted average values to be smaller than, or equal to a predetermined upper limit density and to be larger than, or equal to a predetermined lower limit density;

first comparing means for comparing the weighted average value limited by the limiting means with the density of the interest pixel; and density replacing means for replacing the density of the interest pixel by the weighted average value when the density of the interest pixel is less than the limited weighted average value, and also for maintaining the density of the interest pixel when the density of the interest pixel is more than, or equal to the limited weighted average value, in response to the comparison result of the first comparing means.

2. The image processing apparatus of claim 1, further comprising:

second comparing means for comparing the density of the interest pixel with a predetermined reference density, wherein the density replacing means further replaces the density of the interest pixel by the limited weighted average value in the case where the density of the interest pixel is less than the reference density in response to the comparison result obtained from the second comparing means.

3. The image processing apparatus of claim 2, further comprising:

separating means for separating the image to be processed into a character area for photographing a character, a halftone dot area for photographing a dotted picture represented by using a half tone image method, and a photograph area for photographing a photograph composed of pixels having gradation; and reference density setting means for selecting any one area in which the pixel of interest is included, from the character area, the halftone dot area, and the photograph area, and for setting the reference density used in the second comparing means in response to the selected area, wherein the reference density which is set when the character area is selected is made higher than the reference density which is set when the photograph area is selected, and also the reference density which is set when the photograph area is selected is made higher than the reference density which is set when the halftone dot area is selected.

4. The image processing apparatus of claim 2, further comprising:

image producing means for producing the image by scanning a surface of an original to be processed, and for varying a ratio of a dimension of the image to the original; and reference density setting means for setting the reference density used in the second comparing means in response to the ratio, wherein the higher the ratio becomes, the higher the reference density is set.

5. The image processing apparatus of claim 2, further comprising:

mode designating means for designating any one of a predetermined character mode for processing a character original and a predetermined photograph mode for processing a photograph original; and reference density setting means for setting the reference density used in the second comparing means in response to the designated mode, wherein the reference density set when the character mode is designated is made higher than the reference density set when the photograph mode is designated.

6. The image processing apparatus of claim 2, further comprising:

mode designating means for designating any one of a predetermined character mode for processing a character original and a predetermined mixed original mode for processing an image on which both a character and photograph are photographed; and reference density setting means for setting the reference density used in the second comparing means in responses to the designated mode, wherein the reference density set when the character mode is designated is made higher than the reference density set when the mixed original mode is designated.

7. The image processing apparatus of claim 2, further comprising:

mode designating means for designating any one of a predetermined mixed original mode for processing an image on which both a character and a photograph are photographed, and a predetermined photograph mode for processing a photograph original; and reference density setting means for setting the reference density used in the second comparing means in response to the designated mode, wherein the reference density set when the mixed original mode is designated is made higher than the reference density set when the photograph mode is designated.

8. The image processing apparatus of claim 2, further comprising:
   image producing means for producing the image by scanning a surface of an original to be processed, and for varying a ratio of a dimension of the image to the original;
   separating means for separating the image to be processed into a character area for photographing a character, a halftone dot area for photographing a dotted picture represented by using a half tone image method, and a photograph area for photographing a photograph composed of pixels having gradation; and
   reference density setting means for selecting any one area containing the pixel of interest from the character area, the halftone dot area, and the photograph area, and also for setting the reference density used by the second comparing means in response to the selected area and the selected ratio,
   wherein the higher the ratio becomes, the higher the reference density is set, the reference density set when the character area is selected is made higher than the reference density set when the photograph area is selected, and the reference density set when the photograph area is selected is made higher than the reference density set when the halftone dot area is selected.

9. The image processing apparatus of claim 2, further comprising:
   image producing means for producing the image by scanning a surface of an original to be processed, and for varying a ratio of a dimension of the image to the original;
   mode designating means for designating any one of a predetermined character mode for processing a character original and a predetermined photograph mode for processing a photograph original; and
   reference density setting means for setting the reference density employed in the second comparing means in response to the designated mode and the ratio,
   wherein the higher the ratio becomes, the higher the reference density is set; and the reference density set when the character mode is designated is made higher than the reference density set when the photograph mode is designated.

10. The image processing apparatus of claim 2, further comprising:
    image producing means for producing the image by scanning a surface of an original to be processed, and for varying a ratio of a dimension of the image to the original;
    mode designating means for designating any one of a predetermined character mode for processing a character original and a predetermined mixed original mode for processing an image on which both a character and photograph are photographed; and
    reference density setting means for setting the reference density used by the second comparing means in response to the designated mode and the ratio,
    wherein the higher the ratio becomes, the higher the reference density is set, and the reference density set when the character mode is designated is made higher than the reference density set when the mixed original mode is selected.

11. The image processing apparatus of claim 2, further comprising:
    image producing means for producing the image by scanning a surface of an original to be processed, and for varying a ratio of a dimension of the image to the original;
    mode designating means for designating any one of a predetermined mixed original mode for processing an image on which both a character and a photograph are photographed, and a predetermined photograph mode for processing a photograph original; and
    reference density setting means for setting the reference density used by the second comparing means in response to the designated mode and the ratio,
    wherein the higher the ratio becomes, the higher the reference density is set, and the reference density set when the mixed original mode is designated is made higher than the reference density set when the photograph mode is designated.

12. The image processing apparatus of claim 2, further comprising:
    separating means for separating the image to be processed into a character area for photographing a character, a halftone dot area for photographing a dotted picture represented by using a half tone image method, and a photograph area for photographing a photograph composed of pixels having gradation;
    mode designating means for designating any one of a predetermined character mode for processing a character original and a predetermined photograph mode for processing a photograph original; and
    reference density setting means for selecting any one area in which the pixel of interest is included, from the character area, the halftone dot area, and the photograph area; and for setting the reference density used in the second comparing means in response to the selected area and the designated mode,
    wherein the reference density set when the character area is selected is made higher than the reference density set when the photograph area is selected, the reference density set when the halftone dot area is selected is made higher than the reference density set when the photograph area is selected, and also the reference density set when the character mode is designated is made higher than the reference density set when the photograph mode is designated.

13. The image processing apparatus of claim 2, further comprising:
    separating means for separating the image to be processed into a character area for photographing a character, a halftone dot area for photographing a dotted picture represented by using a half tone image method, and a photograph area for photographing a photograph composed of pixels having gradation;
    mode designating means for designating any one of a predetermined character mode for processing a character original and a predetermined mixed original mode for processing an image on which both a character and photograph are photographed; and
    reference density setting means for selecting any one area in which the pixel of interest is included, from the character area, the halftone dot area, and the photograph area; and for setting the reference density used in the second comparing means in response to the selected area and the designated mode,
    wherein the reference density set when the character area is selected is made higher than the reference density set when the photograph area is selected, the reference density set when the halftone dot area is selected is made higher than the reference density set when the photograph area is selected, and also the reference density set when the character mode is designated is made higher than the reference density set when the mixed original mode is designated.

14. The image processing apparatus of claim 2, further comprising:
  separating means for separating the image to be processed into a character area for photographing a character, a halftone dot area for photographing a dotted picture represented by using a half tone image method, and a photograph area for photographing a photograph composed of pixels having gradation;
  mode designating means for designating any one of a predetermined mixed original mode for processing an image on which both a character and a photograph are photographed, and a predetermined photograph mode for processing a photograph original; and
  reference density setting means for selecting any one area in which the pixel of interest is included, from the character area, the halftone dot area, and the photograph area; and for setting the reference density used in the second comparing means in response to the selected area and the designated mode,
  wherein the reference density set when the character area is selected is made higher than the reference density set when the photograph area is selected, the reference density set when the halftone dot area is selected is made higher than the reference density set when the photograph area is selected, and also the reference density set when the mixed original mode is designated is made higher than the reference density set when the photograph mode is designated.

15. The image processing apparatus of claim 2, further comprising:
  image producing means for producing the image by scanning a surface of an original to be processed, and for varying a ratio of a dimension of the image to the original;
  separating means for separating the image to be processed into a character area for photographing a character, a halftone dot area for photographing a dotted picture represented by using a half tone image method, and a photograph area for photographing a photograph composed of pixels having gradation;
  mode designating means for designating any one of a predetermined character mode for processing a character original and a predetermined photograph mode for processing a photograph original; and
  reference density setting means for selecting any one area in which the pixel of interest is included, from the character area, the halftone dot area, and the photograph area; and for setting the reference density used in the second comparing means in response to the selected area, the designated mode, and the ratio,
  wherein the higher the ratio becomes, the higher the reference density is set, the reference density set when the character mode is designated is made higher than the reference density set when the photograph mode is designated, the reference density set when the character area is selected is made higher than the reference density set when the photograph area is selected, and also the reference density set when the halftone dot area is selected is made higher than the reference density set when the photograph area is selected.

16. The image processing apparatus of claim 2, further comprising:
  image producing means for producing the image by scanning a surface of an original to be processed, and for varying a ratio of a dimension of the image to the original;
  separating means for separating the image to be processed into a character area for photographing a character, a halftone dot area for photographing a dotted picture represented by using a half tone image method, and a photograph area for photographing a photograph composed of pixels having gradation;
  mode designating means for designating any one of a predetermined character mode for processing a character original and a predetermined mixed original mode for processing an image on which both a character and photograph are photographed; and
  reference density setting means for selecting any one area in which the pixel of interest is included, from the character area, the halftone dot area, and the photograph area; and for setting the reference density used in the second comparing means in response to the selected area, the designated mode, and the ratio,
  wherein the higher the ratio becomes, the higher the reference density is set; the reference density set when the character mode is designated is made higher than the reference density set when the mixed original mode is designated, the reference density set when the character area is selected is made higher than the reference density set when the photograph area is selected, and also the reference density set when the halftone dot area is selected is made higher than the reference density set when the photograph area is selected.

17. The image processing apparatus of claim 2, further comprising:
  image producing means for producing the image by scanning a surface of an original to be processed, and for varying a ratio of a dimension of the image to the original;
  separating means for separating the image to be processed into a character area for photographing a character, a halftone dot area for photographing a dotted picture represented by using a half tone image method, and a photograph area for photographing a photograph composed of pixels having gradation;
  mode designating means for designating any one of a predetermined mixed original mode for processing an image on which both a character and a photograph are photographed, and a predetermined photograph mode for processing a photograph original; and
  reference density setting means for selecting any one area in which the pixel of interest is included, from the character area, the halftone dot area, and the photograph area; and for setting the reference density used in the second comparing means in response to the selected area, the designated mode, and the ratio,
  wherein the higher the ratio becomes, the higher the reference density is set, the reference density set when the mixed original mode is designated is made higher than the reference density set when the photograph mode is designated, the reference density set when the character area is selected is made higher than the reference density set when the photograph area is selected, and also the reference density set when the halftone dot area is selected is made higher than he reference density set when the photograph area is selected.

18. The image processing apparatus of claim 1,
  wherein colors of the respective pixels of the image are defined based on the density, the saturation, and the hue, and
  the average value calculating means, the first comparing means, and the density replacing means are carried out with respect to the density.

* * * * *